US 6,715,102 B1

(12) United States Patent
Nishimura

(10) Patent No.: US 6,715,102 B1
(45) Date of Patent: Mar. 30, 2004

(54) OPERATION INPUT PROCESSING APPARATUS AND METHOD

(75) Inventor: Kazuyuki Nishimura, Saitama (JP)

(73) Assignee: Romwin Limited Company, Saitama (JP)

( * ) Notice: Subject to any disclaimer, the term of this patent is extended or adjusted under 35 U.S.C. 154(b) by 0 days.

(21) Appl. No.: 09/673,542

(22) PCT Filed: Feb. 15, 2000

(86) PCT No.: PCT/JP00/00826

§ 371 (c)(1),
(2), (4) Date: Oct. 17, 2000

(87) PCT Pub. No.: WO00/49506

PCT Pub. Date: Aug. 24, 2000

(30) Foreign Application Priority Data

| Feb. 19, 1999 | (JP) | .......... 11-041112 |
| Mar. 31, 1999 | (JP) | .......... 11-092731 |
| Jun. 3, 1999 | (JP) | .......... 11-156023 |
| Jul. 13, 1999 | (JP) | .......... 11-198592 |

(51) Int. Cl.⁷ .............................. G06F 11/00
(52) U.S. Cl. ................ 714/20; 714/6; 717/135; 703/22
(58) Field of Search .............. 714/6, 15, 20; 711/161, 163; 707/202; 717/101–103, 135; 703/17, 22; 345/745

(56) References Cited

U.S. PATENT DOCUMENTS

| 5,457,794 A | * | 10/1995 | Azumatani et al. ......... 707/2 |
| 5,721,918 A | * | 2/1998 | Nilsson et al. ............. 707/202 |
| 6,195,695 B1 | * | 2/2001 | Cheston et al. ............ 709/221 |
| 6,378,087 B1 | * | 4/2002 | Flanagan et al. ............ 714/38 |
| 6,381,735 B1 | * | 4/2002 | Hunt ......................... 717/158 |
| 6,393,485 B1 | * | 5/2002 | Chao et al. ................ 709/231 |
| 6,453,397 B1 | * | 9/2002 | Okuda ...................... 711/163 |
| 6,542,975 B1 | * | 4/2003 | Evers et al. ............... 711/162 |
| 6,546,364 B1 | * | 4/2003 | Smirnov et al. ............. 703/22 |
| 6,574,790 B1 | * | 6/2003 | Abramson et al. ......... 717/100 |

FOREIGN PATENT DOCUMENTS

| JP | 1-232457 | 9/1989 |
| JP | 2-280255 | 11/1990 |
| JP | 7-84776 | 3/1995 |
| JP | 9-282154 | 10/1997 |
| JP | 10-78932 | 3/1998 |
| JP | 10-187582 | 7/1998 |

* cited by examiner

Primary Examiner—Scott Baderman
Assistant Examiner—Joshua Lohn
(74) Attorney, Agent, or Firm—Frommer Lawrence & Haug LLP; William S. Frommer

(57) ABSTRACT

The present invention can be applied to an operation input processing apparatus provided with an operation input executing section which issue tickets in response to users' input operations. A personal computer extracts an application program applied for the operation input processing apparatus from a software resource containing a plurality of application programs and operates the operation input executing section by executing the extracted application program. Thereby the operation input processing apparatus having various functions can operate application programs easily without damage thereto.

22 Claims, 43 Drawing Sheets

| FILE NAME | FAT ENTRY | FILE SIZE | OTHERS |
|---|---|---|---|
| A. DAT | 2 | 18000 | |
| B. DAT | 4 | 24000 | |
| C. DAT | 6 | 16000 | |
| ⋮ | | | |
| D. DAT | 237 | 0 | |
| | | | |

FIG. 7

| FILE NAME | FAT ENTRY | FILE SIZE | OTHERS |
|---|---|---|---|
| A1. EXE | 240 | 32000 | |
| A2. DAT | 242 | 17800 | |
| A3. SYS | 244 | 22000 | |
| DIRB | 1737 | 0 | |
| | | | |

FIG. 8

| FILE NAME | FAT ENTRY | FILE SIZE | OTHERS |
|---|---|---|---|
| B1. DAT | 1740 | 20 | |
| B2. DAT | 1741 | 30000 | |
| | | | |

FIG. 9

| FILE NAME | FAT ENTRY | FILE SIZE | OTHERS |
|---|---|---|---|
| A. DAT | 2 | | |
| C. DAT | 11 | | |
| | | | |
| DIRA | 200 | | |
| | | | |

FIG. 11

| FILE NAME | FAT ENTRY | FILE SIZE | OTHERS |
|---|---|---|---|
| A2. DAT | 202 | | |
| | | | |
| DIRB | 305 | | |
| | | | |

FIG. 12

| FILE NAME | FAT ENTRY | FILE SIZE | OTHERS |
|---|---|---|---|
| A.DAT | 2 | 18000 | |
| B.DAT | 4 | 24000 | |
| C.DAT | 6 | 16000 | |
| ⋮ | | | |
| DIRA | 237 | 0 | |
| | | | |

FIG. 23

| FILE NAME | FAT ENTRY | FILE SIZE | OTHERS |
|---|---|---|---|
| A1.EXE | 240 | 32000 | |
| A2.DAT | 242 | 17800 | |
| A3.SYS | 244 | 22000 | |
| DIRB | 1737 | 0 | |
| | | | |

FIG. 24

| FILE NAME | FAT ENTRY | FILE SIZE | OTHERS |
|---|---|---|---|
| B1.DAT | 1740 | 20 | |
| B2.DAT | 1741 | 30000 | |
| | | | |

FIG. 25

| SECTOR | |
|---|---|
| 0 | SYSTEM AREA FOR IPL OR THE LIKE |
| | MAIN FAT |
| | SUBFAT |
| 240 | ROUTE DIRECTORY |
| 248 | A. DAT |
| 268 | C. DAT |
| | ⋮ |
| 1040 | DIRA |
| 1048 | A2. DAT |
| | ⋮ |
| 1460 | DIRB |
| | B1. DAT |
| | |

~41G

WORKING FILE MEMORY

CAPACITY 32MB
NUMBER OF SECTORS 65536
NUMBER OF CLUSTERS 16384
NUMBER OF SECTORS PER CLUSTER 4

FIG. 29

| ACCESS DATE | FILE NAME | FAT ENTRY | FILE SIZE | OTHERS |
|---|---|---|---|---|
| | A.DAT | 2 | 18000 | |
| | B.DAT | 4 | 24000 | |
| | C.DAT | 6 | 16000 | |
| | ⋮ | | | |
| | DIRA | 237 | 0 | |
| | | | | |

FIG. 44

| ACCESS DATE | FILE NAME | FAT ENTRY | FILE SIZE | OTHERS |
|---|---|---|---|---|
| | A1.EXE | 240 | 32000 | |
| | A2.DAT | 242 | 17800 | |
| | A3.SYS | 244 | 22000 | |
| | DIRB | 1737 | 0 | |
| | | | | |

FIG. 45

| ACCESS DATE | FILE NAME | FAT ENTRY | FILE SIZE | OTHERS |
|---|---|---|---|---|
| | B1.DAT | 1740 | 20 | |
| | B2.DAT | 1741 | 30000 | |
| | | | | |

FIG. 46

| ACCESS DATE | FILE NAME | FAT ENTRY | FILE SIZE | OTHERS |
|---|---|---|---|---|
| | A. DAT | 2 | 18000 | |
| | B. DAT | 4 | 24000 | |
| | C. DAT | 6 | 16000 | |
| | ⋮ | | | |
| | DIRA | 237 | 0 | |
| | | | | |

FIG. 55

| ACCESS DATE | FILE NAME | FAT ENTRY | FILE SIZE | OTHERS |
|---|---|---|---|---|
| | A1. EXE | 240 | 32000 | |
| | A2. DAT | 242 | 17800 | |
| | A3. SYS | 244 | 22000 | |
| | DIRB | 1737 | 0 | |
| | | | | |

FIG. 56

| ACCESS DATE | FILE NAME | FAT ENTRY | FILE SIZE | OTHERS |
|---|---|---|---|---|
| | B1. DAT | 1740 | 20 | |
| | B2. DAT | 1741 | 30000 | |
| | | | | |

FIG. 57

OPERATION INPUT PROCESSING APPARATUS AND METHOD

TECHNICAL FIELD

The present invention relates to an operation input processing apparatus and method that is applicable to operation input processing apparatuses such as automatic issuance machines for issuing, for example, concert tickets in response to users' input operations.

BACKGROUND ART

Automatic issuance machines have been proposed which automatically issue tickets for concerts or the like in response to users' input operations. To buy a ticket, a user first obtains, based on a contract, a credit card issued by an administration company that administrates the automatic issuance machines. Subsequently, in buying a ticket, the user can insert the obtained credit card into an automatic issuance machine installed, for example, at a retail shop and input the contents of the concert in accordance with instructions on a touch panel, so that the automatic issuance machine issues the ticket. Payment is settled with the credit card.

As shown in FIG. 16, a conventional automatic issuance machine 1 has a signal processing section 2 comprising a personal computer that has its central processing unit (CPU) to control the operation of the entire automatic issuance machine 1 using software resources stored in a hard disc 3 and comprising an operating system (OS), programs, and application programs for operating the automatic issuance machine 1.

A display section 4 has a display screen having a touch panel screen to display screens based on commands from the signal processing section 2 or communicate to the signal processing section 2 a user's input operation information input via the display screens.

A card reader 5 has a card insertion device for a credit card issued based on a contract with an administration company that administrates the automatic issuance machine 1 and reads identification information for identifying the user and which has been written to the credit card inserted into the card insertion device, to communicate the identification information to the signal processing section 2.

A printer 6 issues a ticket for a concert or the like in accordance with the information from the signal processing section 2. An uninterruptive power supply 7 retains the operation of the automatic issuance machine 1 for a predetermined amount of time when a power supply is turned off, and notifies the signal processing section 2 that the power supply has been turned off to allow it to carry out a shutdown process that is a preprocess for power turn-off.

The signal processing section 2 is connected via a modem 8 to a transmission line 9 comprising, for example, a public line to transmit data to a host computer installed in a center after the data has been modulated by the modem 8 and to receive signals transmitted from the host computer after the signals have been demodulated by the modem 8.

Thus, when the credit card is inserted into the card reader 5, the signal processing section 2 transmits the identification information read out from the credit card to the host computer via the modem 8 and transmission line 9.

The automatic issuance machine 1 has the uninterruptive power supply 7 because, for example, a operation administrator who administrates the operation of the automatic issuance machine 1 may mistakenly turn off the power supply without executing any shutdown process (the preprocess for power turn-off). The uninterruptive power supply 7 notifies the signal processing section 2 that the power supply has been turned off, to allow it to carry out the shutdown process, thereby preventing a failure in a drive section for the hard disc 3.

When the power supply is turned off without executing any shutdown process, a magnetic head for data reads and writes may come in contact with the rotating hard disc 3 to damage it, thereby destroying programs recorded thereon. If in particular a storage area of the operating system is damaged, irrecoverable failure may occur; for example, the signal processing section 2 cannot start up the automatic issuance machine 1.

Consequently, even with the configuration shown in FIG. 1, the general configuration and maintenance work may be complicated due to the needs for the uninterruptive power supply 7 and the hard disc 3.

DISCLOSURE OF THE INVENTION

The present invention is achieved in light of these points, and it is an object thereof to provide an operation input processing apparatus and method that are much more reliable than the prior art and that have a much simpler and more convenient configuration and maintenance work.

To attain this object, the present invention provides an operation input processing apparatus 10 for executing processing depending on a user's operation input using a portion of plural first program data stored in a basic program storage section 21, the apparatus comprising a simulation device section 11 for extracting the portion of the program data from the basic program storage section 21 to create new second program data, process program distribution memory sections 12 (12A, 12B, 12C, . . . ) each removably connected to the simulation device section 11 to store the second program data created by the simulation device section 11, and operation input processing sections 13 (13A, 13B, 13C, . . . ) each having connected thereto a corresponding one of the process program distribution memory sections 12 (12A, 12B, 12C, . . . ) removed from the simulation device section 11 to store in first memory means 33C the second program data stored in the process program distribution memory section 12 (12A, 12B, 12C, . . . ) in order to execute the processing depending on the user's operation input using the second program data in the first memory means 33C.

The program data in the basic program storage section 21 can partly be extracted to create the new program data, which is then stored in the process program distribution memory sections 12 (12A, 12B, 12C, . . . ), and the process program distribution memory sections 12 (12A, 12B, 12C, . . . ) can each be connected to a corresponding one of the operation input processing sections 13 (13A, 13B, 13C, . . . ) so as to supply the stored new program data thereto. Consequently, an operation input processing apparatus 10 can be easily realized which enables the program data used by the operation input processing sections 13 (13A, 13B, 13C, . . . ) to be easily supplied from the basic program storage section 21 without destruction even if an abnormal condition occurs, for example, the power supply to the operation input processing sections 13 (13A, 13B, 13C, . . . ) are inadvertently turned off.

Furthermore, the present invention comprises simulation device means 41 operating when using first program data stored in a basic program storage section 41B to allow a testing operation input execution section 41C to perform a simulation operation, to extract from the first program data second program data used for the simulation operation, process program distribution memory means 42 (42A, 42B, 42C, . . . ) for storing as third program data the second program data extracted by the simulation device means 41, and operation input processing means 43 (43A, 43B, 43C, . . . ) for receiving the third program data from the process program distribution memory means 42 (42A, 42B, 42C, . . . ) as externally supplied data to drive and control the operation input execution section 63, in which when a user performs an input operation on the operation input processing means 43 (43A, 43B, 43C, . . . ), the first program data in the basic program storage section 41B is partly used to drive and control the operation input execution section 63.

The program data corresponding to the read command provided for the basic program storage section 41B is stored when the testing operation input execution section 41C is allowed to perform the simulation operation so that the first program data stored in the basic program storage section 41B can be partly extracted and supplied to the operation input processing means 43 (43A, 43B, 43C, . . . ) via the process program distribution memory means 42 as externally supplied data. The program data in the basic program storage section 41B can thereby be simply and safely supplied to the plurality of operation input processing means 43 (43A, 43B, 43C, . . . ) without damage to the program data in the basic program storage section 11B.

As a result, the operation input processing means 43 (43A, 43B, 43C, . . . ) can modify the program data and can be easily used by the user.

Still further, the present invention comprises initializing an access date for first program data stored in basic program storage means 71B, to one different from a test execution date, operating when the first program data is partly used to operate a test execution means 71C, to rewrite an access date for second program data of the first program data in the basic program storage means 71B which second program data has been used for a test operation, to the test execution date, copying the second program data of the first program data in the basic program storage means 71B for which second program data the access date is the same as the test execution date, to a process program distribution memory means 72 as third program data, allowing operation input processing means 73 to receive the third program data from the process program distribution memory means 72 as externally supplied program data, and when a user operates the operation input processing means 73 for input, allowing the operation input processing means 73 to execute the externally supplied program data to drive and control an operation input execution section 83.

In extracting the second program data from the first program data in the basic program storage section 71B, the second program data being used to drive and control the operation input execution means 83, the access date for the first program data is initialized to one different from the test execution date, thereby allowing the second program data to be extracted easily.

Further yet, the present invention comprises the steps of: allowing, in a test execution processing section 91A comprising a personal computer, test execution means 91C to operate using second program data comprising part of first program data stored in basic program storage means 91B; using the test execution processing section 91A to create inside the personal computer an access determination table 91F representing a first address of that memory area of the basic program storage section 91B in which the second program date are stored in a manner such that the first address is differentiated from other second addresses; copying second program date with the first address from the basic program storage means 91B to process program distribution memory means 92 as third program data, based on contents of the access determination table 91F; and inputting the third program data from the process program distribution memory means 92 to an operation input processing means 93 as externally supplied program data, in which, the operation input process means executes the externally supplied program data to drive and control an operation input execution section 103 when a user operates the operation input processing means 93 for input.

In extracting from the first program data in the basic program storage means 91B the second program data required to drive and control the operation input execution means 103, the access determination table 91F is created inside the test execution processing means 91A comprising the personal computer and the second program data are extracted based on the access determination table 91F, thereby allowing the second program data to be easily extracted.

BRIEF DESCRIPTION OF DRAWINGS

FIG. 7 is a schematic diagram showing the configuration of a route directory in a basic program storage section 21 in FIG. 2.

FIG. 8 is a schematic diagram showing the configuration of a subdirectory DIRA in the basic program storage section 21 in FIG. 2.

FIG. 9 is a schematic diagram showing the configuration of a subdirectory DIRB in the basic program storage section 21 in FIG. 2.

FIG. 11 is a schematic diagram showing the configuration of a route directory in a working file memory 23E in FIG. 10.

FIG. 12 is a schematic diagram showing the configuration of a subdirectory in the working file memory 23E in FIG. 10.

FIG. 23 is a schematic diagram showing the configuration of a route directory in a working file memory 41G in FIG. 17.

FIG. 24 is a schematic diagram showing the configuration of a subdirectory DIRA in the working file memory 41G in FIG. 17.

FIG. 25 is a schematic diagram showing the configuration of a subdirectory DIRB in the working file memory 41G in FIG. 17.

FIG. 29 is a schematic diagram showing the stored contents of the working file memory 41G in FIG. 17.

FIG. 44 is a schematic diagram showing the contents of a route directory in FIG. 43.

FIG. 45 is a schematic diagram showing the contents of a subdirectory DIRA in FIG. 43.

FIG. 46 is a schematic diagram showing the contents of a subdirectory DIRB in FIG. 43.

FIG. 55 is a schematic diagram showing the contents of a route directory in FIG. 54.

FIG. 56 is a schematic diagram showing a contents of a subdirectory DIRA in FIG. 54.

FIG. 57 is a schematic diagram showing a contents of a subdirectory DIRB in FIG. 54.

BEST MODE FOR CARRYING OUT THE INVENTION

Figure 2:
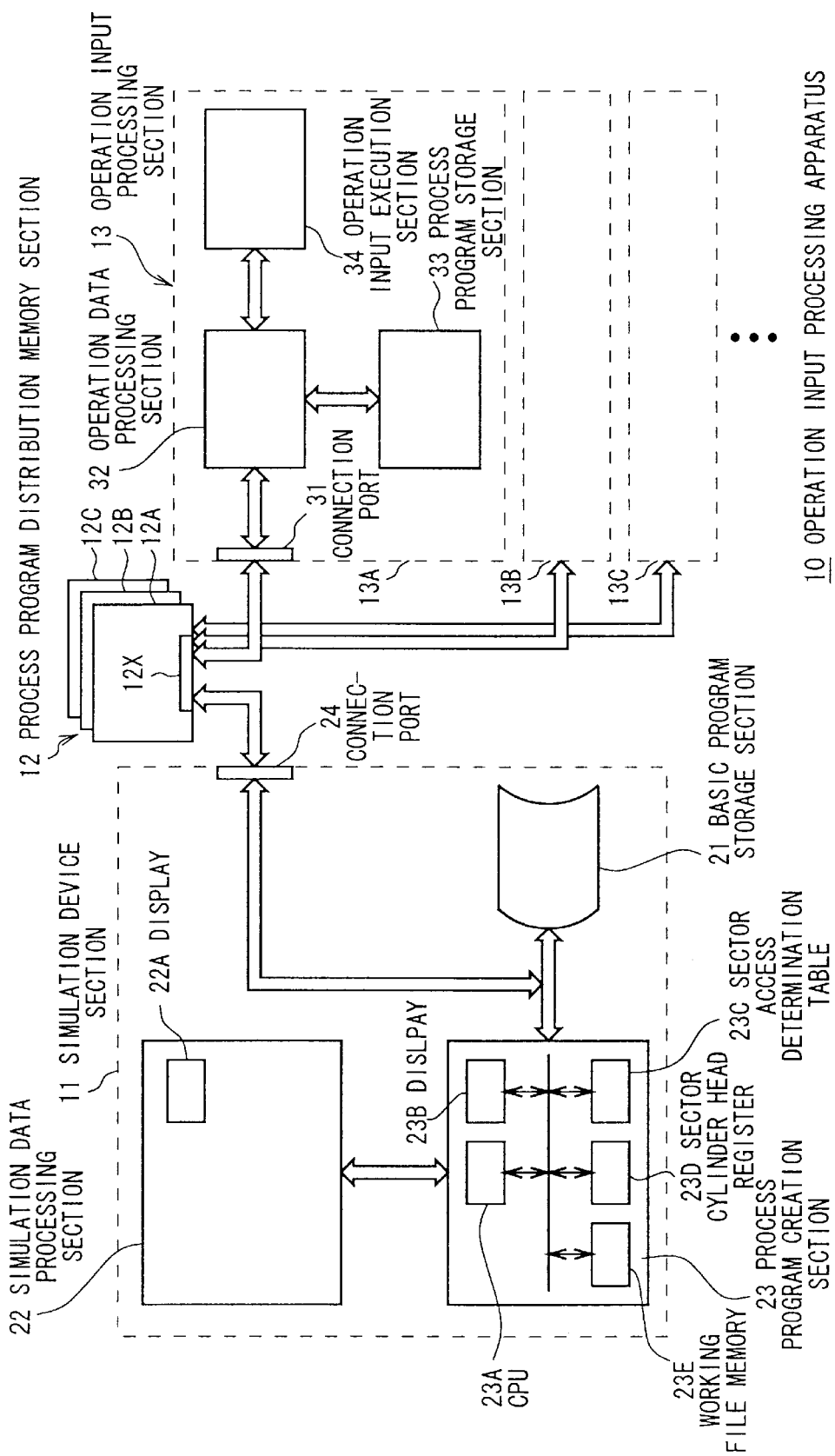
FIG. 2 is a schematic connection diagram showing an operation input processing apparatus 10 according to the first embodiment.

[1] First Embodiment
(1) Entire Configuration of Operation Input Processing Apparatus FIG. 2 shows the first embodiment according to the present invention. In FIG. 2, reference numeral 10 generally denotes an operation input processing apparatus comprising an automatic issuance machine for issuing, for example, tickets for concerts, and has a simulation device section 11, a process program distribution memory section 12, and an operation input processing section 13.

The simulation device section 11 extracts files comprising program data required to start up the operation input processing section 13 and allow it to perform operations, based on an operating system program and application program stored in a basic program storage section 21 comprising a hard disc, and provides a command for the basic program storage section 21 via a process program creation section 23, the command being input by a simulation data processing section 22 comprising a personal computer, thereby starting and operating an operating system (OS) program and application program required to start up and operate the operation input processing section 13.

In addition to the operating system (OS) program, the basic program storage section 21 has a large number of application programs stored in a storage medium for executing various data process operations as standard mounting, the storage medium comprising, for example, a hard disc so that the stored operating system (OS) program and application program are partly supplied to the operation input processing section 13 to allow it to perform processing operations defined by these programs.

(2) Simulation Device Section

Figure 3:
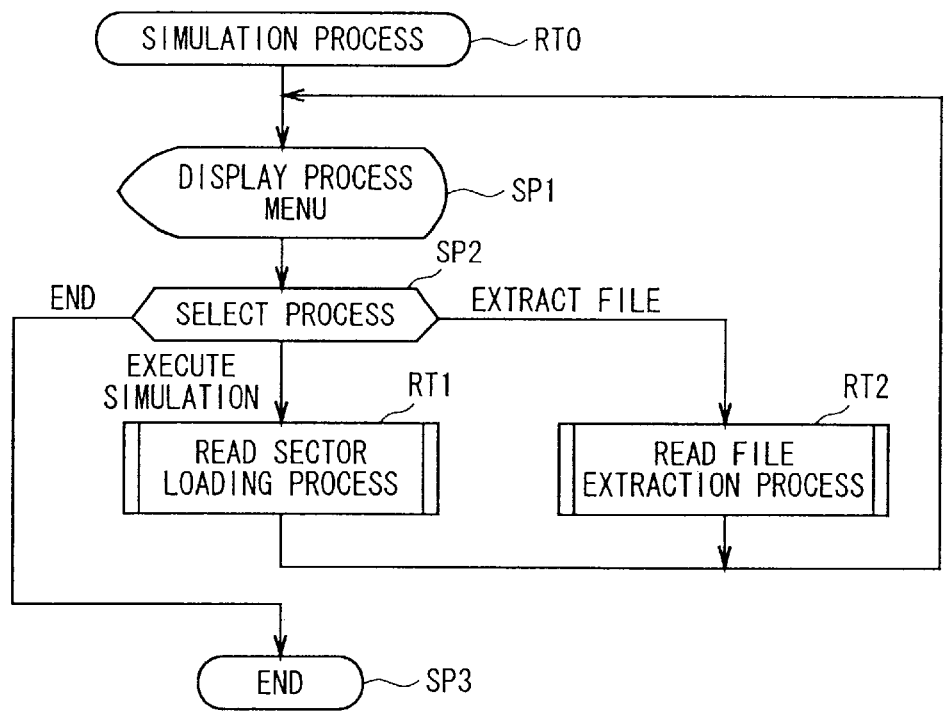
FIG. 3 is a flowchart showing a simulation process routine executed by a simulation device section 11 in FIG. 2.

The process program creation section 23 of the simulation device section 11 comprises a personal computer having its central processing unit (CPU) 23A execute a simulation process procedure RT0, shown in FIG. 3, in response to a user's input operation on a display 23B having a touch panel function, thereby extracting programs from the basic program storage section 21.

On entering the simulation process procedure RT0, the CPU 23A reads process menu data from the basic program storage section 21 to display it on a display 23B and on a display 22A of a simulation data processing section 22 at step SP1, and then waits for a user to select either an operating menu or an application menu in accordance with the process menu at step SP2.

When the user selects either the operating system menu or the application menu in accordance at step SP2, the CPU 23A allows a read sector loading process subroutine RT1 to execute its processing and then returns to step SP1.

Figure 4:
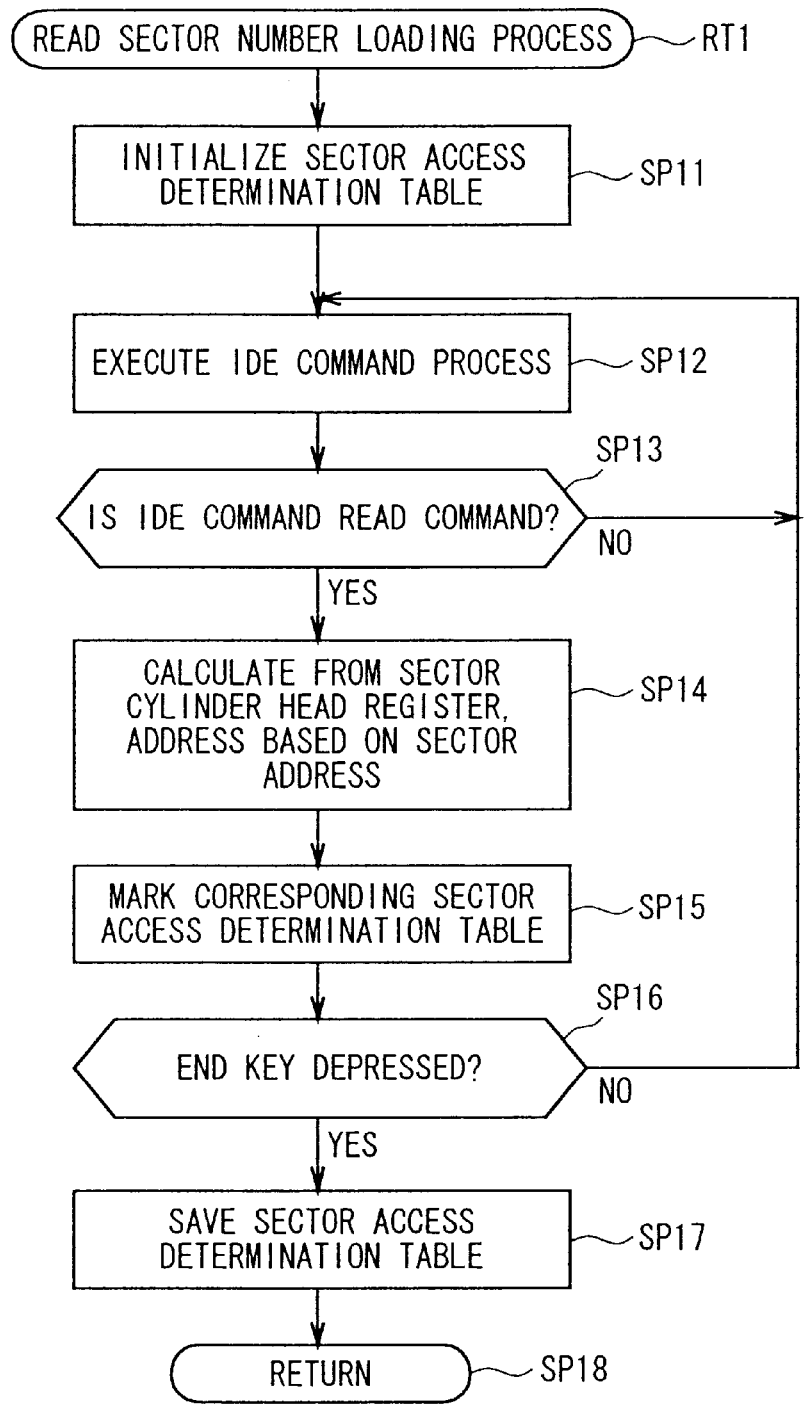
FIG. 4 is a flowchart showing the details of a read sector loading process subroutine RT1 in FIG. 2.

In the read sector loading process subroutine RT1, the CPU 23A initializes a sector access determination table 23C at step SP11 as shown in FIG. 4.

Figure 5:
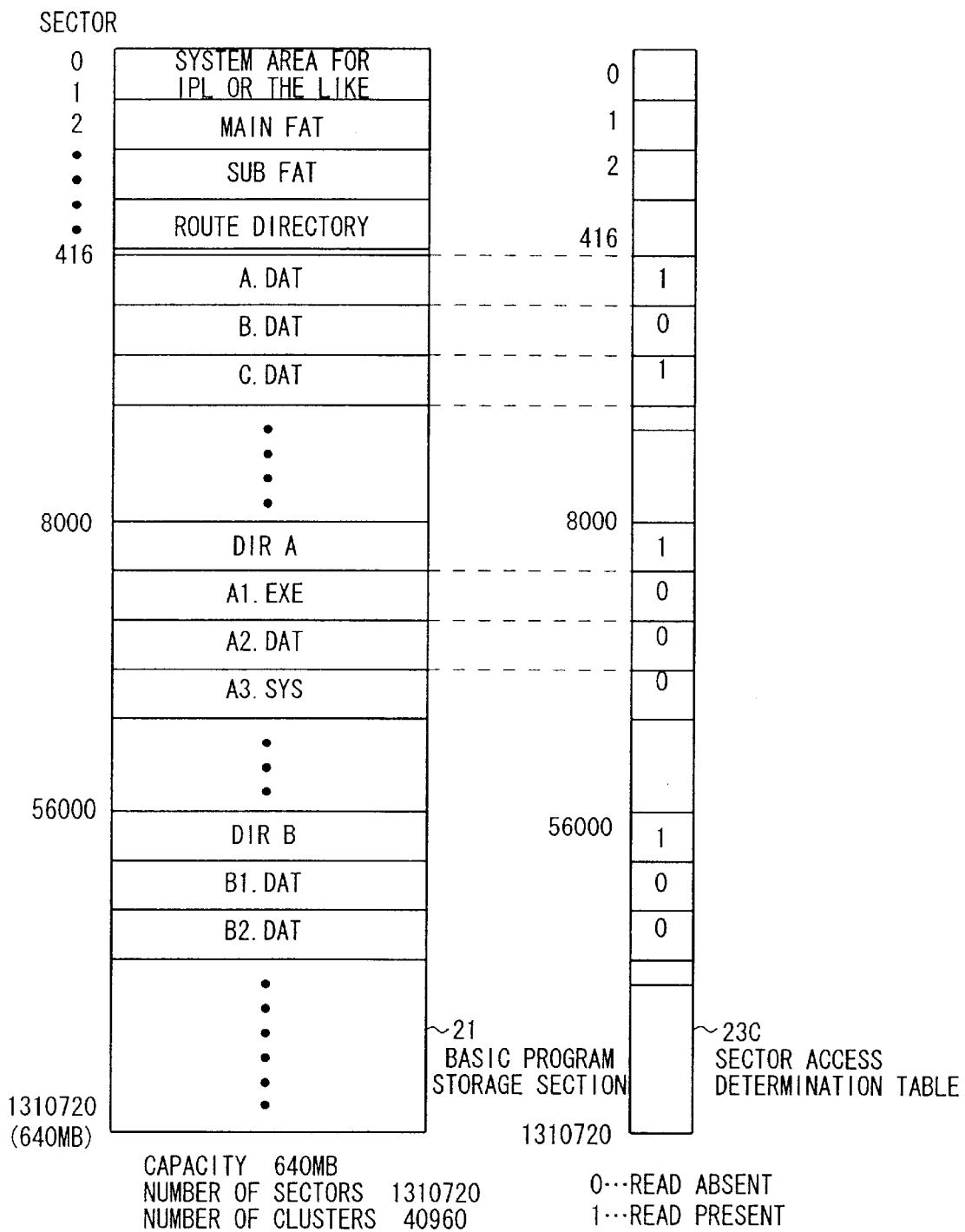
FIG. 5 is a schematic diagram showing the configuration of a sector access determination table 23C in FIG. 2.

As shown in FIG. 5, the sector access determination table 23C has a large number of memory areas each comprising one bit and corresponding to all unit memory area addresses (in this embodiment, sector numbers of a hard disc) of the basic program storage section 21, so as to store logical "1" (read present) flag data when a unit memory area has been read out from the basic program storage section 21 and to store logical "0" (read absent) flag data when the unit memory area has not been read out.

In case of this embodiment, the basic program storage section 21 comprises a 640-MB hard disc as a storage medium to store each storage unit data including system and file data in an area with sector numbers "0" to "1,310,720." Thus, the sector access determination table 23A has memory areas with address numbers "0" to "1,310,720" corresponding to the sector numbers "0" to "1,310,720" of the basic program storage section 21.

In addition, the basic program storage section 21 is constructed to allow a user to specify memory areas within the sector numbers "0" to "1,310,720," which include sectors each comprising 512 [B] as well as 40,960 clusters (one cluster=4 sectors).

Thus, the CPU 23A initializes the sector access determination table 23C at step SP11 (FIG. 4) to initialize all the memory areas at the addresses "0" to "1,310,720" to logical "0."

Once this initialization process has been completed, the CPU 23A executes the process of obtaining IDE commands (that indicate a read from or a write to a hard disc or other processes) from program data read from those memory addresses (sector numbers) of the basic program storage section 21 which correspond to the process menu (step SP2 in FIG. 3) selected at step SP12.

At the subsequent step SP13, each time the CPU 23A obtains the IDE command (SP12), it determines whether or not it is a read command. When a negative result is obtained (this means that this is not a command for reading program data from the basic program storage section 21), the CPU returns to the above described step SP12 to execute the process of obtaining the next IDE command.

On the contrary, when an affirmative result is obtained (this means that a command for reading program data from the basic program storage section 21 has been obtained), the CPU 23A calculates memory locations (sector numbers) where data with names of files to be read are stored, based on the sector numbers, cylinder numbers, and drive head numbers in a sector cylinder head register 23D of the process program creation section 23 at step SP14.

Subsequently, the CPU 23A shifts to step SP15 to write the logical "1" flag in the memory areas with the calculated sector numbers of the sector access determination table 23C, so that the sector numbers for that part of the program data in the basic program storage section 21 which is to be read by the read command are saved to the sector access determination table 23A.

Subsequently, the CPU 23A determines at the next step SP16 whether an end key has been depressed. When a negative result is obtained (this means that the user's selection for the process menu has not been completed), the CPU 23A returns to the above described step SP 12 to repeat the processing for the next IDE command.

On the contrary, when an affirmative result is obtained (this means that the processing for the IDE command associated with the process menu specified by the user has been completed) at step SP16, the CPU 23A stores the sector access determination table 23C and then ends the read sector loading process subroutine at step S18 to return to the simulation process routine RT0 (FIG. 3)

In the simulation process routine RT0 in FIG. 2, the CPU 23A returns to the above described step SP1 to display the process menu on the display 23B and on the display 22A of the simulation data processing section 22 and wait for the user to perform a selection operation at step SP2.

In contrast, at step SP2, when the user selects a file extraction process, the CPU 23A enters a read file extraction process subroutine RT2.

Figure 6:
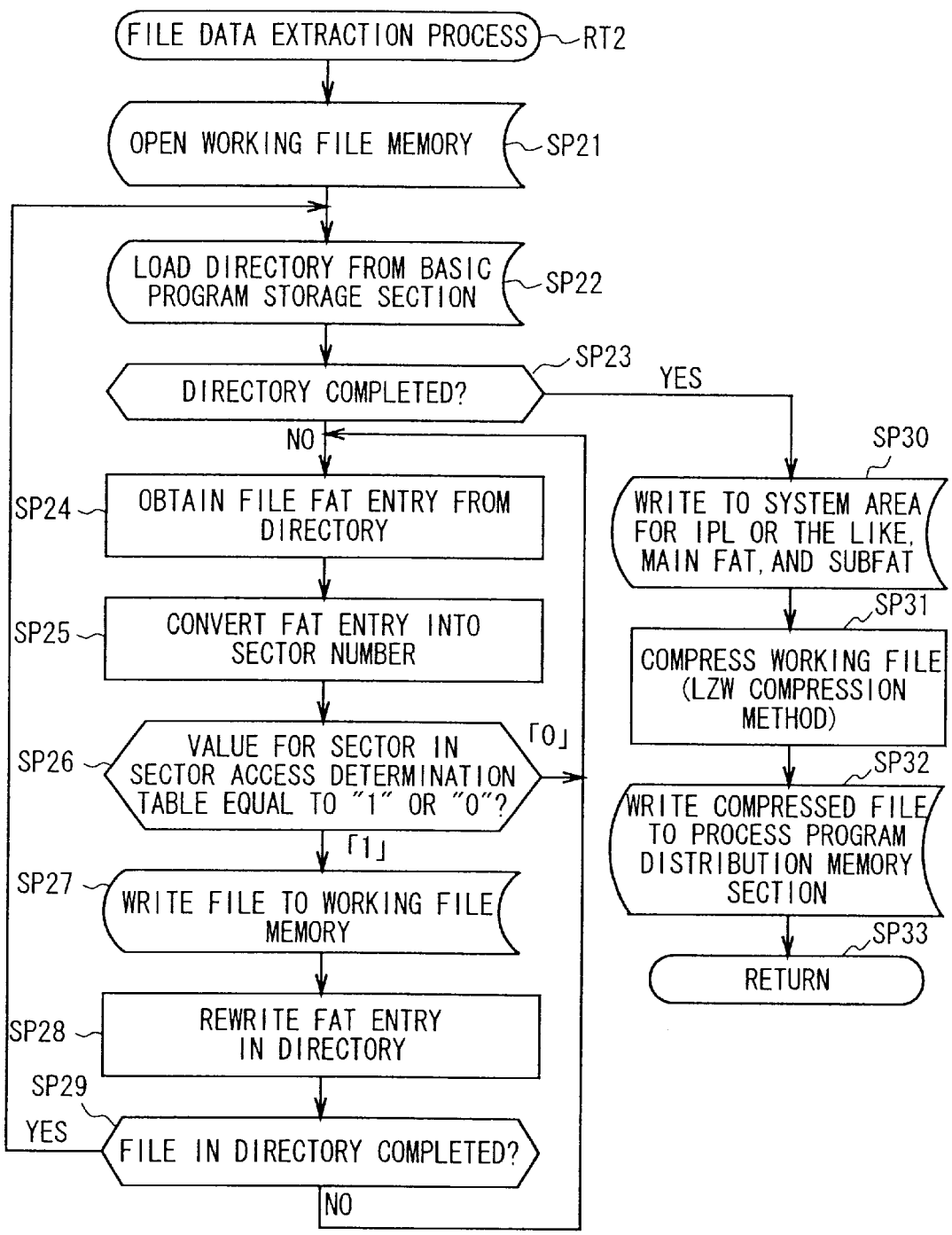
FIG. 6 is a flowchart showing the details of a read file extraction process subroutine RT2 in FIG. 3.

In the read file extraction process subroutine RT2, the CPU 23A opens a working file memory 23E in the process program creation section 23 at step SP21 as shown in FIG. 6, and then loads a directory from the basic program storage section 21 at step SP22.

According to this embodiment, the basic program storage section 21 has a system area for an initial program loader (IPL), a main file allocation table (main FAT: File Allocation Table), a subfile allocation table (subFAT), and a root directory all stored in memory areas with sector numbers "0" to "415," as shown in FIG. 5.

In addition, program data with file names A.DAT, B.DAT, C.DAT, . . . are stored in memory areas with sector numbers "416" to "7,999."

Further, a subdirectory DIPA and program data with file names A1.EXE, A2.DAT, A3.SYS, . . . are stored in memory areas having a sector number "8,000" as a leading address.

Furthermore, a subdirectory DIRB and program data with file names B1.DAT, B2.DAT, . . . are stored in memory areas having a sector number "56,000" as a leading address.

The initial program loader (ITL) is program data for starting up a processing operation based on program data from the basic program storage section 21.

In addition, the main file allocation table (main FAT) and the subfile allocation table (subFAT) are data for managing the memory areas (that is, the sectors) on the hard disc in the basic program storage section 21.

Furthermore, as shown in FIG. 7, the route directory has sequentially described therein the "file names" A.DAT, B.DAT, C.DAT, . . . stored in the data storage area having the sector number "416" as a leading address, addresses (that is, "FAT entries") of the subdirectory DIRA, that is, "2," "4," "6," . . . , "file sizes" "18,000," "24,000," "16,000," . . . , and "other information." Thus, the file names A.DAT, B.DAT, C.DAT, . . . and the program data names for the files in the subdirectory DIRA can be accessed as addresses based on a cluster address classification.

As shown in FIG. 8, the subdirectory DIRA similarly has described therein the "file names" A1.EXE, B2.DAT, and A3.SYS stored in the memory areas having the sector number "8,000" as a leading address, "FAT entries" comprising cluster addresses at which the files in the subdirectory DIRB are present, "file sizes," and "other information," thereby enabling accesses to the program data stored in these memory areas.

Furthermore, as shown in FIG. 9, the subdirectory DITB similarly has described therein the "file names" B1.DAT and B2.DAT stored in the memory areas having the sector number "56,000" as a leading address, "FAT entries" comprising cluster addresses at which the corresponding files are present, "file sizes," and "other information," thereby enabling accesses to the program data stored in these memory areas.

Based on this memory configuration of the basic program storage section 21, the CPU 23A loads the route directory (FIG. 7) from the basic program storage section 21 as system data at step SP22 of the read file extraction process subroutine RT2 (FIG. 6) and then determines at the next step SP23 whether or not all of the directory has been loaded. When a negative result is obtained (this means that the subdirectories DIRA and DIRB are present), the CPU 23A shifts to step SP24 to obtain the "FAT entries" for the "filenames" A.DAT, B.DAT, C.DAT, . . . from the route directory.

Subsequently, at step SP25, the CPU 23A converts the "FAT entries" comprising cluster addresses to describe the locations at which the files are present, into sector numbers.

Subsequently, at step SP26, the CPU 23A uses the sector numbers obtained through the conversion process to determine whether the flag data stored in those memory areas in the sector access determination table 23C that have the same sector numbers each have a value of logical "1" or "0."

If the result of the determination is the logical "1," this means that the files with these sector numbers have been read out by the IDE command during the read sector loading subroutine RT1 (FIG. 4). Then, the CPU 23A shifts to step SP27 to read these files from the basic program storage section 21 and write them to the working file 23E.

Figure 10:
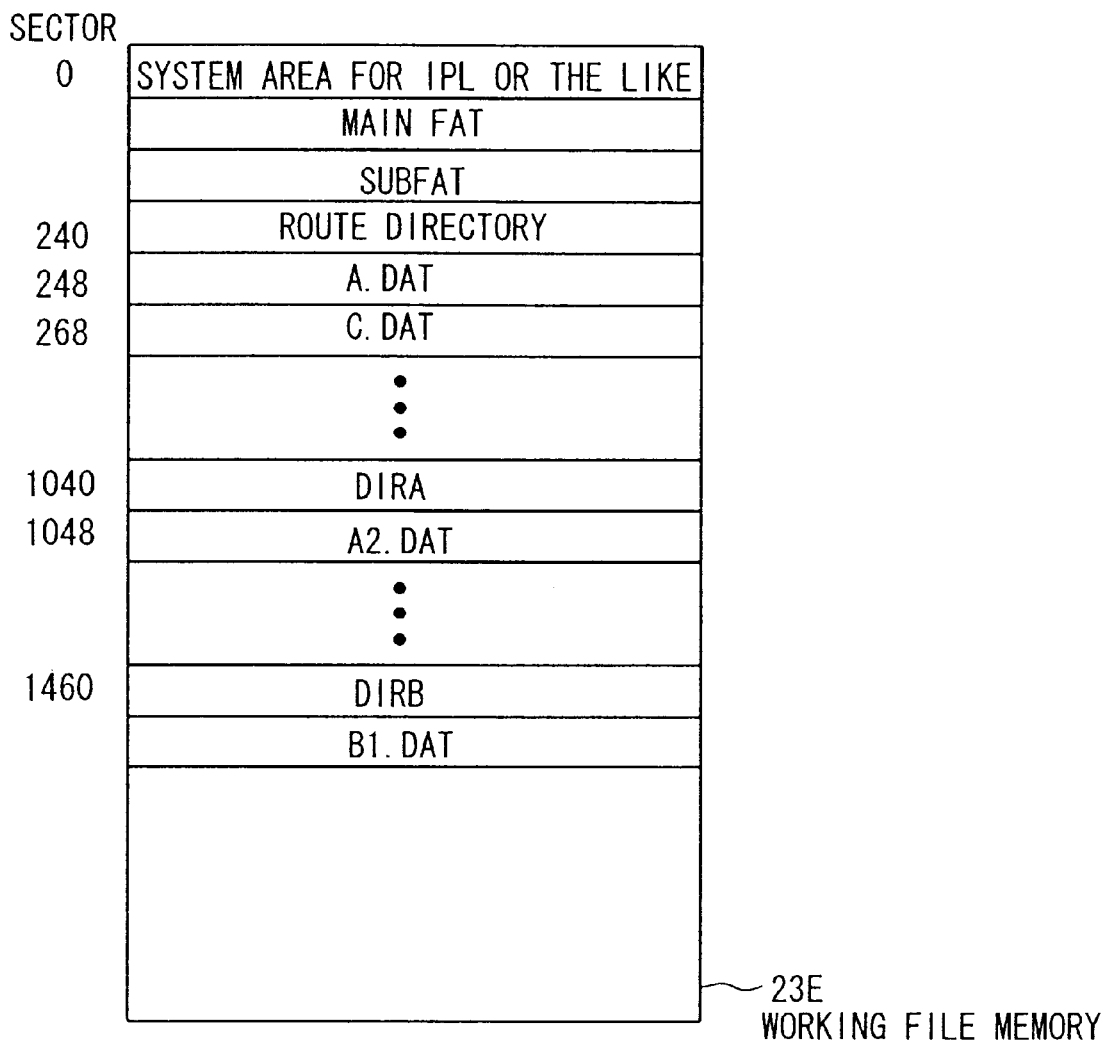
FIG. 10 is a schematic diagram showing the configuration of a working file memory 23E in FIG. 2.

In this embodiment, as shown in FIG. 10, the working file memory 23E is configured to have a capacity of 32 MB, 65,536 sectors, and 16,384 clusters, and 4 sectors per cluster, and has the system area for the initial program loader IPL, the main file allotment table (main FAT), the subfile allotment table (subFAT), and the route directory stored therein between the sector number "0" and the sector number "240."

In this embodiment, the main FAT and subFAT of the working file memory 23E create the file allotment tables FAT for managing the unit storage areas in the data area, in the same manner as the basic program storage section 21, and the program data stored in the system area for the initial program loader IPL or the like of the basic program storage section 21 are copied to the system area for the initial program loader IPL or the like of the working file memory 23E without change.

In contrast, the file names A.DAT, C.DAT, . . . read out from the basic program storage section 21 by the read sector loading process subroutine RT1 (FIG. 4) are written to the route directory of the working file memory 23E in such a manner that no free sector number remains (including the case where no space or no large space remains), as shown in FIG. 11.

Since the storage locations of the file data have been changed so as to eliminate spaces in the above manner, the CPU 23A changes the address of each file data in the route directory (FIG. 7) of the basic program storage section 21 to a new one (that is, cluster address FAT entries) for the working file memory 23E at step SP26 (FIG. 6).

Subsequently to the route directory, the cluster address FAT entries in the subdirectories DIRA (FIG. 11) and DIRB (FIG. 12) indicating addresses where the files of the route directory are present are also rewritten when the data are read from these subdirectories.

The CPU 23A subsequently advances to step SP29 in FIG. 6 to determine whether or not all the files of the route directory (or the subdirectory) have been written to the working file memory 23E. When a negative result is obtained, the CPU returns to the above described step SP24 to write the remaining files to the working file memory 23E.

In addition, when determining at step SP26 that the sector has a value of logical "0" in the sector access determination table 23 (this means that the file in this sector has not been loaded from the basic program storage section 21 during the read sector loading subroutine RT1 (FIG. 4)), the CPU 23A returns to the above described step SP24 to repeat the processing for the next file.

Once all the files in the route directory (or the subdirectory) have been processed, the CPU 23A obtains an affirmative result at step SP29 to return to the above described step SP22 to write the files to a new subdirectory.

In this manner, those of the files described in the route directory and subdirectories DIRA and DIRB of the basic program storage section 21 for which the logical "1" determination flag has been written to the corresponding sector number in the sector access determination table 23C, the CPU 23A reads the program data from the basic program storage section 21 and writes them to the data memory areas of the working file memory 23E so as to eliminate free sector numbers.

Once all the directories have been processed, the CPU 23A obtains an affirmative result at step SP23 and proceeds to step SP30.

Then, the CPU 23A writes required data to the system area for the initial program loader IPL or the like and to the main FAT and subFAT at step SP30, subsequently uses the LZW compression method to compress the data stored in the working file memory 23E at step SP31, and then writes the compressed data to the process program distribution memory section 12 connected to a connection port 24 (FIG. 2) and comprising a compact flash memory at step SP32.

Thus, the CPU 23A completes the read file extraction process subroutine RT2 and returns to the simulation process routine RT0 (FIG. 3) at step SP33.

In this case, the CPU 23A confirms that the user performs an end operation at the process selection step SP2 of the simulation process routine RT0 in FIG. 3, and then completes the simulation process routine at step SP3.

In fact, in the process executed by the simulation process routine RT0 (FIG. 3), when there are a plurality of operation input processing sections 13, connection ports 12X of plural process program distribution memory sections 12 (12A, 12B, 12C, . . . ) corresponding to the plurality of operation input processing sections 13 (13A, 13B, 13C, . . . ) are connected to a connection port 24 of the simulation device section 11 to repeat writing the program data.

This enables the simulation device section 13 to create the plurality of process program distribution memory sections 12 (12A, 12B, 12C, . . . ), which are each distributed to a corresponding one of the large number of operation input processing sections 13 (13A, 13B, 13C, . . .).

When the connection port 12X of each process program distribution memory section 12 (12A, 12B, 12C, . . . ) is connected to a connection port 31 of the corresponding operation input processing section 13 (13A, 13B, 13C, . . . ), each process program distribution memory section 12 (12A, 12B, 12C, . . . ) is connected to the corresponding operation data processing section 32 comprising a personal computer. Thus, the program data stored in the process program distribution memory section 12 (12A, 12B, 12C, . . . ) connected to the operation data processing section 32 are loaded in the processing program storage section 33 so that the operation input execution section 34 operating as an automatic issuance machine is driven and controlled based on the loaded data.

Figure 13:
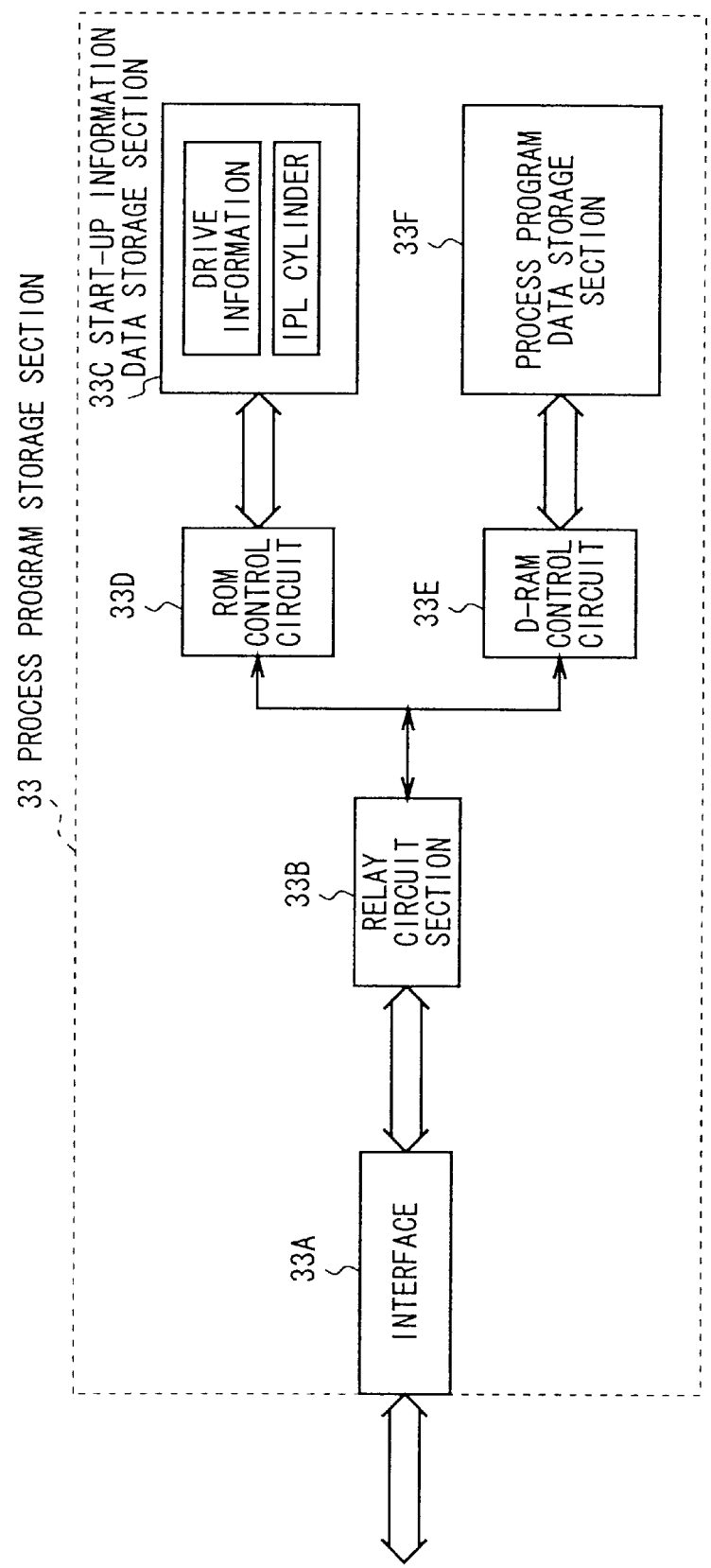
FIG. 13 is a schematic connection diagram showing the detailed configuration of a process program storage section 33 in FIG. 2.

In the process program storage section 33, a relay circuit section 33B comprising a group of registers and a connection circuit uses hardware circuit elements to apply a relay process to information such as commands and data transmitted to and from the operation data processing section 32 via an interface 33A, as shown in FIG. 13.

The process program storage section 33 has a starting information data storage section 33C comprising a read only memory where the initial program loader IPL for executing a processing operation for copying data from the process program distribution memory section 12 is stored at a cylinder address 0 representing a leading address and where drive information read out by the process program loader IPL are stored in the data memory areas.

Figure 14:
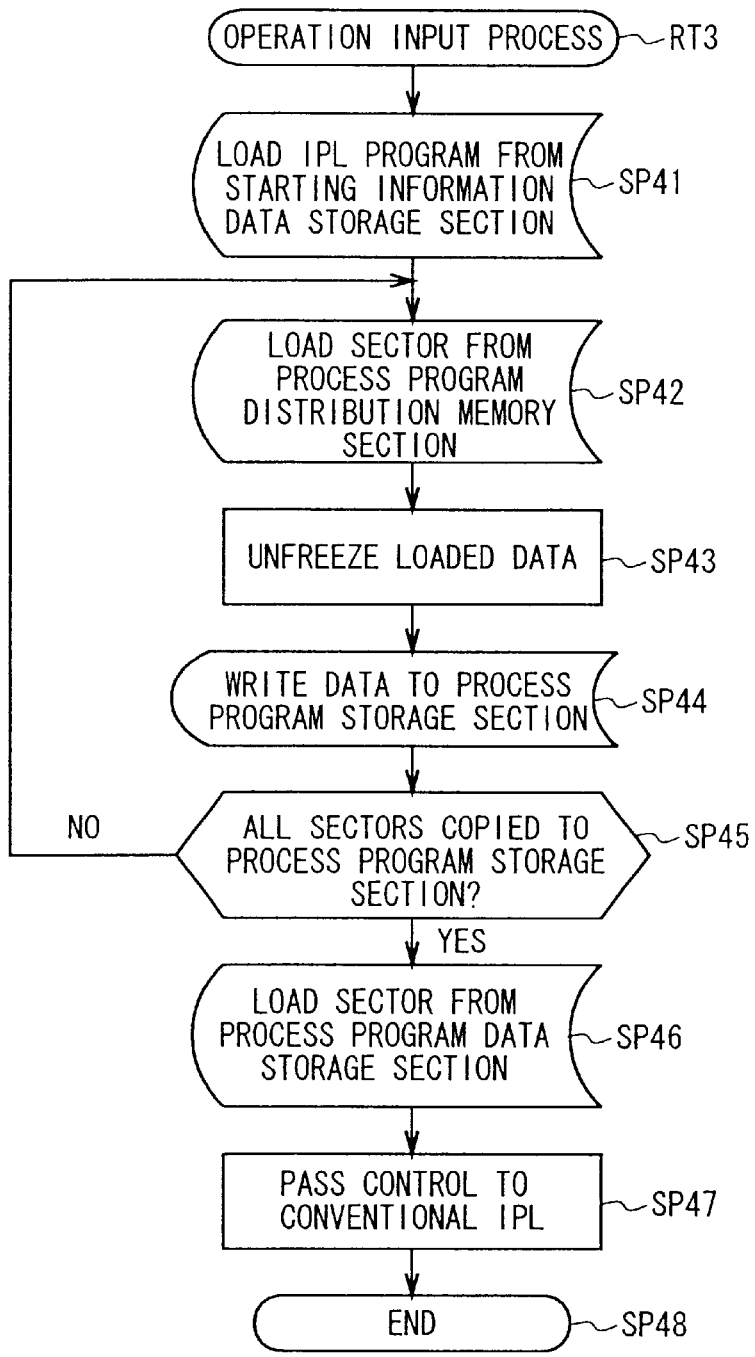
FIG. 14 is a flowchart showing an operation input process routine.

When a read signal from the operation data processing section 32 comprising a personal computer arrives at a ROM control circuit 33D via the interface 33A and the relay circuit section 33B, the initial program loader IPL stored in the starting information data storage section 33C at the cylinder 0 and the drive information also stored in the starting information data storage section 33C are read out in the operation data processing section 32 via the ROM control circuit 33D, the relay circuit section 33B, and the interface 33A as starting information. The operation data processing section 32 uses this starting information to read the process program data stored in the process program distribution memory section 12 connected to the connection port 31 and executes an operation input process routine RT3, shown in FIG. 14, to enter subsequent processing operations.

In the operation input process routine RT3, the operation data processing section 32 loads the initial program loader IPL and the drive information from the starting information data storage section 33C as the starting information at step SP41, and then uses the program data contained in the starting information to execute a process of sequentially loading the process program data from the process program distribution memory section 12 connected to the connection port 31, starting with the sector 0.

The loaded process program data has been compressed, at the simulation device section 11, so that the operation data processing section 32 reversely compress the loaded data for unfreezing at step SP43, and then writes them to the process program storage section 33 at step SP44.

In this embodiment, when process program data is transferred from the operation data processing section 32, the process program storage section 33 passes the data to a D-RAM control circuit 33E via the interface 33A and the relay circuit section 33B in this order and stores the data in a process program data storage section 33F comprising a dynamic random access memory.

Once one sector of process program data have been stored in the process program data storage section 33F, the operation data processing section 32 determines at step SP45 whether or not the process program data in all the sectors have been transferred and copied to the process program storage section 33F. When a negative result is obtained, the process returns to the above described step SP42 to execute the process of loading the process program from the next sector of the process program distribution memory section 12 for unfreezing and transfer.

Once the process programs in all the sectors have been transferred, the operation data processing section 32 obtains an affirmative result at step SP45 to advance to the next step SP46.

Thus, the uncompressed process programs formed in the working file memory 23E of the process program creation section 23 of the simulation device section 11 as described above for FIG. 10 have been copied to the process program data storage section 33F. As a result, the system area for the IPL or the like, the main FAT, the subFAT, and the route directory are sequentially stored in sectors starting with the memory area in the sector 0. File numbers A.DAT, C.DAT, . . . the subdirectory DIRA are then sequentially stored in the data areas so as to be eliminate spaces from the memory areas, and the file data A2.DAT, . . . the subdirectory DIRB, the file data B1.DAT are stored.

Under these conditions, at step SP46, the operation data processing section 32 accesses the process program data stored in the process program data storage section 33F, starting with the sector address 0 and then loads the data therein via the D-RAM control circuit 33E, the relay circuit section 33B, and the interface 33A. The operation data processing section 32 then uses the process program data to start up an operation control process operation for the operation input execution section 34, subsequently uses the initial program loader IPL stored in the process program data storage section 33F to continue operation input control in accordance with this program at step SP47, and then completes the operation input process routine at step SP48.

In this configuration, when a plurality of operating system programs and application programs stored in the basic program storage section 21 are partly used as an operating system program and application program required for the operation input processing section 13, the user carries out simulation by operating the simulation data processing section 22 comprising a personal computer to supply a required portion of the program data in the basic program storage section 21 to allow the operation input execution section 34 to perform an operation.

In this case, the simulation device section 11 reads out data on required file names by specifying program data using the route directory and subdirectories stored in the basic program storage section 21.

The simulation device section 11 writes a determination flag of logical "1" or "0" to memory areas with sector numbers that are the same as those in the basic program storage section 21 to hold in the sector access determination table 23A file data read out by the user's simulation operation.

Once all the program data required to operate the operation input execution section 34 of the operation input processing section 13 have been read from the basic program storage section 21, the read file data are accumulated in the sector access determination table 23 as a collection of addresses (that is, sector numbers) of unit storage areas of the basic program storage section 21.

The accumulated address information is used when the CPU 23A of the process program creation section 23 of the simulation device section 11 executes the read file execution process subroutine RT2 (FIG. 6) based on the user's operation to read out in the working file memory 23E file data stored in the basic program storage section 21. As a result, required file data are extracted.

In this case, in loading file data in the working file memory 23E, required file data can be sufficiently extracted without losses by specifying addresses in such a manner that no free address exists between the file data, even if a small capacity of memory means is used as the working file memory 23E.

Thus, the program data stored in the working file memory 23E are compressed and then shifted to the process program distribution memory section 12 connected to the connection port 24 of the simulation device section 11.

The compressed program data can be stored, as high-density data, in the plurality of process program distribution memory sections 12 (12A, 12B, 12C, . . . ) that can be removed from the connection port 24 of the simulation device section 11, and is thus distributed to the plurality of operation input processing sections 13 (13A, 13B, 13C, . . . ) as program data for controlling the corresponding operation input execution sections 34.

(3) Operation Input Processing Sections

The plurality of operation input processing sections 13 (13A, 13B, 13C, . . . ), each having the corresponding process program distribution memory section 12 (12A, 12B, 12C, . . . ) connected to its connection port 31, execute the operation input process routine RT3 (FIG. 14) to load in the process program storage section 33 program data stored in the process program distribution memory section 12 when the user inputs operation input data by using the operation data processing section 32 incorporated in the operation input processing section 13 and comprising a personal computer.

In executing the operation input process routine RT3, the starting information data (that is, the initial program data IPL) for loading program data from the process program distribution memory section 12 to the starting information data storage section 33C (FIG. 13) of the process program storage section 33 is fixedly stored. Consequently, by simply copying program data between the process program storage section 33 and the process program distribution memory section 12, the program data in the process program distribution memory section 12 are stored in the process program storage section 33 and can be used to execute subsequent processing operations.

Thus, the operation data processing section 32 of the operation input processing section 13 (13A, 13B, 13C, . . . ) drives the operation input execution section 34 constituting an issuance machine, using the program data copied to the process program data storage section 33 of the process program storage section 33 and not the program data stored in the process program distribution memory section 12 (12A, 12B, 12C, . . . ) connected to the connection port 31.

In this manner, while the operation input execution section 34 is performing an issuance operation, the program data in the process program distribution memory section 12 (12A, 12B, 12C, . . . ) connected to the connection port 31 of the operation input processing section 13 (13A, 13B, 13C, . . . ) are not used. Consequently, even if the operation input processing section 13 (13A, 13B, 13C, . . . ) performs such an improper operation as to destroy program data in the process program data storage section 33F of the process program storage section 33 (that is, when an unexpected situation occurs, for example, the power supply is turned off without executing the shut down process the operation input processing section 13 (13A, 13B, 13C, . . . )), the data stored in the process program distribution memory section 12 (12A, 12B, 12C, . . . ) connected to the connection port 31 can be maintained without destruction, so that the operation input execution section 34 can subsequently be normally operated simply by executing the operation input process routine RT3 again.

(4) Effects of Operation Input Processing Apparatus

In the above configuration, the simulation device section 11 stores part of the program data stored in the basic program storage section 21, in the process program distribution memory section 12 removably connected to the simulation device section 11, and the process program distribution memory section 12 is connected to the operation input processing section 13 to copy the program data to the process program storage section 33 so that the copied program data can be used to control the operation input execution section 34. As a result, the operation input processing section 34 can be controlled more stably without destroying the program data in the process program distribution memory section 12.

Thus, the hardware circuit elements comprising the interface 33A, the relay circuit section 33B, the ROM control circuit 33D, and the DRAM control circuit 33E are used as means for allowing the process program storage section 33 to communicate with the operation data processing section 32 comprising a personal computer, as shown in FIG. 13. As a result, the configuration of the process program storage section 33 can further be simplified.

Although computer elements having arithmetic functions must generally be included to record data in the process program data storage section 33F comprising a D-RAM while controlling address numbers, the configuration in FIG. 13 requires only copying for transferring data from the starting information data storage section 33C or to the process program data storage section 33F. Consequently, passive elements such as the interface 33A and the relay circuit section 33B can be used as included elements.

(5) Other Embodiments

Although the above first embodiment has been described in conjunction with the processing program distribution memory section 12 comprising a compact flash memory that is a semiconductor storage medium of a small capacity, the process program distribution memory section 12 is not limited to this but effects similar to those described above can be obtained using a storage medium such as a CD-ROM having a large capacity and a mechanical mechanism.

Even if the process program distribution memory section 12 comprises a CD-ROM, once the program data stored in the CD-ROM has been copied to the process program storage section 33, the process program distribution memory section 12 is operated in the same manner as when the CD-ROM is disconnected. Accordingly, even if the power supply is turned off without shutting down the operation input processing section 13, the storage medium of the CD-ROM is prevented from being damaged.

In addition, in the above first embodiment, the process program distribution memory section 12 is removably connected to the operation input processing section 13 via the connection port 31 instead of this, but effects similar to those described above can be obtained by fixedly connecting the process program distribution memory section 12 to the operation input processing section 13.

Figure 15:
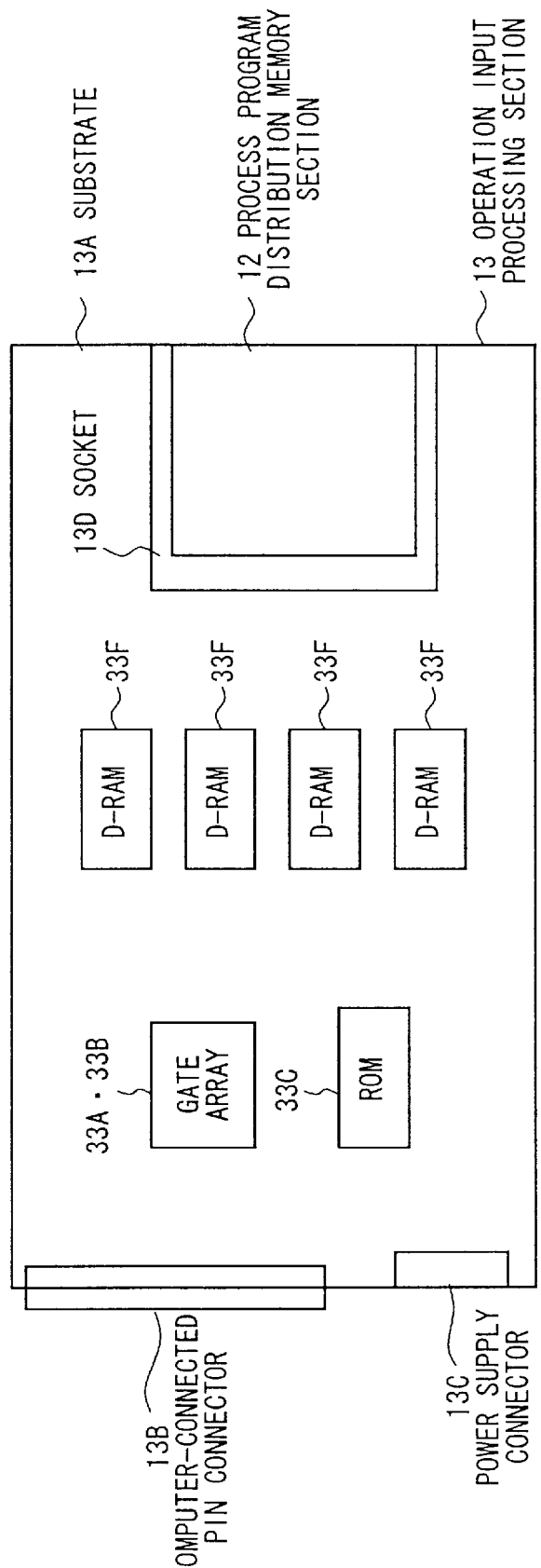
FIG. 15 is a top view showing the general configuration of an example of an operation input processing section 13.
Figure 16:
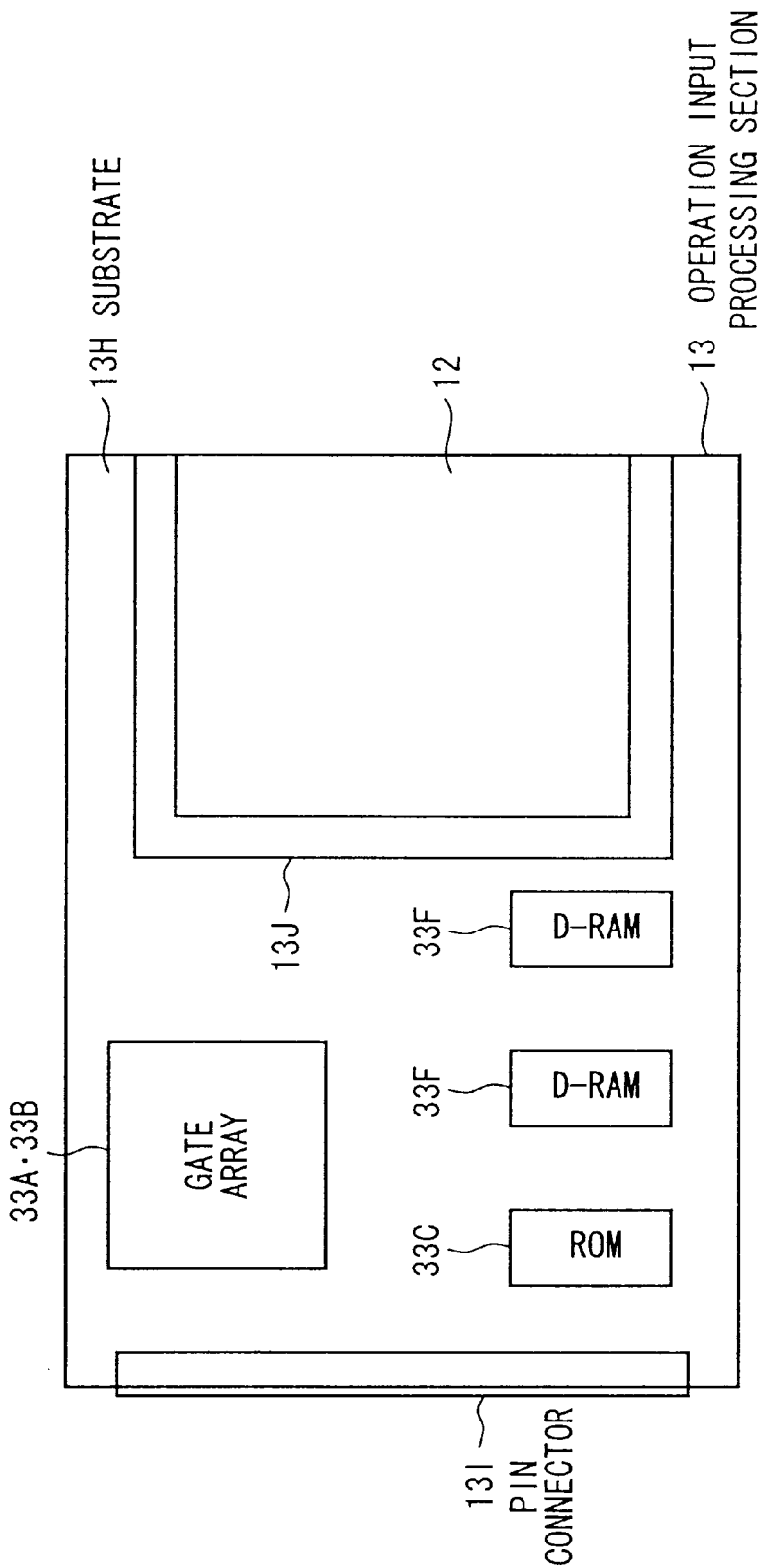
FIG. 16 is a top view showing the general configuration of another example of the operation input processing section 13.

In this embodiment, the configuration shown in FIG. 15 or 16 may be applied as the operation input processing section 13.

The operation input processing section 13 in FIG. 15 is generally shaped to have the same size as a 3.5-inch hard disc, and comprises a rectangular substrate 13A having a computer-connected pin connector 13B and a power supply connector 13C at a left end thereof and a notch socket 13D at a right end thereof into which the process program distribution memory section 12 comprising a compact flash memory is inserted.

The substrate 13A, comprising a wiring printed circuit board, has mounted thereon a read only memory constituting the starting information data storage section 33C (FIG. 13) of the process program storage section 33, a gate array constituting the interface 33A and the relay circuit section 33B, and D-RAMs constituting the process program data storage section 33F.

For an apparatus that can use 3.5-inch hard discs, the operation input processing section 13 configured as shown in FIG. 15 can be constructed to be compatible with such 3.5-inch hard discs.

FIG. 16 shows that the operation input processing section 13 is sized for 2.5-inch hard discs and comprises a rectangular substrate 13H having at a left end thereof a pin connector 13I compatible with 2.5-inch hard discs and at a right end thereof a notch socket 13J to which the process program distribution memory section 12 comprising a compact flash memory is connected.

The substrate 13H has mounted thereon a gate array constituting the interface 33A and the relay circuit section 33B, a ROM constituting the starting information data storage section 33C, and D-RAMs constituting the process program data storage section 33F.

Figure 17:
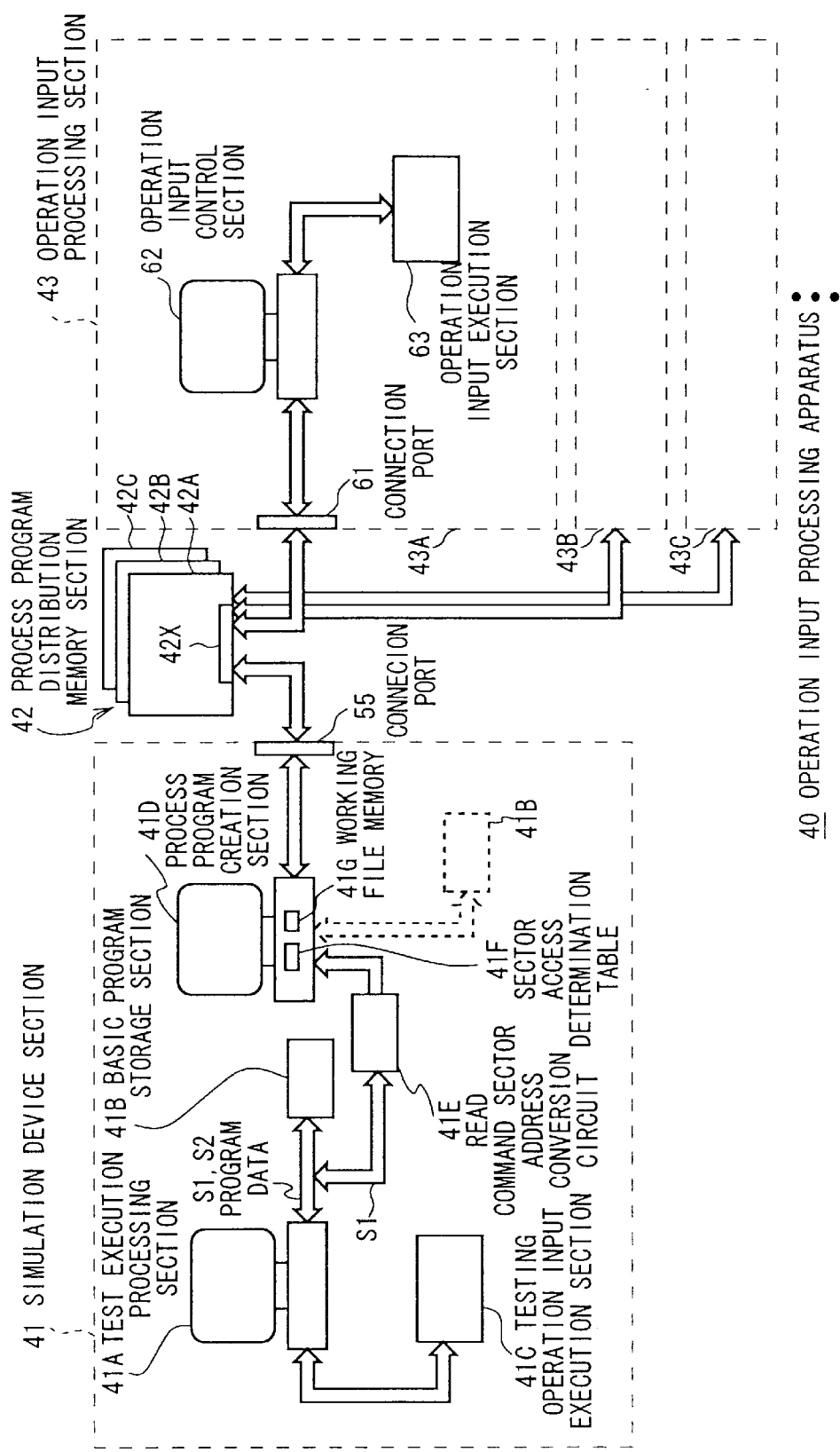
FIG. 17 is a schematic diagram showing the entire configuration of an operation input processing apparatus 40 according to the second embodiment.

(2) Second Embodiment
(1) Entire Configuration of Operation Input Processing Apparatus In FIG. 17, reference numeral 40 generally denotes an operation input processing apparatus comprising an automatic issuance machine for issuing, for example, tickets for concerts in response to users' input operations, and has a simulation device section 41, a process program distribution memory section 42, and an operation input processing section 43.

The simulation device section 41 extracts from software resources having a standard operating system program (OS) and application programs, operating system program (OS) data and application program data those are required to drive and control the automatic issuance machine, which is a hardware, and then writes those extracted data to a plurality of process program distribution memory section 42.

The process program distribution memory section 42 supplies the operating system program (OS) data and application program data required to drive and control the automatic issuance machine, to a plurality of locally distributed automatic issuance machines as externally supplied data.

Based on the operating system program (OS) data and application program data supplied by the process program distribution memory section 42, the operation input processing section 13 executes such processing that a specified ticket is issued, in response to an operation input signal input by a user.

(2) Simulation Device Section

The simulation device section 41 has a test execution processing section 41A that is configured by a personal computer to provide a program data read instruction to the basic program storage section 41B when the user operates the test execution processing section 41A for input.

The basic program storage section 41B comprises a hard disc drive device to store in part thereof the operating system program and application program required to allow the operation input processing section 43 to perform the issuance operation. When provided with a read command (that is, an IDE command) by the test execution processing section 41A, the basic program storage section 41B supplies the program data to the test execution processing section 41A. Thus, in the operation input processing section 43, a test execution processing section 41A obtains from the basic program storage section 41B, the operating system (OS) program and application program required for a test operation performed by a testing operation input execution section 41C having the same configuration as an operation input processing section 63 comprising an automatic issuance machine and driven and controlled by an operation input control section 62 configured by a personal computer, and the test execution processing section 41A then allows the testing operation input processing section 41C to perform a test control operation.

The basic program storage section 41B comes standard with a large number of application programs for performing various data processing operations, as well as the operating system (OS) program. These application programs are stored in a recording medium comprising, for example, a hard disc, and part (program data stored in a file specified by the read command) of the stored operating system (OS) program and application programs is supplied to the test execution processing section 41A for a processing operation.

Figure 1:
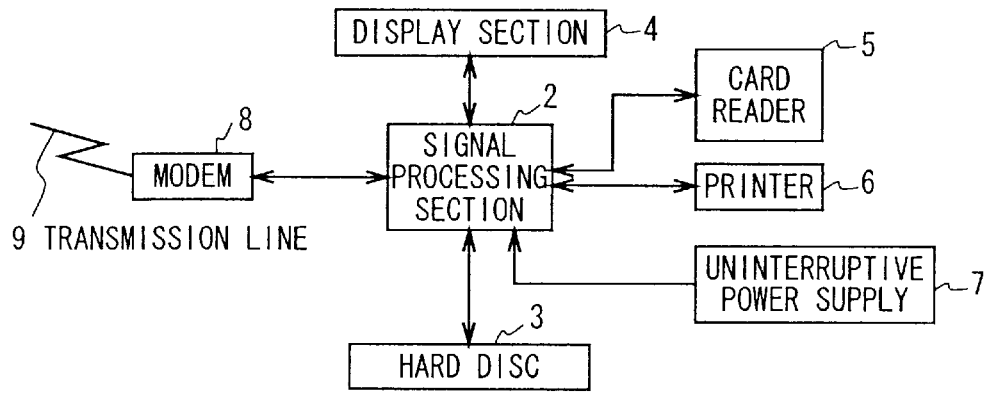
FIG. 1 is a block diagram showing a conventional automatic issuance machine.

In addition, before performing a test operation on the testing operation input execution section 41C, the test execution processing section 41A executes a preprocess routine RT0, shown in FIG. 1, in response to a user's input operation.

In the preprocess routine RT10, a central processing unit (CPU) of the test execution processing section 41A enters a step SP51 to execute a process of writing an access control program to a file data memory area of the basic program storage section 41B in order to write to the operation input processing section 43 data stored in the process program distribution memory section 42. In step SP52, this central processing unit describes the file name of the access control program in a file name memory area of the basic program storage section 41B. Thus, the test execution processing section 41A completes this preprocess in step SP53.

A file read command (an IDE command) S1 provided for the basic program storage section 41B by the test execution processing section 41A is provided, via a read command sector number conversion circuit 41E, for a process program forming section 41D comprising a personal computer.

Figure 19:
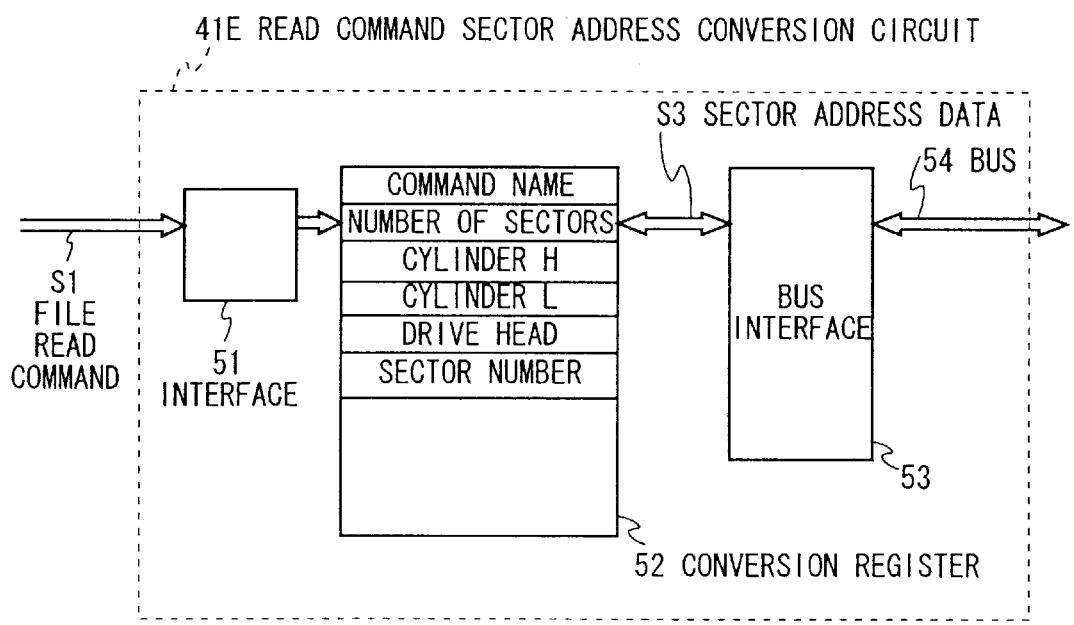
FIG. 19 is a block diagram showing a detailed configuration of a read command access address conversion circuit 41E in FIG. 17.

As shown in FIG. 19, whenever the file read command S1 is provided for the basic program storage section 41B by the test execution processing section 41A, the read command sector address conversion circuit 41E receives the file read command S1 in a conversion register 52 via an interface 51.

When information for specifying sector addresses which is transferred in time series as the file read command S1 arrives sequentially, including a command name, the number of sectors, a cylinder H and a cylinder L (information for specifying one of plural hard discs), a drive head (information for specifying a read surface of a hard disc) and sector numbers (information for specifying sector numbers on a disc surface read by a drive head), the conversion register 52 loads and retains each piece of information in a corresponding register.

The sector specifying information retained in the conversion register 52 is sent out via a bus interface 53 to a bus 54 in a process program creation section 41D comprising a personal computer, as sector address data S3 comprising time parallel data. The process program creation section 41D then executes a read sector number loading process routine in FIG. 2 to accumulate the sector specifying information in a sector access determination table 41F provided in the process program creation section 41D.

Figure 21:
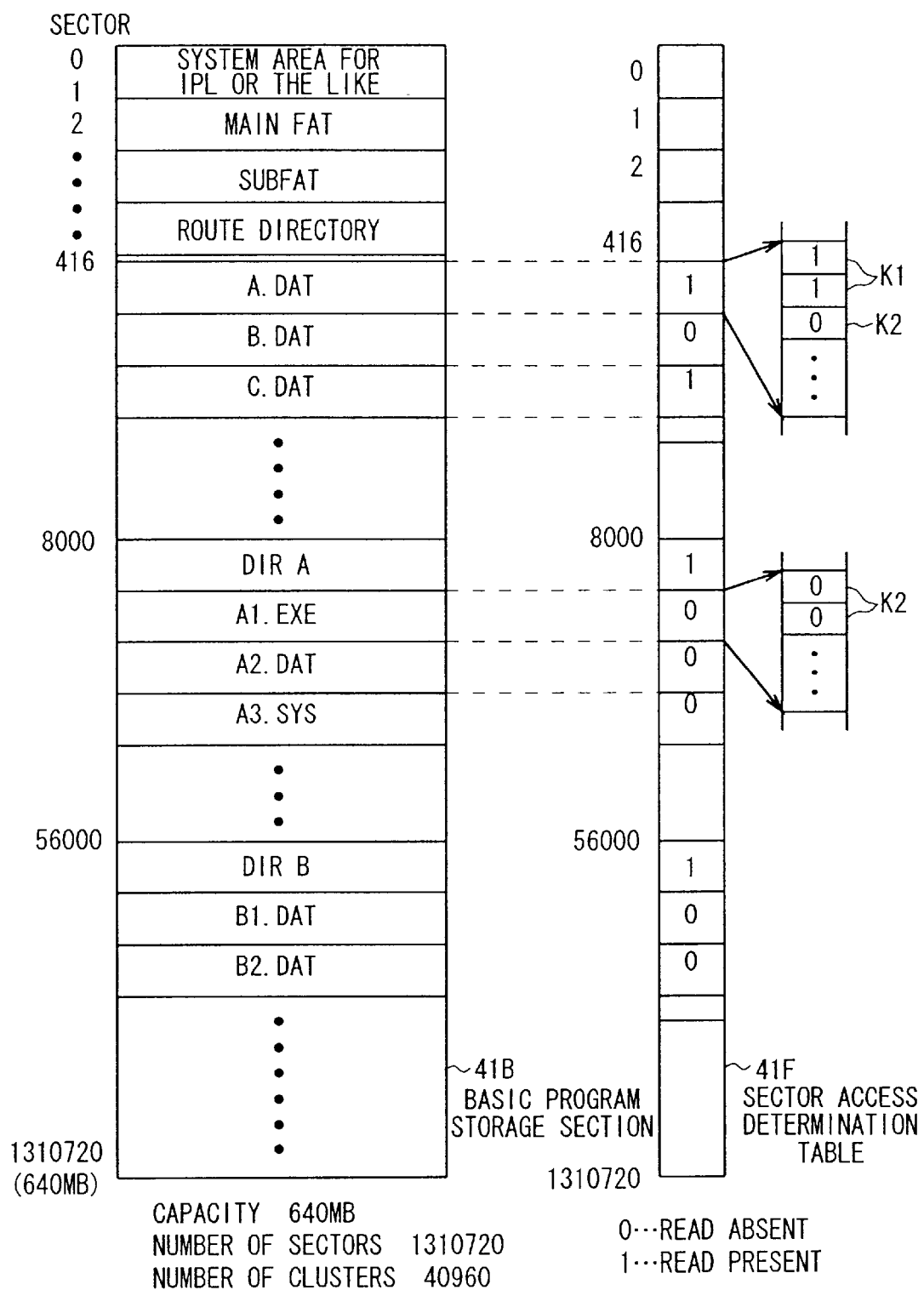
FIG. 21 is a schematic diagram showing the configuration of a sector access determination table 41F of a process program creation section 41D in FIG. 17.

The sector access determination table 41F has a large number of memory areas each comprising one bit and corresponding to all unit memory area addresses (in this embodiment, a series of sector numbers of a hard disc, which are hereafter referred to as logical sector numbers) of the basic program storage section 41B as shown in FIG. 21. When file data (typically stored in a plurality of sectors) is read from a predetermined unit memory area of the basic program storage section 41B, corresponding sector numbers are specified via the read command sector address conversion circuit 41E, so that flag data comprising logical "1" ("read present" information) is stored in the specified memory area. Otherwise, flag data representing logical "0" ("read absent" information) is stored therein.

In the basic program storage section 41B, a plurality of predetermined sector numbers are assigned to each file name, as shown in FIG. 21. When each file name has a small amount of file data, program data is stored in such a manner that the file data is written only to the first sector number section, while no file data is written to the remaining sector number sections (these memory areas are called "free sectors").

The logical "1" flag data is written only to memory areas K1 with sector numbers in the sector access determination table 41F corresponding to those of the sectors assigned to file names specified by the read command in which program data is actually stored, whereas the logical "0" flag data is written to memory areas K2 with the other sector numbers for "free sectors."

Additionally, the basic program storage section 41B uses a 640-MB hard disc as a storage medium to store storage unit data including system and file data at the intervals of sector numbers "0" to "1,310,720." Correspondingly, the sector access determination table 41F has memory areas with address numbers "0" to "1,310,720" corresponding to the sector numbers "0" to "1,310,720" of the basic program storage section 41B.

Furthermore, the basic program storage section 41B is configured to allow a user to specify memory areas within the sector numbers "0" to "1,310,720," which include sectors each comprising 512 [B] as well as 40,960 clusters (one cluster=4 sectors).

Figure 20:
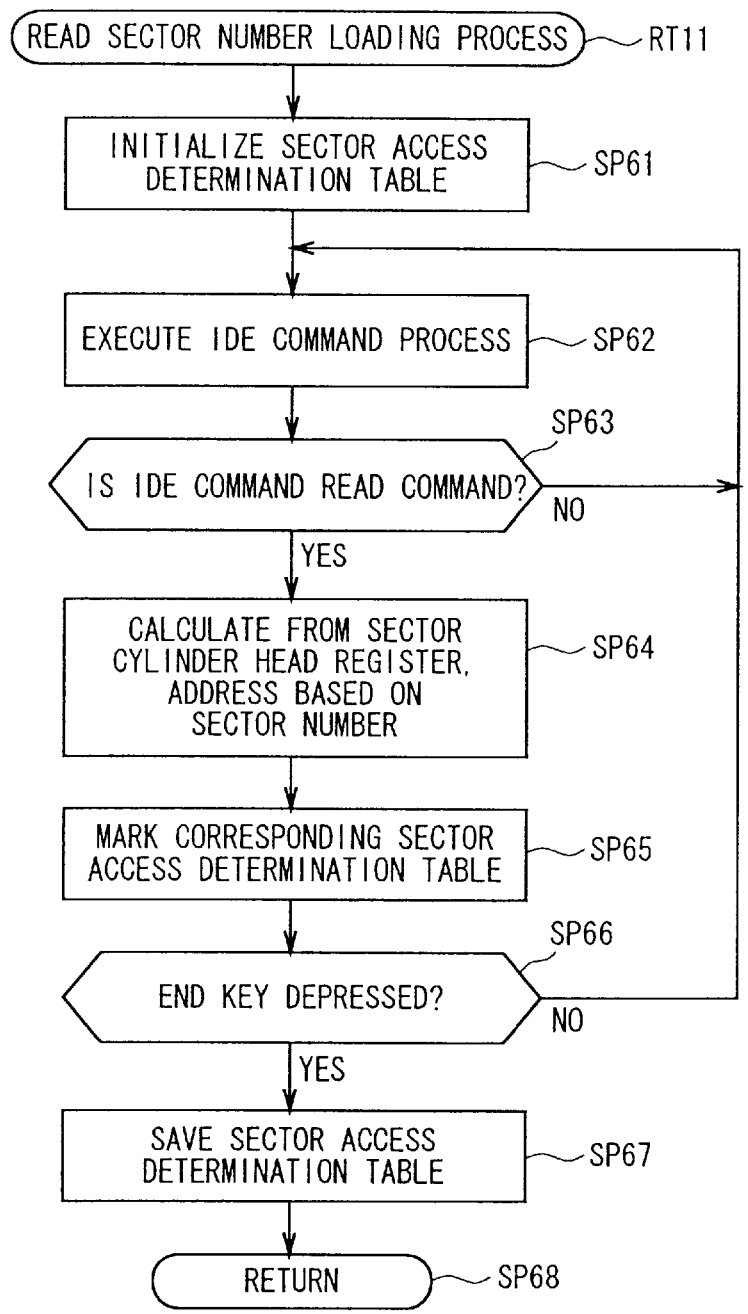
FIG. 20 is a flowchart showing a read sector number loading process routine executed by the test execution processing section 41A in FIG. 17.

In the read sector number loading process routine RT11 in FIG. 20, the CPU of the process program creation section 41D initializes the sector access determination table 41F (resets the flag data for all the sector number to "0") in step SP61. Then, in step SP62, the process program creation section 11D loads sector address data S3 from the read command sector address conversion circuit 41E based on the file read command S1 comprising the read command (the IDE command) and determines in step SP63 whether or not the sector address data S3 is a read command. When a negative result is obtained (this means that the read command (the IDE command) is not for reading program data from the basic program storage section 41B), the process program creation section 41D returns to the above described step SP62 to execute the process of obtaining the next read command (IDE command)

On the contrary, when a affirmative result is obtained (this means that a command for reading program data from the basic program storage section 41B has been obtained) in step SP63, the process program creation section 41D calculates memory locations (sector numbers) where data with names of files to be read are stored, based on the sector numbers, cylinder numbers, and drive head numbers specified in the sector address data S3 in step SP64.

Subsequently, the process program creation section 41D shifts to the step SP65 to write the logical "1" flag to the memory areas with the calculated sector numbers of the sector access determination table 41F, so that the sector numbers for that part of the program data in the basic program storage section 41B which is to be read by the read command are written to the sector access determination table 41F.

Subsequently, the process program creation section 41D determines in step SP66 whether an end key has been depressed. When a negative result is obtained (this means that the user's selection for a process menu has not been completed), the process program creation section 41D returns to the above described step SP62 to repeat the processing for the next read command.

Figure 18:
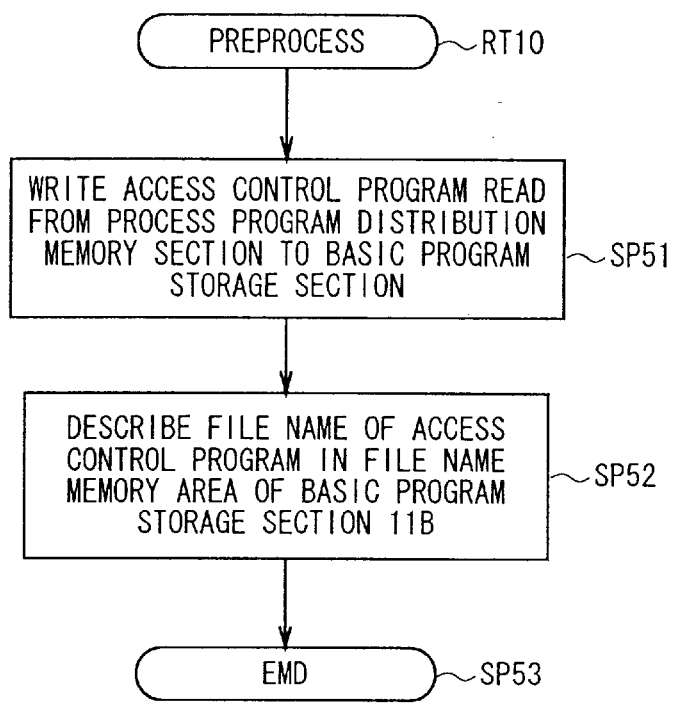
FIG. 18 is a flowchart showing a preprocess routine executed by a test execution processing section 41A in FIG. 17.

This repetitive processing for the read command is repeated each time the user specifies, for the test execution processing section 41A, an operation required by the testing operation input execution section 41C to execute functions specific to an issuance machine and also when the user specifies a process for reading the access control program written to the basic program storage section 41D by the preprocess routine RT10 (FIG. 18). This allows the sector access determination flag data for file data for the access control program to be accumulated in the sector access determination table 41F with other flag data.

On the contrary, when an affirmative result is obtained (this means that the processing for the read command associated with the process menu specified by the user has been completed) in step SP66, the process program creation section 41D saves the sector access determination table 41F in step SP67 and ends the read sector number loading process routine in step SP68.

Thus, when the user performs the input operation, the test execution processing section 41A partly extracts, based on the processing operation as a personal computer, the program data stored in the basic program storage section 41B to perform the series of program processing operations for allowing the testing operation input execution section 41C to automatically perform an issuance operation. Then, the sector numbers accessed by the file read command S1 provided for the basic program storage section 41B by the test execution processing section 41A during the series of processing operations are extracted and stored in the sector access determination table 41F as the determination flag "1" or "0."

Once the extraction and storage operation for the sector access determination table 41F has been completed, the user turns off the power supply to the test execution processing section 41A and process program creation section 41D and then disconnects the basic program storage section 41B from the test execution processing section 41A while connecting it to the process program creation section 41D. The user then uses the personal computer operation of the process program creation section 41D to execute a file data storage process routine RT12, shown in FIG. 22.

In the file data storage process routine RT12, the process program creation section 41D opens a working file memory 41G in step SP71, subsequently loads the stored contents of the sector access determination table 41F in the working file memory 41G in step SP72, and then loads a directory from the basic program storage section 41B, which has been reconnected to the process program creation section 41D in step SP73.

According to this embodiment, the basic program storage section 41B has a system area for an initial program loader (IPL), a main file allocation table (FAT), a subtile allocation table (subFAT), and a root directory all stored in memory areas with sector numbers "0" to "415," as shown in FIG. 21.

In addition, program data with file names A.DAT, B.DAT, C.DAT, are stored in file memory areas with sector numbers "416" to "7,999."

Further, a subdirectory DIRA and program data with file names A1.EXE, A2.DAT, A3.SYS, . . . are stored in file memory areas having a sector number "8,000" as a leading address.

Furthermore, a subdirectory DIRB and program data with file names B1.DAT, B2.DAT, . . . are stored in file memory areas having a sector number "56,000" as a leading address.

The initial program loader (IPL) is program data for starting up a processing operation based on program data from the basic program storage section 41B.

In addition, the main file allocation table (main FAT) and the subfile allocation table (subFAT) are data for managing a series of logical sector numbers on the hard disc in the basic program storage section 11B.

Furthermore, as shown in FIG. 23, the route directory has sequentially described therein the "file names" A.DAT, B.DAT, C.DAT, . . . stored in the data storage area having the sector number "416" as a leading address, addresses (that is, "FAT entries") of the subdirectory DIRA, that is, "2," "4," "6," . . . , "file sizes" "18,000," "24,000," "16,000," . . . , and "other information." Thus, the file names A.DAT, B.DAT, C.DAT, . . . and the program data names for the files in the subdirectory DIRA can be accessed as addresses in which a cluster address classification is used.

As shown in FIG. 24, the subdirectory DIRA has described therein the "file names" A1.EXE, B2.DAT, and A3.SYS in the memory areas having the sector number "8,000" as a leading address, "FAT entries" comprising cluster addresses at which the files in the subdirectory DIRB are present, "file sizes," and "other information," thereby enabling accesses to the program data stored in these memory areas.

Furthermore, as shown in FIG. 25, the subdirectory DITB has described therein the "file names" B1.DAT and B2.DAT stored in the memory areas having the sector number "56, 000" as a leading address, "FAT entries" comprising cluster addresses at which the corresponding files are present, "file sizes," and "other information," thereby enabling accesses to the program data stored in these memory areas.

Based on this memory configuration, the process program creation section 41D loads the route directory (FIG. 23) from the basic program storage section 41B as system data in step SP23 of the file data storage process routine (FIG. 22) and then determines in step SP74 whether or not all of the directory has been loaded. When a negative result is obtained (this means that the subdirectories DIRA and DIRB are present), the process program creation section 11D shifts to the step SP25 to obtain the "FAT entries" for the file names A.DAT, B.DAT, C.DAT, . . . from the route directory.

Subsequently, in step SP76, the process program creation section 41D converts the "FAT entries" comprising cluster addresses to describe the locations at which the files are present, into sector numbers.

Subsequently, in step SP77, the process program creation section 41D uses the sector numbers obtained through the conversion process to determine whether the flag data stored in those memory areas in the sector access determination table 41F that have the same sector numbers each have a value of logical "1" or "0."

If the result of the determination is the logical "1," this means that the files with these sector numbers have been read out by the IDE command during the read sector number loading routine RT1 (FIG. 20). Then, the process program creation section 41D confirms in step SP78 that the user has operated and entered a data extraction mode, and determines in step SP79 whether or not the data extraction mode entered in step SP29 is a "file extraction mode" or a "file and sector extraction mode" or a "file and sector extraction and compression mode."

These extraction modes allow selection of a compression method for file data to be supplied to the process program distribution memory section 42 by the basic program storage section 41B so that a storage medium of as small a capacity as possible (in this embodiment, equal to the storage capacity of a compact flash memory configured as an IC memory) can be applied as the process program distribution memory section 42. In this embodiment, the user can select among the "file extraction mode" such as that shown in FIG. 26, the "file and sector extraction mode" such as that shown in FIG. 27, and the "file and sector extraction and compression mode" such as that shown in FIG. 28.

The "file extraction mode" (FIG. 26) stores data in the memory areas for the system data (the initial program loader (IPL) and the route directory), memory areas for a sector address conversion table, and memory areas for a starting OS data file without compression of data, while storing program data for each file in the other memory areas (that is, the file data memory areas) in such a manner that the memory areas are sequentially filled, on a file basis, with file data for which the logical "1" flag data is set in the sector access determination table 41F, so as to eliminate free memory areas. As a result, the process program distribution memory section 42 requires no storage area for file data (that have not been extracted by the read sector loading process routine RT11 (FIG. 20)) with the sector numbers for which the logical "0" flag data is set in the sector access determination table 41F, thereby allowing the application of a substantially small memory capacity.

In this embodiment, the memory medium that can be used in the "file extraction mode" is a compact flash memory having a capacity of 32 [MB], 65,536 sectors, and 16,384 clusters (16,384=65,536÷4).

In addition, the "file and sector extraction mode" (FIG. 27) stores data in the memory areas for the initial program loader (IPL) and the route directory, the memory areas for the sector address conversion table, and the memory areas for the starting OS data without compression, while storing in the other memory areas program data that have been accessed by the read sector number loading process routine (FIG. 20) in such a manner that the memory areas are sequentially filled with the data on a sector basis so as to eliminate free memory areas, thereby extracting file data.

Figure 26:
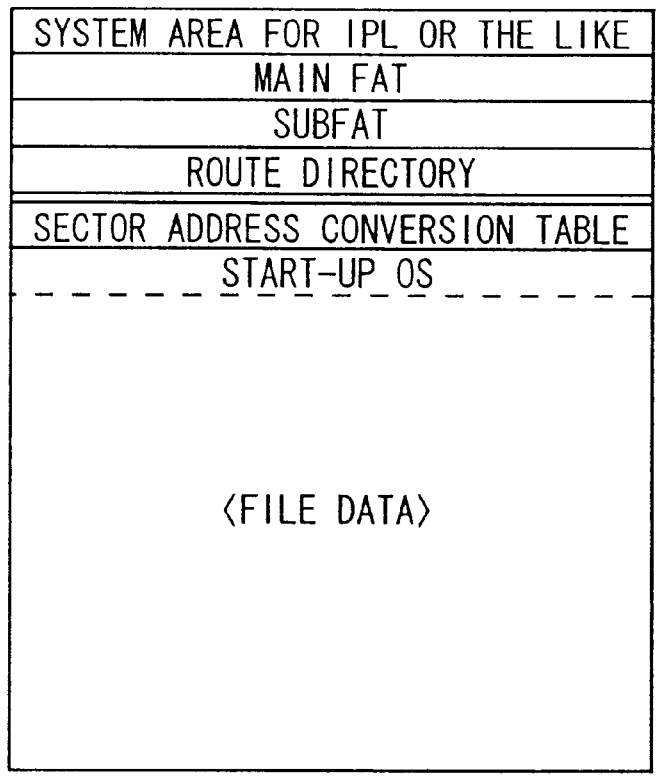
FIG. 26 is a schematic diagram showing the stored contents of a process program distribution memory section 42 in a "file extraction mode."
Figure 27:
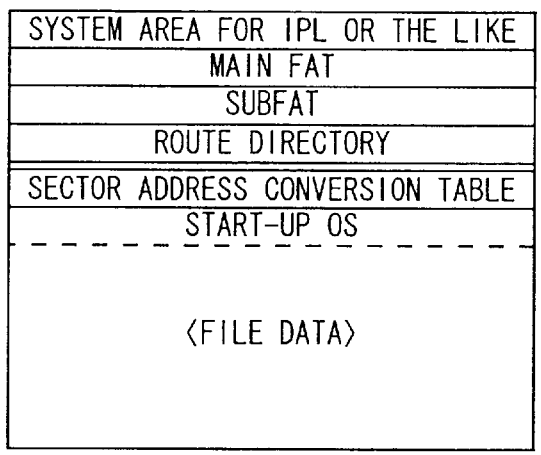
FIG. 27 is a schematic diagram showing the stored contents of the process program distribution memory section 42 in a "file and sector extraction mode."

The "file and sector extraction mode" can create file data crammed into the file data memory areas on a sector basis so as to eliminate free memory areas, thereby substantially reducing the number of free memory areas compared to the "file extraction mode" (FIG. 26).

If the memory areas are filled with file data on a file basis without a free space as in the "file extraction mode" (FIG. 26), even if any file contains a sector number without program data, this memory area without program data cannot be filled with program data. If file data is extracted in the "file and sector extraction mode" (FIG. 27), the sector without program data is eliminated to increase data compression efficiency.

With compression in the "file and sector extraction mode" (FIG. 27), the process program distribution memory section 42 may be a compact flash memory having a memory capacity of 16 [MB], 32,768 sectors, and 8,192 clusters.

In addition, the "file and sector extraction and compression mode" (FIG. 28) stores data in the memory areas for the initial program loader (IPL) and the route directory, the memory areas for the sector address conversion table, and the memory areas for the starting OS data file without compression, while using, in the other file data memory areas, a predetermined compression method (for example, the LZW method) to compress file data in the "file and sector extraction mode" (FIG. 27) for extraction.

The "file and sector extraction and compression mode" (FIG. 28) further compresses data in the "file and sector extraction mode" (FIG. 27), thereby allowing a storage medium of a much smaller memory capacity than the "file and sector extraction mode" (FIG. 27) to be applied as the process program distribution memory section 42.

In this embodiment, the process program distribution memory section 42 is a compact flash memory having a memory capacity of 10 [MB], 2,047 sectors, and 511 clusters.

For program data stored in the "file extraction mode" (FIG. 26) and the "file and sector extraction mode" (FIG. 27), each file data can be accessed by referencing the sector address conversion table using system data. For the "file and sector extraction and compression mode" (FIG. 28), each file data can be accessed by reversely compressing the file data for unfreezing and referencing the system address conversion table using system data.

Figure 28:
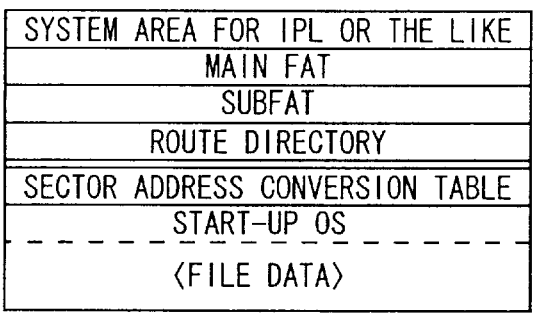
FIG. 28 is a schematic diagram showing the stored contents of the process program distribution memory section 42 in a "file and sector extraction and compression mode."

Thus, the process program creation section 41D determines in step SP79 (FIG. 22) whether the user has specified, for the process program creation section 41D, the "file extraction mode" (FIG. 26) or the "file and sector extraction mode" (FIG. 27) the "file and sector extraction and compression mode" (FIG. 28). If the "file extraction mode" is specified, then in step SP80, the process program creation section 41D reads from the basic program storage section 41B file data for which the flag data in the sector access determination table 41F has been determined to be the logical "1" and then writes the file data to the working file memory 41G (FIG. 29) so as to eliminate free file memory areas before proceeding to a step SP81.

On the contrary, if it is determined in step SP79 that the "file and sector extraction mode" or the "file and sector extraction and compression mode" is specified, the process program creation section 41D proceeds to a step SP82 to sequentially write program data from accessed sectors to sector numbers in such a manner that no free sector numbers remain in the working file memory 41G.

Next, in step SP83, the process program creation section 41D writes to the sector conversion table, conversion from sector numbers specified by the system data into sector numbers written to the working file memory 41G, and then shifts to the above described step SP81.

Subsequently, since the file data or the sector data have been converted so as to eliminate spaces in steps SP80 and SP82, the process program creation section 41D converts the route directory (FIG. 23) of the basic program storage section 41B into new addresses (that is, class address FAT entries) into the working file memory 41G for each file data, in step SP81.

The process program creation section 41D subsequently advances to a step SP84 to determine whether or not all the files in the route directory (or the subdirectory) have been written to the working file memory 41G. When a negative result is obtained, the process program creation section 41D returns to the step SP75 to repeat writing the remaining files to the working file memory 41G.

In addition, the process program creation section 41D shifts to the above described step SP75 to repeat the processing for the next file for sector numbers for which the flag data in the sector access determination table 41F has been determined at the above described step SP77 to be the logical "0" (this means that the files in these sectors have not been loaded from the basic program storage section 41B during a test execution process executed by the test execution processing section 41A).

Once all the files in the route directory (or the subdirectory) have been processed, the process program creation section 41D obtains an affirmative result in step SP84 to return to the above described step SP73 to execute a file write process for a new route directory (or a subdirectory).

In this manner, for those of the files stored in the route directory (or subdirectory) of the basic program storage section 41B for which the logical "1" flag data has been written to the corresponding sector numbers in the sector access determination table 41F, the process program creation section 41D writes the program data from the basic program storage section 41B to the data memory areas in the working file memory 41G so as to eliminate free file or sector numbers.

Once all the directories (or subdirectories) have been processed, the process program creation section 41D obtains an affirmative result in step SP74 to advance to the step SP85.

After writing to the system area for the initial program loader (IPL) or the like and to the main FAT and subFAT, the process program creation section 41D determines in step SP86 whether or not the data extraction mode is the "file and sector extraction and compression mode." If so, then in step SP87, the process program creation section 41D uses a predetermined data compression method (for example, the LZW compression method) to compress the data stored in the working file memory 41G before proceeding to a step SP88.

On the contrary, when determining in step SP86 that a "no compression mode" has been entered (this means that data has been extracted in the "file and sector extraction mode" or the "file and sector extraction mode"), the process program creation section 41D jumps the step SP87 to shift to the step SP88.

In step SP88, the process program creation section 41D writes the program data written to the working file memory 11G to the process program distribution memory section 42 connected to a connection port 55 of the simulation device section 41 and comprising a compact flash memory.

Subsequently, in step SP89, when the user performs a setting operation for a "write mode (WRITE)," the process program creation section 41D writes the input write mode specification data to the process program distribution memory section 42, and completes the file data storage process routine RT12 in step SP90.

The setting of the "write mode (WRITE)" in step SP89 specifies beforehand how to write data when the operating system (OS) program of the program data stored in the process program distribution memory section 42 generates a processing command requiring that the operation input control section 62 "writes predetermined data to the memory" when the operation input control section 62 uses the program data to allow the operation input execution section 63 to automatically perform an issuance operation. This setting specifies either a "write data save mode" that saves write data or a "write data not save mode" that does not save write data or a "data not write mode" for writing no data.

When a plurality of operation input processing sections 43 (43A, 43B, 43C, . . . ) are distributively disposed, the file data storage process routine RT12 (FIG. 22) effectively connects connection ports 42X of plural process program distribution memory sections 42 (42A, 42B, 42C, . . . ) to the connection port 55 of the simulation device section 41 in a fashion corresponding to the plurality of operation input processing sections 43 (43A, 43B, 43C, . . . ), to repeat the process of writing program data.

This enables the simulation device section 41 to create the plurality of process program distribution memory sections 42 (42A, 42B, 42C, . . . ) that store an operating system (OS) program and application programs for allowing the operation input execution section 63 in each of the plural operation input processing sections 43 (43A, 43B,.43C, . . . ) to automatically perform an issuance operation.

(3) Operation Input Processing Section

When the connection port 42X of each process program distribution memory section 42 (42A, 42B, 42C, . . . ) is connected to a connection port 61 of the corresponding operation input processing section 43 (43A, 43B, 43C, . . . ), the process program distribution memory section 42 (42A, 42B, 42C, . . . ) is connected to the operation input control section 62 comprising a personal computer. When the user performs an input operation on the operation input control section 62, the operation input control section 62 uses the program data stored in the process program distribution memory section 42 (42A, 42B, 42C, . . . ) to drive and control the operation input execution section 63 to act as an automatic issuance machine.

Figure 30:
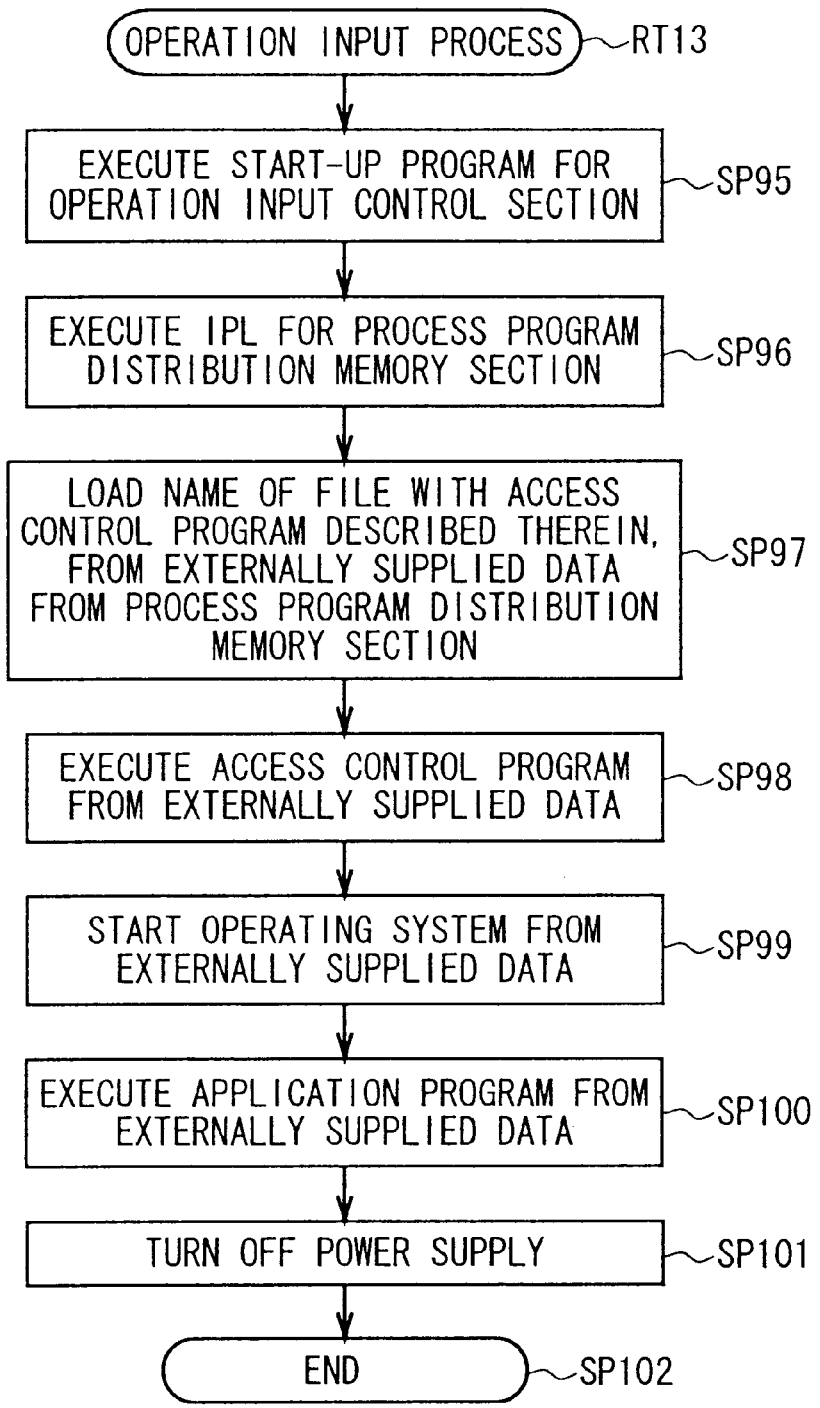
FIG. 30 is a flowchart showing an operation input processing routine executed by an operation input control section 32 in FIG. 17.

When the user turns on the power supply while the process program distribution memory section 42 (42A, 42B, 42C, . . . ) is connected to the connection port 61 of the operation input processing section 43 (43A, 43B, 43C , . . . ), an operation input control section 62 executes an operation input process routine RT13, shown in FIG. 30.

Then, the CPU of the operation input control section 62 executes a start program stored in the ROM thereof in step SP95, and then executes the initial program loader (IPL) for the process program distribution memory section 42 in step SP96, thereby allowing the program data stored in the process program distribution memory section 42 to be loaded in the operation input control section 62 as externally supplied data.

Subsequently, in step SP97, the operation input control section 62 reads the name of a file describing an access control program from the externally supplied data supplied by the process program distribution memory section 42, and in step SP98, executes the access control program from the externally supplied data while allowing this access control program to reside in the working memory opened in the RAM thereof.

Subsequently, in step SP99, the operation input control section 62 starts the operating system (OS) program from the externally supplied data, and in step SP100, executes the application program from the externally supplied data.

Thus, the operation input control section 62 executes this application program to drive and control the operation input execution section 63 to act as an automatic issuance machine.

This drive and control process for the operation input execution section 63 in steps SP99 and SP100 is executed until the operation input control section 62 confirms in step SP101 that the operation has been completed. When the user then turns off the power supply in step SP101, the operation input control section 62 completes the operation input process routine in step SP102 (at this point, the access control program data is deleted).

In this manner, the operation input control section 62 executes the access control program, which has been populated therein in step SP99, thereby ensuring that the operation input execution section 63 constituting an automatic issuance machine performs an issuance operation based on part of the program data in the basic program storage section 41B which has been extracted by the user as required and then stored in the process program distribution memory section 42.

Figure 31:
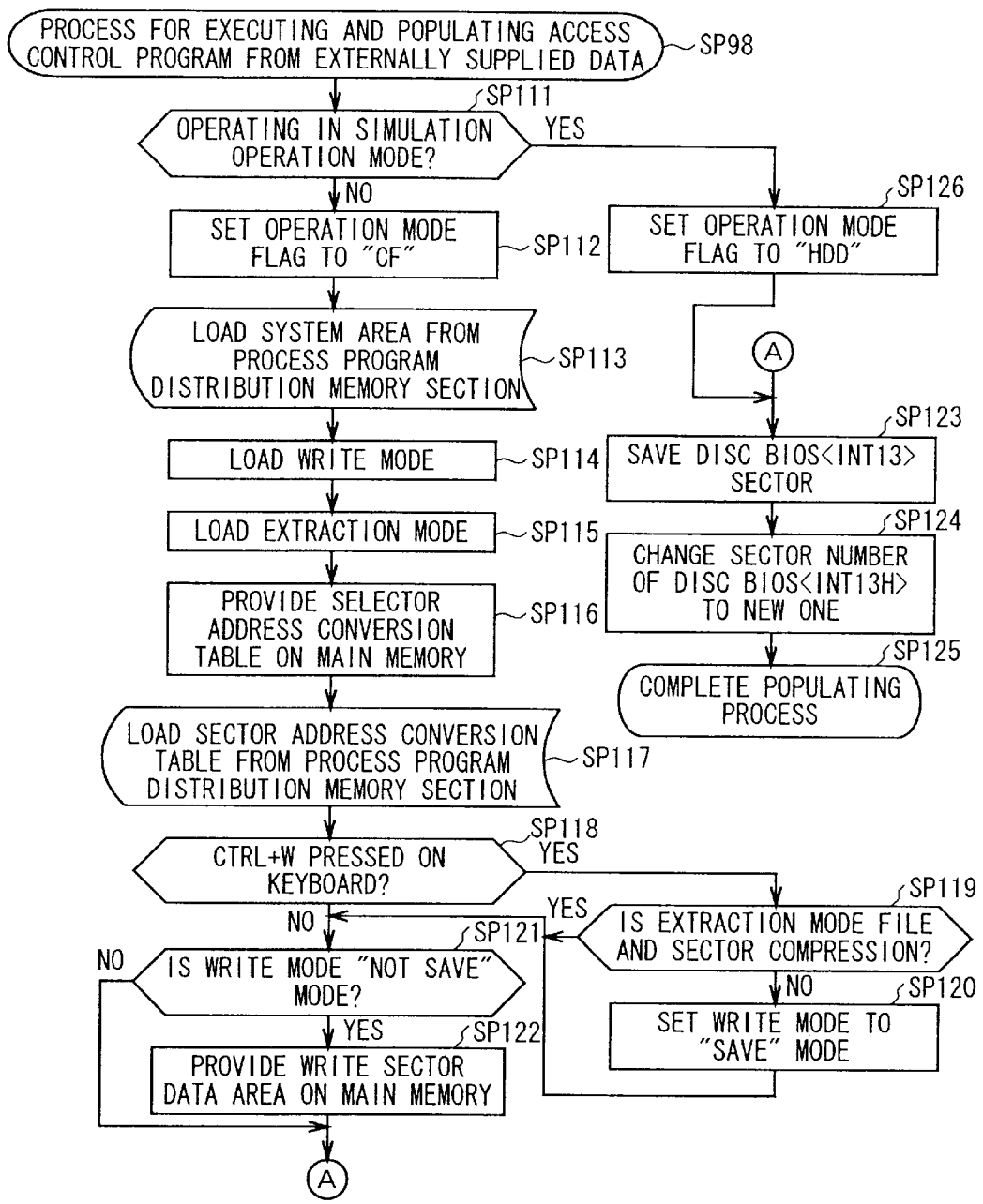
FIG. 31 is a flowchart showing a detailed configuration of a step SP98 in FIG. 30 that is a "process for executing and populating an access control program from externally supplied data."

In this embodiment, the process for the access control program in step SP98 in FIG. 30 is executed by the operation input control section 62 in accordance with an routine for executing and populating an access control program from externally supplied data, the routine being is shown in FIG. 31.

On entering the routine for executing and populating an access control program from externally supplied data in step SP98, the operation input control section 62 determines in step SP111 whether the apparatus is operating in a simulation operation mode.

The step SP111 determines whether the routine for executing and populating an access control program from externally supplied data has been started in an implementation operation mode for the operation input control section 62 of the operation input processing section 43 or in a simulation operation mode for the test execution processing section 41A of the simulation device section 41. When a negative result is obtained (this means that the operation input control section 62 is in an operation mode for reading program data from the process program distribution memory section 42), the operation input control section 62 shifts to a step SP112 to enter an access process for reading program data from the process program distribution memory section 42, which comprises a compact flash memory comprising an IC device. Then, the operation input control section 62 sets an operation mode flag to "CF" (indicating a compact flash operation mode) and then advances to a step SP113.

In step SP113, the operation input control section 62 loads, as an original operation of a personal computer, program data from the system area of the compact flash memory (that is, the process program distribution memory 42) connected as an external memory device, and subsequently proceeds to a step SP114 to load "write mode (WRITE)" data.

In this embodiment, one of the three modes, the "write data save mode," "write data not save mode," and "data not write mode" is an operation state of the operation input control section 62 specified by the user in the process program creation section 41D, as described above for the step SP89 of the file data storage process routine RT12 (FIG. 22) executed by the process program creation section 41D.

Subsequently, the operation input control section 62 loads the extraction mode in step SP115.

Figure 22:
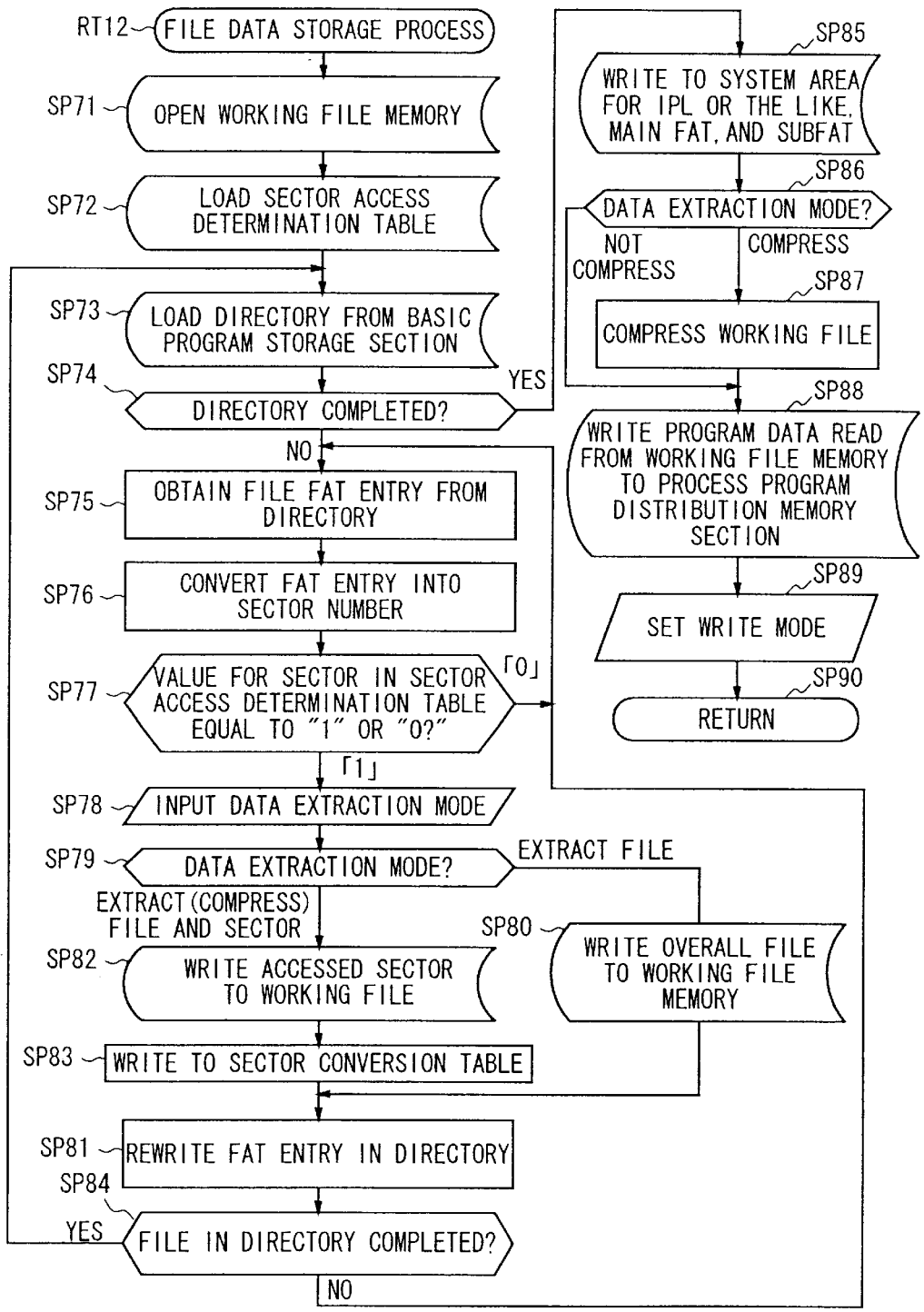
FIG. 22 is a flowchart showing a file data storage process routine of the process program creation section 41D in FIG. 17.

In this embodiment, the extraction mode includes the "file extraction mode" for storing program data in the process program distribution memory section 42 on a file name basis so as to eliminate spaces, the "file and sector extraction mode" for storing program data on a sector basis without a space, and the "file and sector extraction and compression mode" for using a predetermined compression method to compress and record the program data created in the file sector extraction mode, as described above in FIGS. 26, 27, and 28. Selection of the extraction mode is specified by the user when the process program creation section 41D executes the step SP78 of the file data storage process routine RT12 (FIG. 22).

Subsequently, in step SP116, the operation input control section 62 provides memory areas on the main memory in which the sector address conversion table is to be stored, and in step SP117, loads the sector address conversion table in the provided memory areas from the process program distribution memory section 42 before shifting to a step SP118.

The step SP118 checks whether or not the user has used input means of the operation input control section 62 to specify that program data are to be written. The operation input control section 62 determines in step SP118 whether or not a "CONTROL" key and a "W" key on the keyboard have been simultaneously depressed (this means that the user has input a write command). When an affirmative result is obtained, the operation input control section 62 determines in step SP119 whether or not the extraction mode is the "file and sector compression mode." Otherwise, the operation input control section 62 sets the write mode to a "save" mode in step SP120 and then proceeds to a step SP121.

Thus, when the operation input control section 62 executes the processing in the steps SP118, SP119, and SP120, this means that the operation input control section 62 is set for the "save" operation mode so that the user can make a partial change or an addition to the program data supplied by the process program distribution memory section 42 before writing the data to the process program distribution memory section 42.

On the contrary, when an affirmative result is obtained in step SP119, the operation input control section 62 jumps the step SP120 (when the program data for the "file and sector extraction and compression mode" has been written to the process program distribution memory section 42, no change or addition can be, made to the program data without an unfreezing process, so that the processing in the step SP120 is not executed) to shift to a step SP121.

In addition, when a negative result is obtained in step SP118, this means that the user does not desire to allow the operation input control section 62 to make a change or addition to the program data. Thus, the operation input control section 62 jumps the processing in the steps SP119 and SP120 to advance to the step SP121.

The step SP121 checks whether the "write mode (WRITE)" is a "not save" mode, and when an affirmative result is obtained (this means that the "write mode (WRITE)" is specified which processes the program data in the working memory of the operation input control section 62 but does not write the data to the process program distribution memory section 42), the operation input control section 62 provides write sector data areas on the main memory in step SP122 and then proceeds to a step SP123.

On the contrary, when a negative result is obtained in step SP121, this means that the set write mode (WRITE) is a "save" mode for writing write data to the process program distribution memory section 42 or a "not write" mode for writing no program data. The operation input control section 62 jumps the processing in the step SP122 to shift to the step SP123.

The step SP123 saves the address of one of a series of process programs for the operation input control section 62 comprising a personal computer which has the number of a vector (that is referred to as jump destination address describing vector "disc BIOS (INT13H)" to which a disc access program has been written. Thus, the operation input control section 62 executes the program at the number of the vector with the disc access program stored therein to allow the new software program to interrupt and then returns to the saved "disc BIOS (INT13H)" program address so as to return to the process program for the operation input processing section 43 as a personal computer.

Subsequently, the operation input control section 62 shifts to a step SP124 to change the interrupt destination address describing vector "disc BIOS (INT13H) " to a new one (ENTRY-A) and then in step SP125, completes the process step (SP98) of executing and populating an access control program from externally supplied data, with the entry program (ENTRY-A) residing at the interrupted vector number.

The processing from the step SP111 through the step SP112 to the step SP123 corresponds to an access control program required to load the program data supplied as externally supplied data by the process program distribution section 42 comprising a compact flash memory when the operation mode is "CF" operation mode (indicating that the compact flash memory is operated). In contrast, on confirming from the affirmative result in step SP111 that an "HDD" operation mode is specified (this means that in this operation mode, the access control program is used by the above described test execution processing section 41A to load program data from a hard disc drive device of the basic program storage section 41B), the operation input control section 62 sets the operation mode flag to "HDD" in step SP126 and then advances to the step SP123, thereby avoiding executing the steps SP111 to SP112 provided to process the program data from the process program distribution memory section 42.

Figure 32:
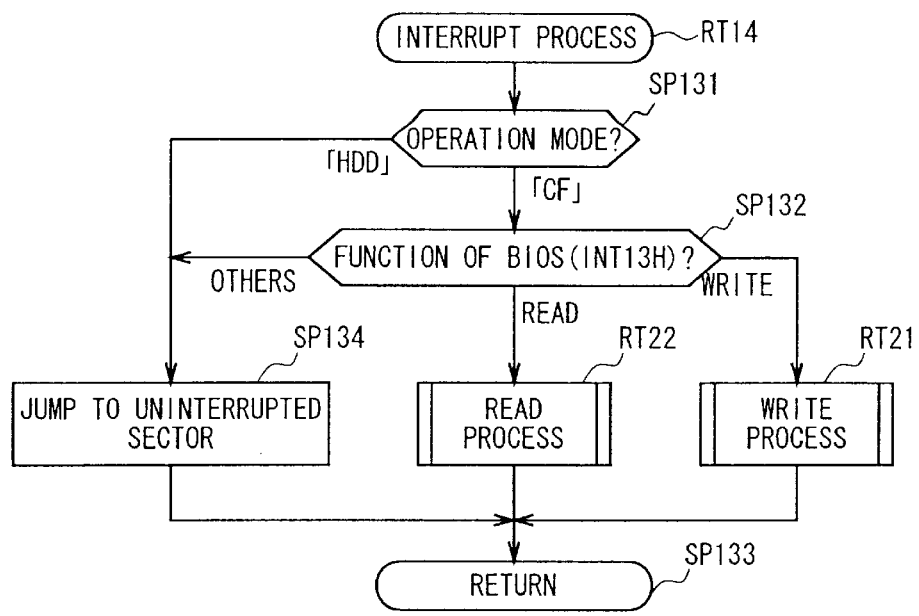
FIG. 32 is a flowchart showing an interrupt process routine RT14 executed by the operation input control section 62 in FIG. 17.

When the interrupt destination address describing sector the "disc BIOS (INT13H) " is accessed by the operating system based on the program data read out from the process program distribution memory section 42, the operation input control section 62 executes, during the interrupt process routine RT14 such as that shown in FIG. 32, the interrupt process program ENTRY-A populated in step SP125.

When the operation input control section 62 executes the program data loaded from the process program distribution memory section 42, the interrupt process routine RT14 interrupts a step SP131 to determine whether the "CF" or "HDD" operation mode is specified, whenever the program data specifies execution of the interrupt process routine RT14.

When it is determined that the "CF" flag is set (this means that the interrupt process routine RT14 is executed while the process program distribution memory section 42 is connected to the operation input processing section 43), the operation input control section 62 shifts to a step SP132 to determine a function specified by a program with an access number described in the interrupt destination address describing vector "disc BIOS (INT13H)."

Figure 33:
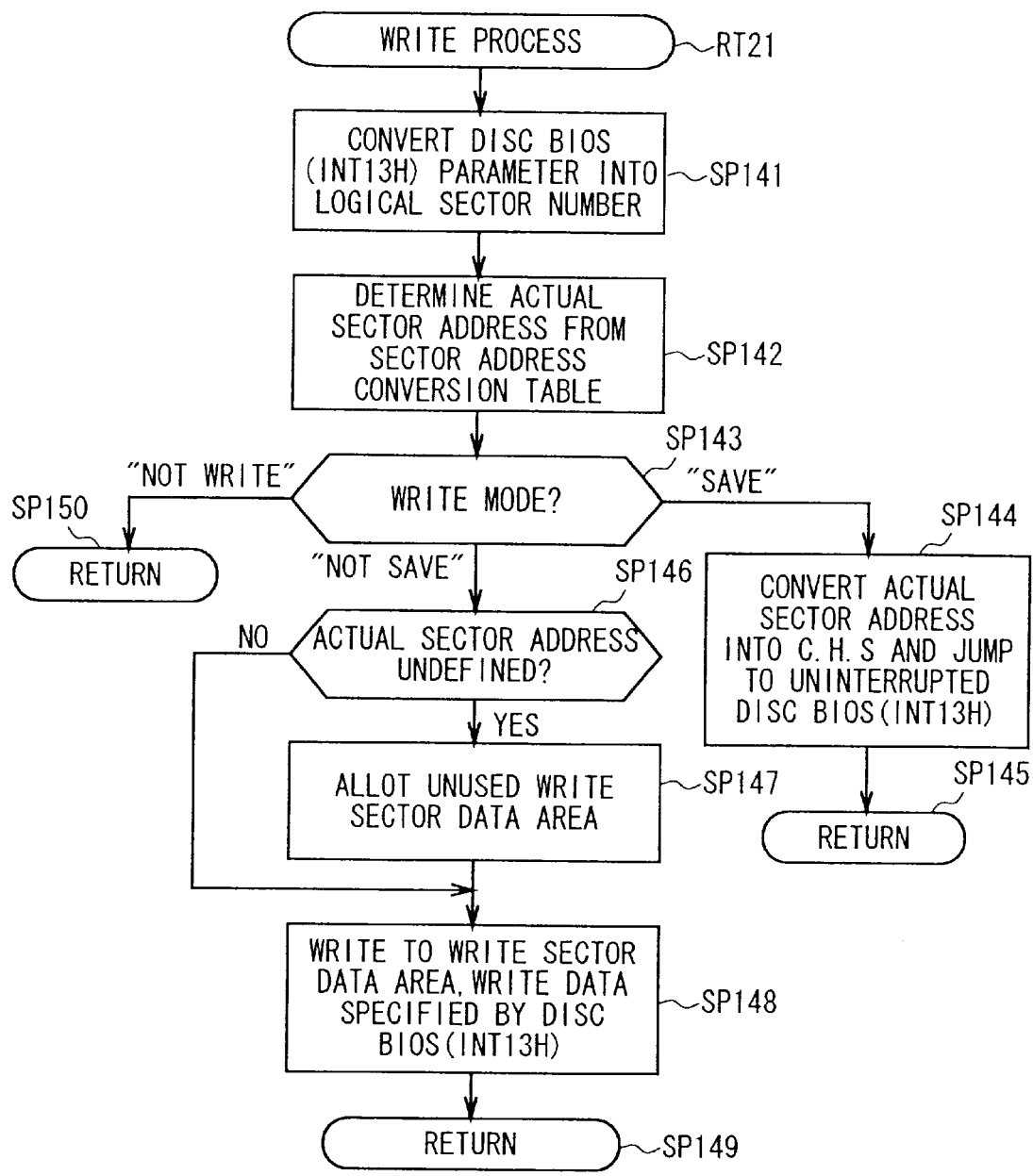
FIG. 33 is a flowchart showing the details of a write process routine RT21 in FIG. 32.

The function specified by the program data in the interrupt destination address describing vector "disc BIOS (INT13H)" includes a "write process (WRITE), " a "read process (READ)," and "another process." On determining that the "write process (WRITE)" is specified, the operation input control section 62 executes a write process routine RT21, shown in FIG. 33, and then completes the interrupt process routine RT14 in step SP133.

Figure 34:
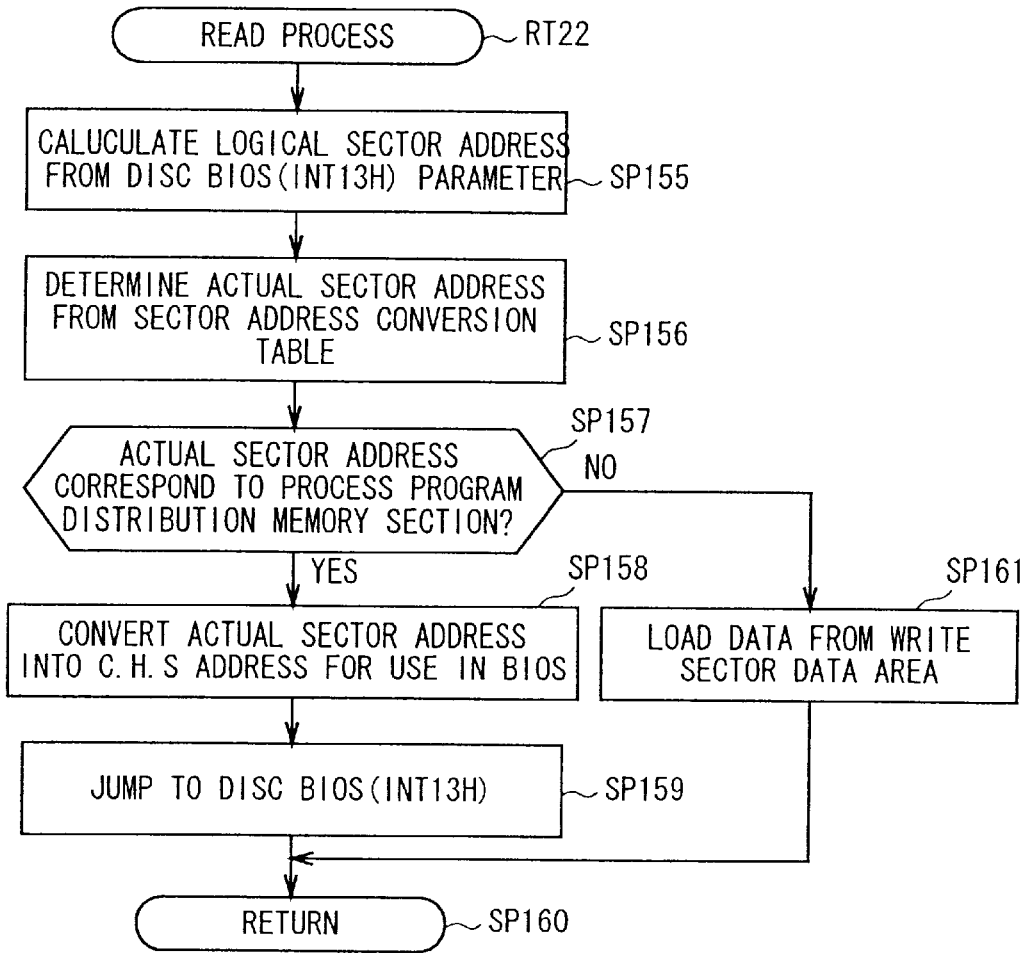
FIG. 34 is a flowchart showing the details of a read process routine RT22 in FIG. 32.

In addition, on determining in step SP132 that the "read process (READ)" is specified, the operation input control section 62 executes a read process routine RT22, shown in FIG. 34, and then completes the interrupt process routine RT14 in step SP133.

Furthermore, on determining in step SP132 that the "another process" is specified, the operation input control section 62 advances to a step SP134 to jump to a memory address used before the interruption and written to the interrupt destination address describing vector "disc BIOS (INT13H)" (the memory address saved in step SP123 of the above described "process step SP98 for execution and populating of an access control program from externally supplied data" (FIG. 31)) to execute a function described in program data with a sector number used before the interruption. The operation input control section 62 subsequently completes the interrupt process routine RT14 in step SP133.

In addition, on determining in step SP131 that the operation mode is the "HDD" indicating that a hard disc drive is connected, the operation input control section 62 shifts to the above described step SP134 to jump to the memory address used before the interruption to complete the interrupt process routine RT14 in step SP133.

After entering the write process (WRITE)" routine RT21 in FIG. 33 is entered. Then, in step SP141, to access the interrupt destination address describing vector "disc BIOS (INT13H)," the operation input control section 62 uses parameters (that is, cylinder, head, and sector number information) to convert the vector into logical sector numbers and then uses the sector address conversion table to determine actual sector addresses in step SP142.

Thus, the operation input control section 62 can execute program data in interrupt process files described in the actual sector addresses of the conversion destination in the sector address conversion table.

The operation input processing section 43 subsequently determines whether the write mode WRITE is either the "save write data" mode or the "not save write data" mode or the "not write data" mode in step SP143.

When the "save" mode is determined in step SP143, the operation input control section 62 proceeds to a step SP144 to convert the actual sector addresses into parameter data C.H.S (that is, cylinder, head, and sector number information) and then jumps to the interrupt destination address describing vector "disc BIOS (INT13H) used before the interruption (that is, the memory address saved in step SP123 (FIG. 31)) to write and save the current write data to the process program distribution memory section 42 connected to the operation input control section 62.

Thus, the operation input control section 62 completes the write process in step SP145.

Next, on determining the "not save write data" mode in step SP143, the operation input control section 62 shifts to the step SP146 to determine whether or not the actual sector addresses determined in step SP142 are undefined. When an affirmative result is obtained (this means that the actual sector addresses are not defined on the RAM of the operation input control section 62), the operation input control section 62 advances to a step SP147 to allot free sector areas on the RAM for write data and then writes the current write data to the allotted write sector data areas in step SP148.

Thus, the operation input control section 62 writes the generated write data to the RAM thereof so as to use the write data written to the RAM until the power supply to the operation input control section 62 is turned off. After, however, the power supply has been turned off, the operation input control section 62 operates to delete the write data instead of saving it.

The operation input control section 62 subsequently completes the write process in step SP149.

Furthermore, on determining the "not write data" mode in step SP143, the operation input control section 62 immediately completes the write process in step SP150.

In this manner, during the write process (WRITE) routine RT21, whenever the write mode occurs while the program data supplied by the process program distribution memory section 42 as externally supplied data is being executed, the operation input control section 62 saves the write data by writing it to the process program distribution memory section 42 depending on the specified processing mode, temporarily uses it instead of saving it to the process program distribution memory section 42, by writing it to the RAM of the operation input control section 62, or accepts no writes (in this case, the operation input control section 62 can proceed to the next processing operation without executing an error process as a personal computer).

Accordingly, the operation input control section 62 can selectively use the three types of write modes (WRITE), thereby allowing the user to operate the operation input processing section 43 more easily.

On entering the "read process (READ)" routine RT22 of the interrupt process routine RT14 in FIG. 32, the operation input control section 62 calculates logical sector addresses from parameters (that is, cylinder, head, and sector number information) in the interrupt destination address describing vector "disc BIOS (INT13H)" in step SP155, and subsequently uses the sector address conversion table to determine actual addresses representing the numbers of sectors in which file data is described, in step SP156, as shown in FIG. 34.

The operation input control section 62 thus knows the sector addresses of memory areas in which the file data to be read is stored.

The operation input control section 62 determines in step SP157 whether or not the actual sector addresses indicate address numbers of the process program distribution memory section 42.

When an affirmative result is obtained, this means that the program data to be read is present in the process program distribution memory section 42 comprising a compact flash memory. The operation input control section 62 then shifts to a step SP158 to convert the actual sector addresses into C.H.S parameters (that is, cylinder, head, and sector number information) representing addresses on a personal computer and used for the disc BIOS and then jumps to the interrupt destination address describing vector "disc BIOS (INT13H)" in step SP159.

Thus, the operation input control section 62 reads program data from the process program distribution memory section 42 in accordance with program data described in a vector specified in the interrupt destination address describing vector "disc BIOS (INT13H)" and then completes the read process (READ) routine in step SP160.

On the contrary, when a negative result is obtained in step SP157 (this means that the actual sector addresses indicate memory areas other than those of the process program distribution memory section 42, that is, memory areas on the RAM of the operation input control section 62), the operation input control section 62 advances to a step SP161 to loads data from sector data areas on the RAM specified by the actual sector addresses and then completes the read process (RAED) routine in step SP160.

In this manner, by allowing the read process (READ) routine RT22 to execute its processing so that when the process program distribution memory section 42 is in use, the operation input execution section 63 is controlled and operated using the program data loaded from the process program distribution memory section 42, the operation input control section 62 can allow the operation input execution section 63 to automatically perform an issuance operation.

In this case, if program data has been written to the process program distribution memory section 42 during the write process routine (FIG. 33), this newly written program data can be used to modify the automatic issuance operation performed by the operation input execution section 63 as required.

If program data has been written to the write sector data area of the RAM of the operation input control section 62, the program data written to the RAM can be used to control the automatic issuance operation performed by the operation input execution section 63.

[4] Operation of Operation Input Processing Apparatus

The simulation device section 41 starts a simulation operation when the user turns on the power supply to the test execution processing section 41A and process program creation section 41D while the basic program storage section 41B is connected to the test execution processing section 41A.

First, by executing the preprocess routine RT10 in FIG. 18, the test execution processing section 41A writes, as a preprocess, an access control program to the basic program storage section 41B comprising hard disc drive, the access control program accessing the program data in the compact flash memory constituting the process program distribution memory section 42.

The test execution processing section 41A subsequently provides the read command S1 for the basic program storage section 41B in response to the user's instruction input to read from the basic program storage section 41B program data S2 required to allow the testing operation input execution section 41C to automatically perform an issuance operation. Consequently, the testing operation input execution section 41C automatically performs an issuance operation.

The read command S1, which has been provided for the basic program storage section 41B by the test execution processing section 41A, is supplied to the process program creation section 41D via the read command sector address conversion circuit 41E.

The process program creation section 41D executes the read sector number loading process routine RT1 in FIG. 20 to form and save the sector access determination table 41F on the ROM.

Next, the user turns off the power supply to the test execution processing section 41A and process program creation section 41D, disconnects the basic program storage section 41B from the test execution processing section 41A, and reconnects it to the process program creation section 41D. When the user then turns on the power supply to the process program creation section 41D, the process program creation section 41D, in response to the user's operation, executes the file data storage process routine RT12 in FIG. 22.

In this case, the process program creations section 41D extracts from the basic program storage section 41B those of the program data stored therein that have the logical "1" determination flag set in the sector access determination table 41F and places these program data in the working file memory 41G. The process program creation section 41D then sequentially copies the program data to the process program distribution memory sections 42 (42A, 42B, 42C, . . . ) that must each distribute the data to a corresponding one of the plural operation input processing sections 43 (43A, 43B, 43C, . . . ).

In allowing the file data storage process routine RT12 to execute its processing, the user can select, through a specification for the process program creation section 41D, either the "file extraction mode" (FIG. 26) or the "file and sector extraction mode" (FIG. 27) or the "file and sector extraction and compression mode" (FIG. 28) for extracting the program data in the process program distribution memory section 42, thereby minimizing the memory capacity of the process program distribution memory section 42.

In addition, the process program creation section 41D sets either the "save" mode or the "not save" mode or the "not write" mode as a write mode (WRITE) that can be executed by the operation input control section 62 in response to the user's instruction input (the step SP89 in FIG. 22).

Thus, the simulation device section 41 creates the plurality of process program distribution memory sections 42 (42A, 42B, 42C, . . . ) in a fashion corresponding to the plurality of operation input processing sections 43 (43A, 43B, 43C, . . . ).

The user connects the plurality of process program distribution memory sections 42 (42A, 42B, 42C, . . . ) to the connection ports 61 of the corresponding operation input processing sections 43 (43A, 43B, 43C, . . . ). Consequently, the program data in the basic program storage section 41B which is required to drive and control the operation input execution section 63 that automatically performs an issuance operation can be distributed to the corresponding operation input processing sections 43 (43A, 43B, 43C, . . . ) via the process program distribution memory sections 42 (42A, 42B, 42C, . . . ), using distribution means of a minimum capacity.

The operation input processing sections 43 each execute the operation input processing routine RT13 in FIG. 30 to in turn execute the access control program loaded in the process program distribution memory section 42 during the preprocess so that the program data stored in the process program distribution memory sections 62 are consistent with the functions of the personal computer constituting the operation input control section 62, thereby loading program data from the process program distribution memory section 42 into the operation input control section 62.

At this point, the operation input control section 62 allows the "routine for executing and populating an access control program from externally supplied data" SP98 (FIG. 31) to execute its processing to set file data for the operation input control section 62 depending on the operation mode specified for the process program distribution memory section 42 in conjunction with a write of new program data and on the compression mode for the program data from the distribution program distribution memory section 42, thereby enabling such drive and control that an issuance operation is automatically performed depending on the user's specifications.

In this case, the operation input control section 62 executes the interrupt process routine RT14 in FIG. 32 to in turn execute the write process routine (WRITE) RT21 in FIG. 33, the read process routine (READ) RT22 in FIG. 34, and other processes based on the file data specified by the program data loaded from the process program distribution memory section 42.

Thus, in allowing the operation input execution section 63 to automatically perform an issuance operation based on the program data extracted from the basic program storage section 41B, the operation input control section 62 can execute such processing that new data is written and saved to the process program distribution memory section 42 depending on the operator's write instruction information or processed on the RAM of the operation input control section 62 without the write or saving operation, or that new write data is neglected while only externally supplied program data is executed. As a result, the operation input processing section 43 can perform processing operations that can be easily used by the user.

Figure 35:
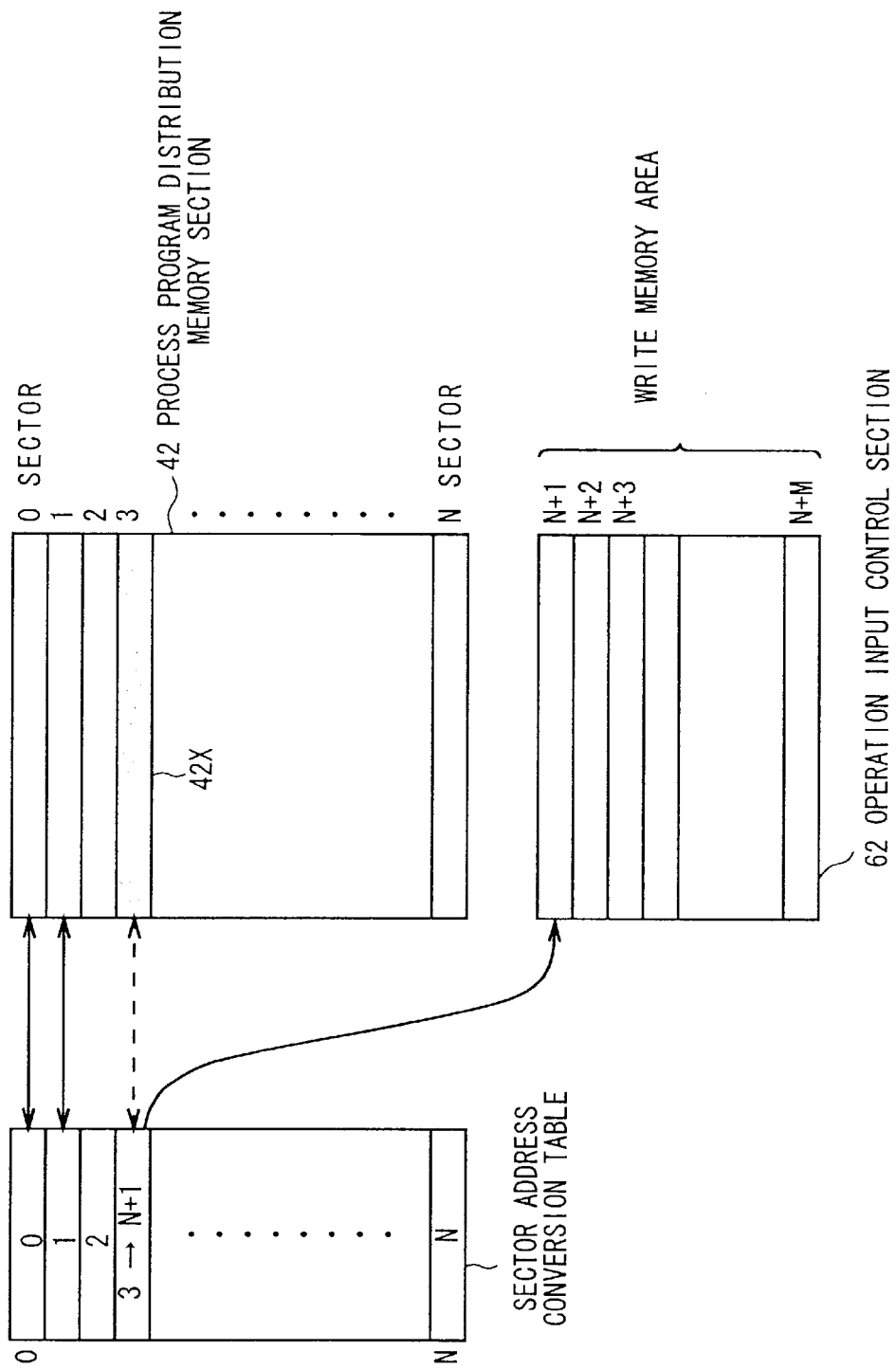
FIG. 35 is a schematic diagram useful in explaining a data process executed in the "file extraction mode" by the operation input control section 62 in FIG. 17.

If program data has been written to the process program distribution memory section 42 in the "file extraction mode," then within the sector numbers of the process program distribution memory section 42, the operation input control section 62 retains, without a rewrite, data at memory locations of the sector address conversion table corresponding to the file numbers of those files for which no write command has been issued during execution of the program data for the operating system (OS), but for memory areas with sector numbers corresponding to those files for which a data write command has been issued during the execution of the program data for the operating system (OS) program, the operation input control section 62 retains new file data from a file 12X with a corresponding sector number (for example, sector number 3) in the sector address conversion table, at a sector number N+1 in write memory areas formed on the RAM of the operation input control section 62, as shown in FIG. 35.

Thus, when a command for a write of new program data is issued specifying the sector number of the file 42X, which is part of the process program distribution memory section 42, the sector address conversion table retains the new write data in the write memory area on the RAM of the operation input control section 62, thereby enabling the operating system (OS) to determine that the write data has been completely written to the process program distribution memory section 42 (no error has occurred) to continue its processing operation.

If the "save" operation mode is specified for the process program distribution memory section 42 as the write mode (WRITE), the program data in the write memory area may be copied later to the memory area 42X in the process program distribution memory section 42 having the sector number at which the data has been written, or the program data may be directly written to the memory area 42X of the process program distribution memory section 42 without changing the sector address conversion table.

In addition, if the "not save" mode has been specified as the write (WRITE) mode, the program data retained in the write memory area of the operation input control section 62 may be deleted when the power supply to the operation input control section 62 is turned off.

Additionally, if the "not write" mode has been specified as the write (WRITE) mode, a write instruction for the new write data may be neglected without converting the sector address conversion table or writing the program data to the write memory area of the operation input control section 62.

Figure 36:
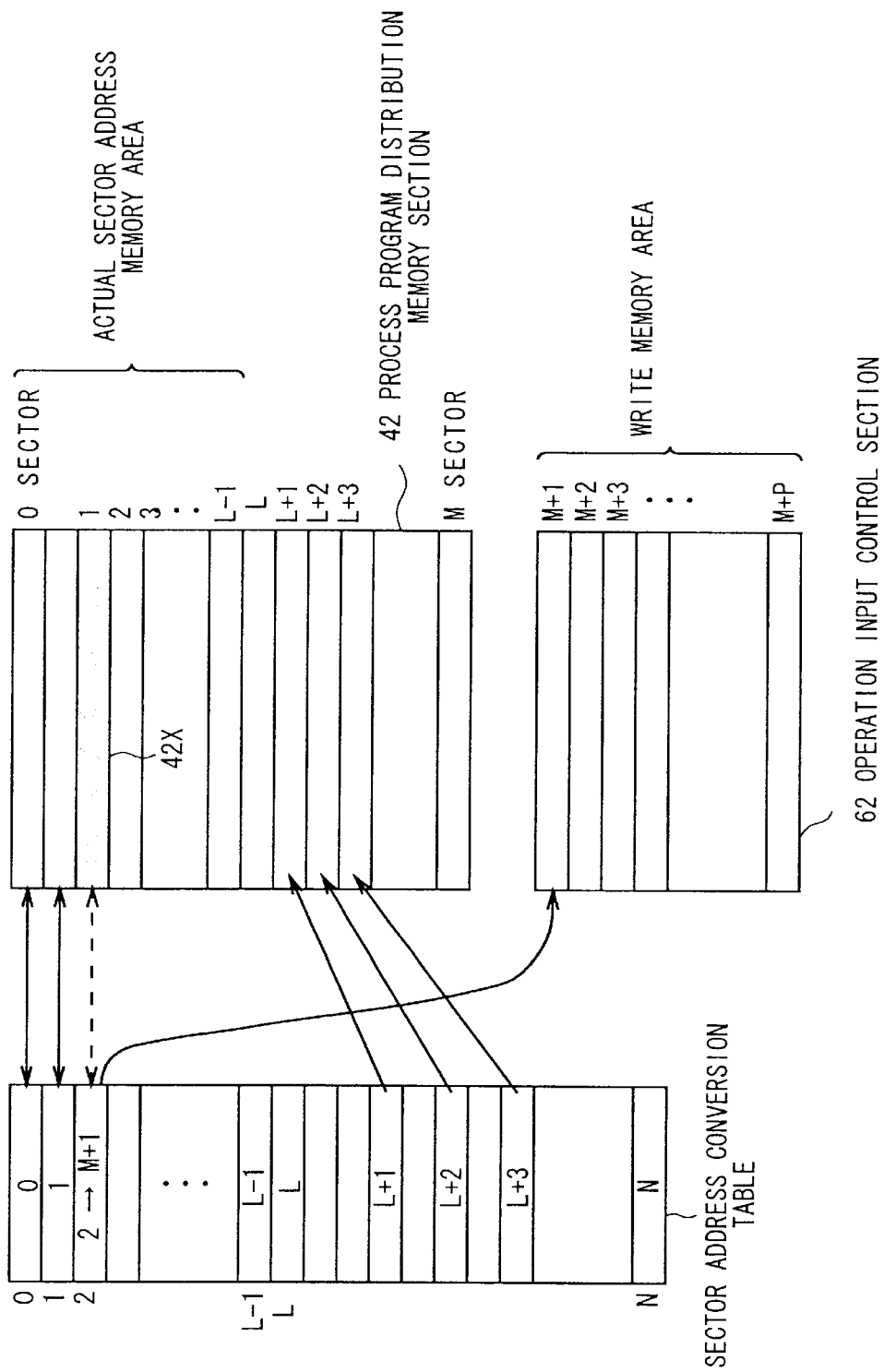
FIG. 36 is a schematic diagram useful in explaining a data process executed in the "file and sector extraction mode" by the operation input control section 62 in FIG. 17.

In addition, if the extraction mode for the program data in the process program distribution memory section 42 is the "file and sector extraction mode" and when the write (WRITE) mode is the "not save" mode as shown in FIG. 36, part of the sector address conversion table is rewritten which corresponds to the sector number of the process program distribution memory section 42 at which the data has been written (in this example, the sector number 2 is converted into the sector number N+1 in the write memory area on the RAM of the operation input control section 62).

Thus, for the sector number for which a write command has been issued by the operating system (OS), the new write data can be retained in the write memory area of the operation input control section 62 without aborting the processing operation of the operating system.

In this case, when the write mode (WRITE) is the "save" and "not write" modes, no write memory area needs to be provided in the operation input control section 62. Alternatively, in the "save" mode, new data may be directly written to the process program distribution memory section 42, and in the "not write" mode, the write data may be neglected.

Figure 37:
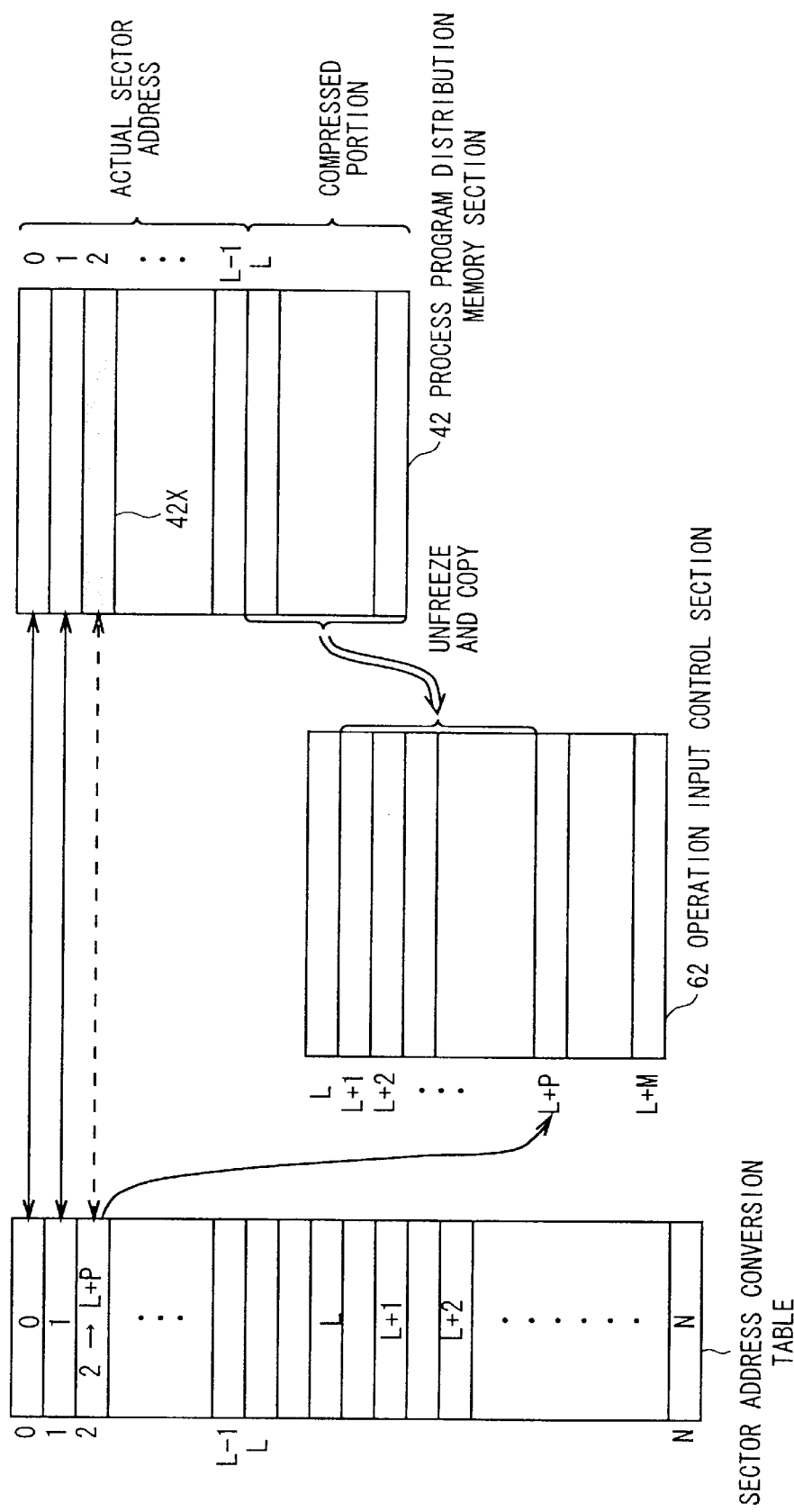
FIG. 37 is a schematic diagram useful in explaining a data process executed in the "file and sector extraction and compression mode" by the operation input control section 62 in FIG. 17.

In contrast, when the extraction mode for the program data stored in the process program distribution memory section 42 is the "file and sector extraction and compression mode," the process program distribution memory section 42 has memory areas to which compressed program data have been written and actual sector address memory areas to which non-compressed data has been written, as shown in FIG. 37. The data in the compressed memory areas are subjected to a reverse-compression and unfreezing process by the operation input control section 62 and then retained on the RAM thereof for use.

Thus, when the write mode (WRITE) is the "not save" mode and when data has been written to the sector number of an actual sector address memory area of the process program distribution memory section 42, the corresponding sector number in the sector address conversion table is changed to the sector number of a new memory area in the operation input control section 62.

Thus, when the operating system (OS) issues a write command to the RAM of the operation input control section 62, the write data is retained on the RAM of the operation input control section 62.

In this case, when the write mode (WRITE) is the "save" mode, the write data is directly written to the actual sector address memory area of the process program distribution memory section 42. In the "not write" mode, the write command is neglected.

In this manner, when a write command is issued while the operation input control section 62 is driving and controlling the operation input execution section 63 using the operating system stored in the process program distribution memory section 42, the write data can be processed without aborting the operation of the operating system.

[5] Other Embodiments

In FIG. 22, after the program data in the working file memory of the process program creation section 41D has been written to the process program distribution memory section 42 in step SP88, the process program creation section 41D sets the write mode for the process program distribution memory section 42 in step SP89, thereby enabling the write mode (WRITE) to be set for the plurality of process program distribution memory sections 42 (42A, 42B, 42C, . . . ).

Alternatively, the setting of the write mode (WRITE) in step SP89 may be executed before the processing in step SP88 to enable the user to set the same write mode (WRITE) for the plurality of process program distribution memory sections 42 (42A, 42B, 42C, . . . ) by means of a single setting operation. Therefore, processing operations are much easier.

Figure 38:
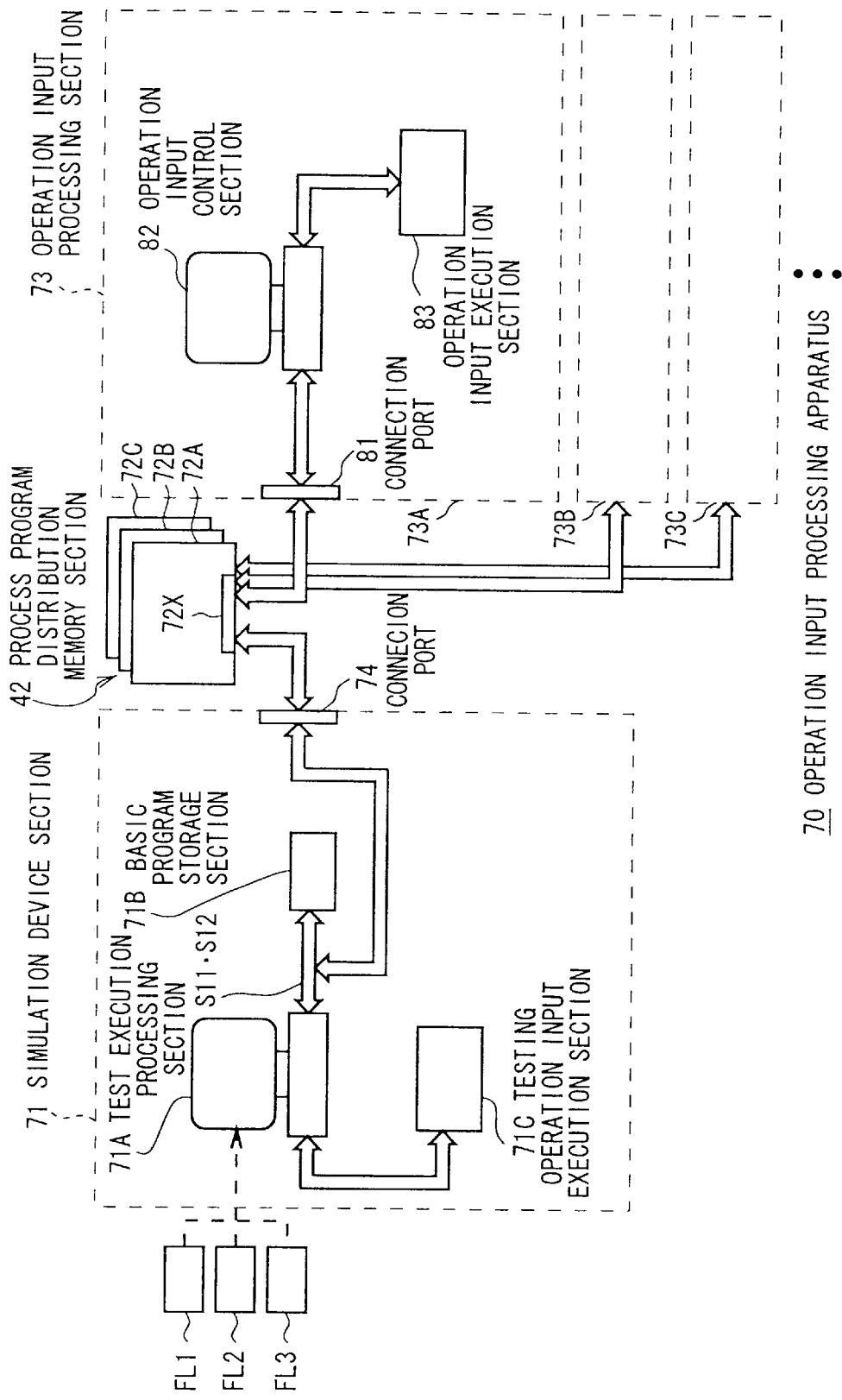
FIG. 38 is a block diagram showing an operation input processing apparatus 70 according to the third embodiment.

[3] Third Embodiment (1) Entire Configuration of Operation Input Processing Apparatus In FIG. 38, reference numeral 70 generally denotes an operation input processing apparatus comprising an automatic issuance machine for issuing, for example, tickets for concerts in response to users' input operations, and has a simulation device section 71, a process program distribution memory section 72, and an operation input processing section 73.

The simulation device section 71 extracts from software resources having a standard operating system program (OS) and application programs, operating system program (OS) data and application program data that are required to drive and control the automatic issuance machine, which is a hardware, and then writes those extracted data to a plurality of process program distribution memory section 72.

The process program distribution memory section 72 supplies the operating system program (OS) data and application program data required to drive and control the automatic issuance machine, to a plurality of locally distributed automatic issuance machines as externally supplied data.

Based on the operating system program (OS) data and application program data supplied by the process program distribution memory section 72, the operation input processing section 73 executes such processing that a specified ticket is issued, in response to an operation input signal input by a user.

(2) Simulation Device Section

The simulation device section 71 has a test execution processing section 71A comprising a personal computer to provide a program data read instruction to the basic program storage section 71B when the user operates the test execution processing section 71A for input.

The basic program storage section 71B comprises a hard disc drive device to store in part thereof the operating system program and application program required to allow the operation input processing section 73 to perform the issuance operation. When provided with a read command (also referred to as an IDE command) S11 by the test execution processing section 71A, the basic program storage section 71B supplies the corresponding program data S12 to the test execution processing section 71A. Thus, in the operation input processing section 73, a test execution processing section 71A obtains from the basic program storage section 71B the operating system (OS) program and application program required for a test operation performed by a testing operation input execution section 71C having the same configuration as an operation input processing section 83 comprising an automatic issuance machine and driven and controlled by an operation input control section 82 comprising a personal computer, thereby allowing a testing operation input execution section 71C to perform a test control operation.

The basic program storage section 71B comes standard with a large number of application programs for performing various data processing operations, as well as the operating system (OS) program. These application programs are stored in a recording medium comprising, for example, a hard disc, and part (program data stored in a file specified by the read command) of the stored operating system (OS) program and application program is supplied to the test execution processing section 171A for a processing operation.

Figure 39:
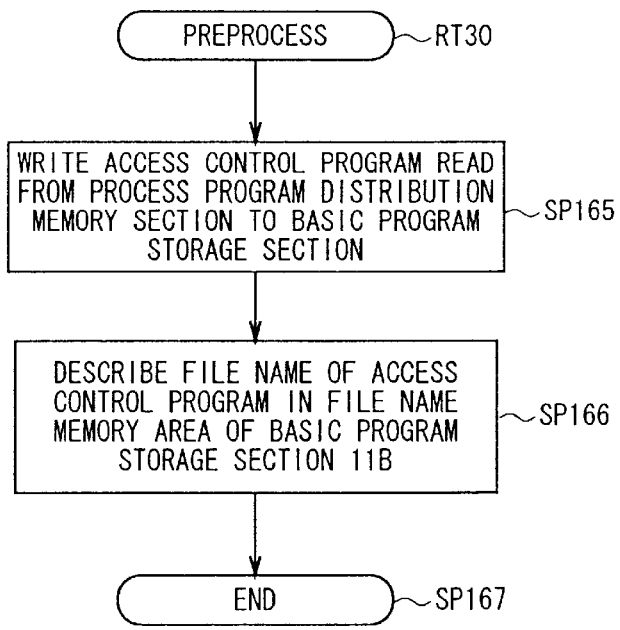
FIG. 39 is a flowchart showing a preprocess routine RT30 for a basic program storage section 71B in FIG. 38.

In addition, before performing a test operation on the testing operation input execution section 71C, the test execution processing section 71A executes a preprocess routine RT30, shown in FIG. 39, in response to a user's input operation.

In the preprocess routine RT30, a central processing unit (CPU) of the test execution processing section 71A enters a step SP165 to execute a process of writing an access control program to a file data memory area of the basic program storage section 71B in order to write to the operation input processing section 73 data stored in the process program distribution memory section 72. At the next step SP166, this central processing unit describes the file name of the access control program in a file name memory area of the basic program storage section 71B. Thus, the test execution processing section 71A completes this preprocess at a step SP167.

In fact, such a preprocess is executed by installing in the test execution processing section 71A a floppy disc FL1 having a preprocess program written thereto.

Figure 40:
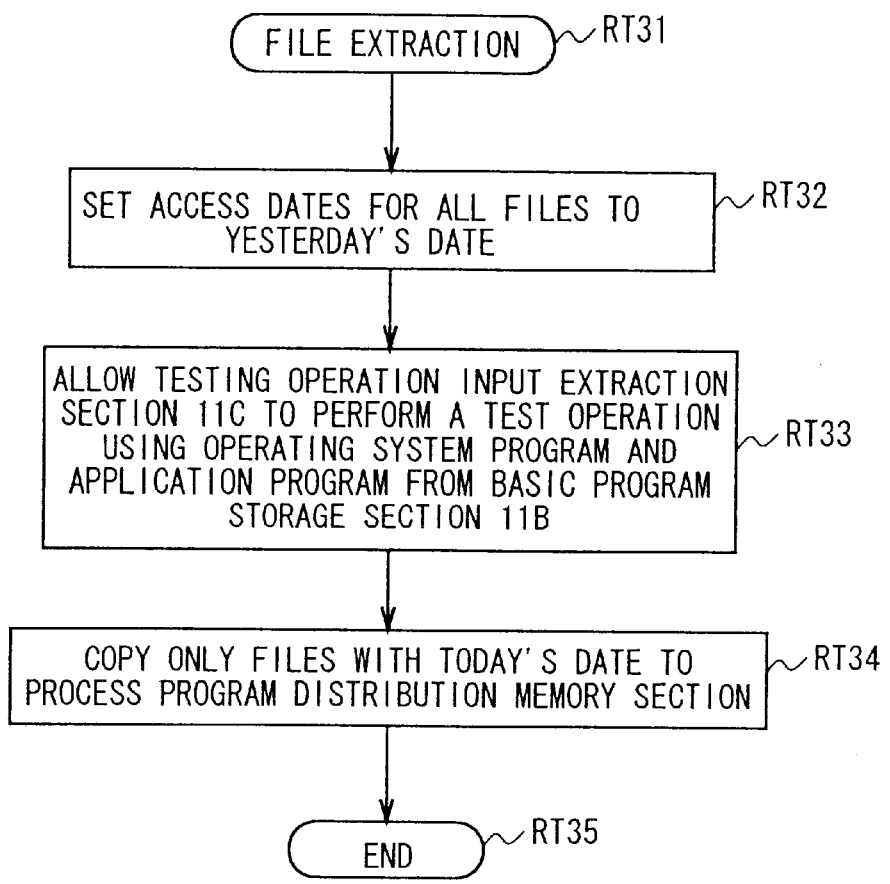
FIG. 40 is a flowchart showing a file extraction process procedure RT31 executed by a test execution processing section 71A in FIG. 38.

The program data supplied by the basic program storage section 71B when the test execution processing section 71A allows the testing operation input execution section 71C to perform a test operation are extracted from the basic program storage section 71B and stored in the process program distribution memory section 72 when the test execution processing section 71A executes a file extraction process procedure RT31, shown in FIG. 40.

In the file extraction process procedure RT31, the test execution processing section 71A first executes a process routine RT32 to set access dates for all files in the basic program storage section 71B to a particular date (for example, "yesterday's date") in order to initialize the access dates for all the files in the basic program storage section 71B.

Figure 41:
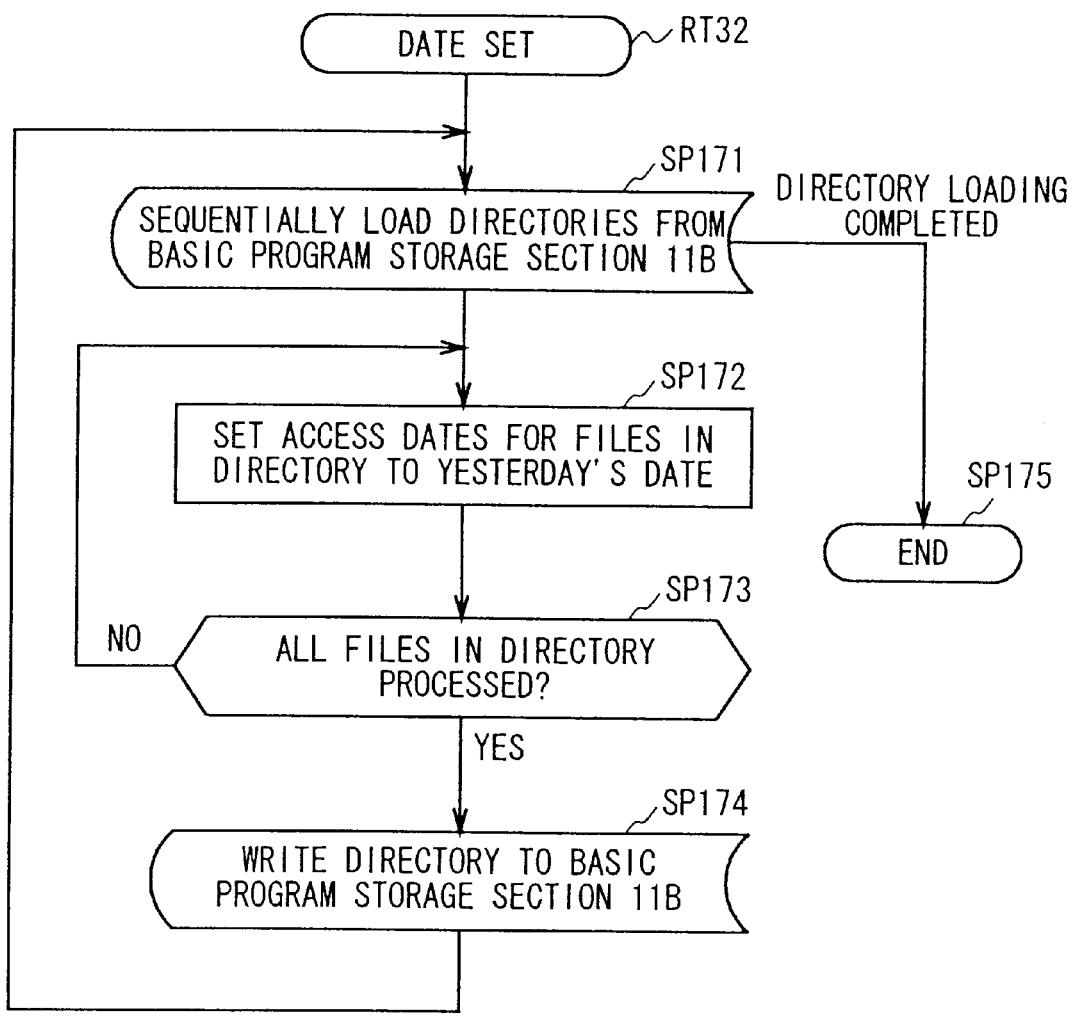
FIG. 41 is a flowchart showing a date set process routine RT32 in FIG. 40.

This date set process routine RT32 installs in the test execution process section 71A a floppy disc FL2 having a date set process program, shown in FIG. 41, to allow the test execution process section 71A to carry out the date set process program.

On entering the date set process routine RT32, the test execution process section 71A sequentially loads directories from the basic program storage section 71B at a step SP171.

At the next step SP172, the test execution process section 71A initializes the directories loaded from the basic program storage section 71B by setting an access date for each file at a predetermined one (for example, "yesterday's date").

Such date setting is carried out for each file, and on determining at a step SP173 that the date has been set for all the files, the test execution processing section 71A shifts to a step SP174 to write to the basic program storage section 71B the directories for which the date has been initialized, and then returns to the above described step SP171.

The access date initialization process between the steps SP171 and SP174 is carried out for each directory of the basic program storage section 71B. Once all the directories have been processed, the test execution process section 71A proceeds from the step SP171 to a step SP175 to complete the date set process routine.

When the date set process routine RT32 has been completed in this manner, the test execution processing section 71A executes the next process routine RT33 (FIG. 40) of the file extraction process procedure.

In processing by the process routine RT33, operating system program and application program in the basic program storage section 71B are used to allow the testing operation input execution section 71C to perform the test operation. In this case, file data of the program data in the basic program storage section 71B which file data is required for the test operation performed by the testing operation input execution section 71C are accessed by a read command IDE command and read out by the test execution process section 71A as program data S12. Additionally, the access execution date, that is, "today's date" is written to access dates for corresponding file names as history data.

When testing operation input execution section 71C has completed the test operation to indicate that the testing operation input execution section 71C operates as an automatic issuance machine, the test execution processing section 71A advances to the next process routine RT34 of the file extraction process procedure (FIG. 40).

The process routine RT34 executes such processing that only file data having the "today's date" as the access date are extracted from the program data in the basic program storage section 71B, the file data being, and is then stored in the process program distribution memory section 72.

Figure 42:
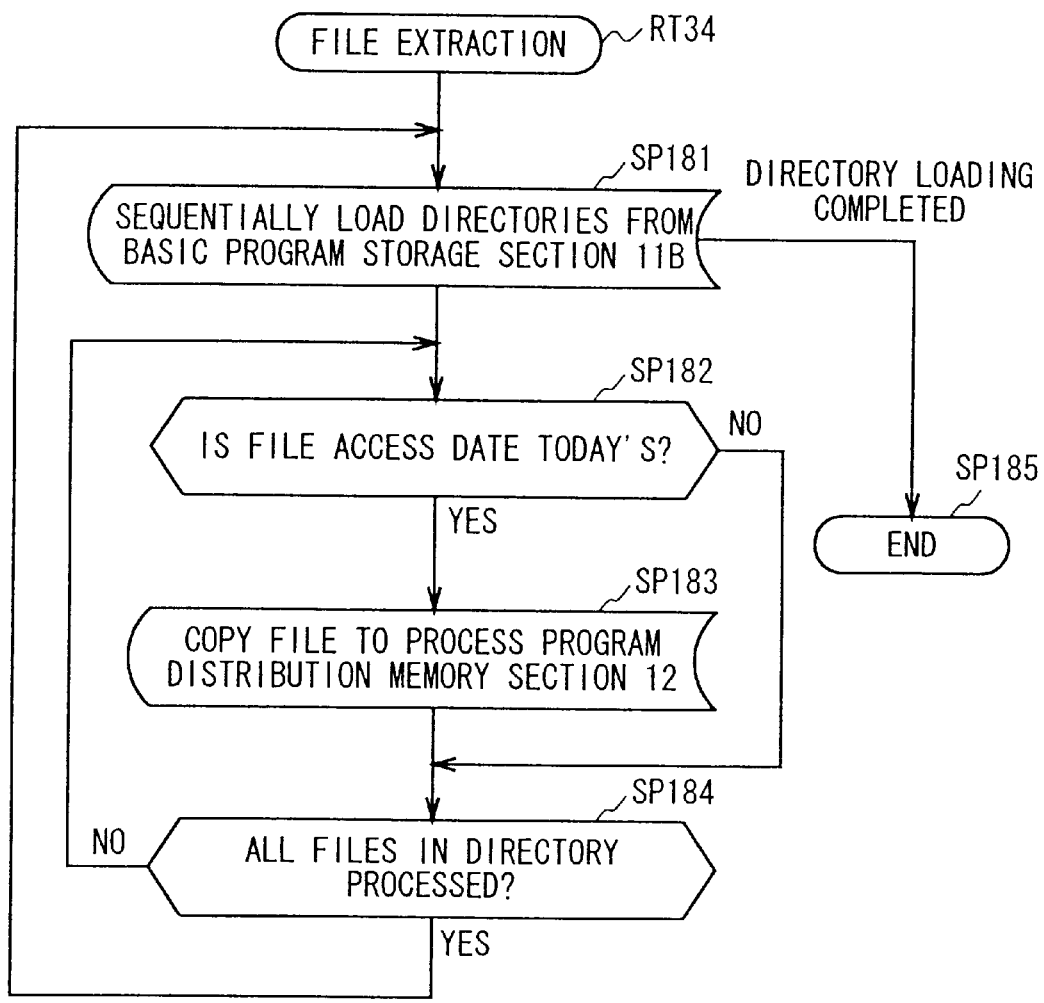
FIG. 42 is a flowchart showing a file extraction process routine RT34 in FIG. 40.

That is, on entering the file extraction process routine RT34, the test execution processing section 71A sequentially loads all the directories from the basic program storage section 71B at a step SP181 and then determines at a step SP182 whether or not the access date for each of the files contained in the loaded directories is the "today's date," as shown in FIG. 42.

If a positive result is obtained, this means that this file was accessed when the testing operation input execution section 71C performed the test operation during the above described process procedure RT33.

Then, the test execution processing section 71A shifts to the next step SP183 to copy the file to the process program distribution memory section 72 connected to a connection port 7 and then proceeds to the next step SP184.

On the contrary, when a negative result is obtained at the step SP182, this means that this file was not accessed when the testing operation input execution section 71C performed the test operation during the process procedure RT33 and that the file still has the initialized date (that is, the "yesterday's date"). Then, the test execution processing section 71A shifts to the next step SP184 without executing the copy process at the step SP183.

In the processing at the step SP184, it is determined whether or not all the files in the directory have been processed, and when a negative result is obtained, the test execution processing section 71A advances to the above described step SP182 to repeat the extraction process for the other files in the directory.

Once all the files in the directory have been extracted, an affirmative result is obtained at the step SP184 and the test execution processing section 71A thus returns to the above described step SP181 to load another directory from the basic program storage section 71B to repeat the processing for this directory.

Then, when all the directories in the basic program storage section 71B have been processed, the test execution section 71A shifts from the step SP181 to a step SP185 to complete the processing by the file extraction process routine RT34.

Once the file extraction process routine RT34 of the file extraction process procedure RT31 has been completed, the test execution processing section 71A completes the file extraction process procedure.

Figure 43:
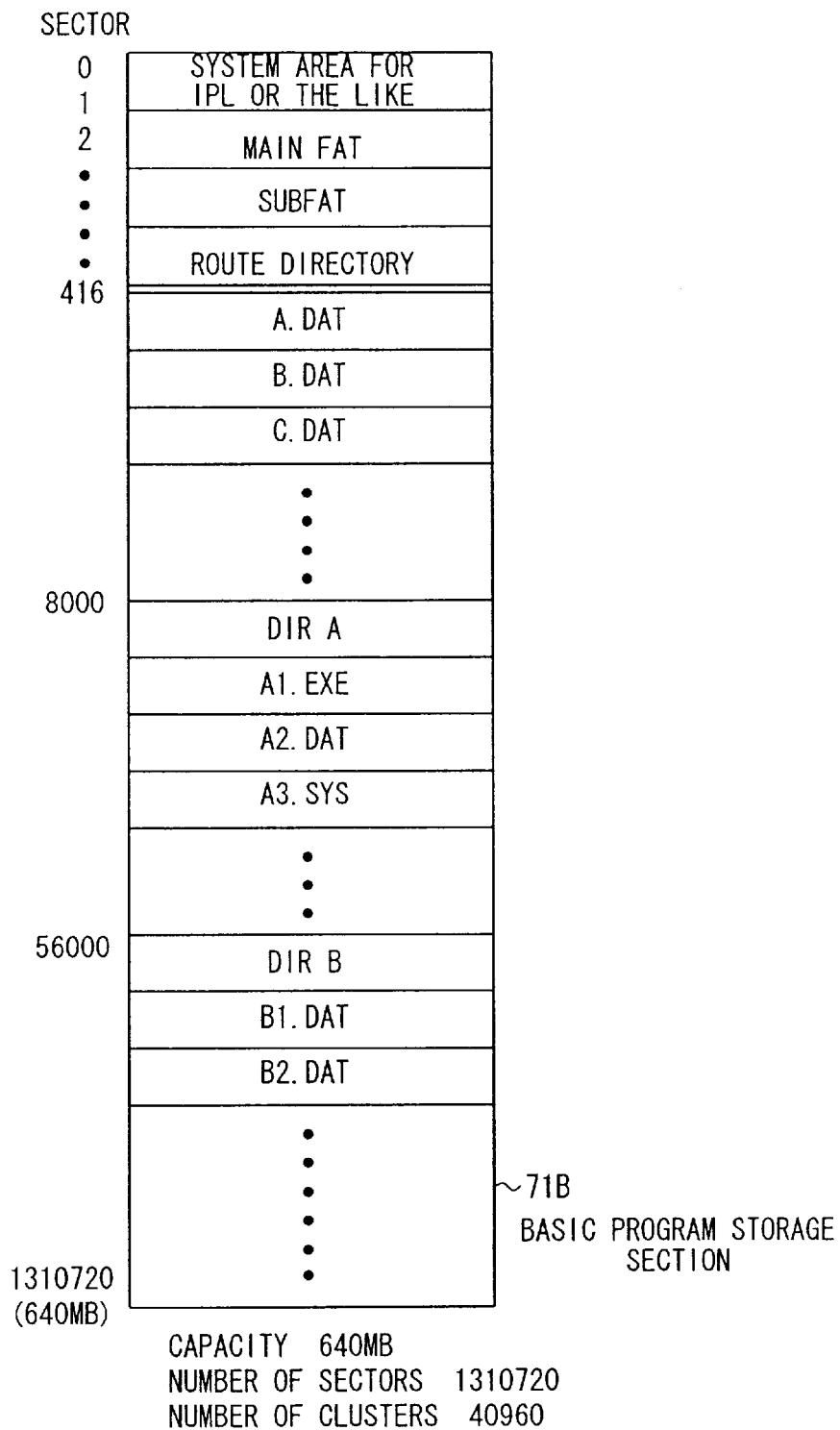
FIG. 43 is a schematic diagram showing a configuration of a basic program storage section 71B in FIG. 38.

According to this embodiment, the basic program storage section 71B has a system area for an initial program loader (IPL), a main file allocation table (FAT), a subfile allocation table (subFAT) in which the copy data is stored, and a root directory all stored in memory areas with sector numbers "0" to "415," as shown in FIG. 43.

In addition, program data with file names A.DAT, B.DAT, C.DAT, are stored in file memory areas with sector numbers "416" to "7,999."

Further, a subdirectory DIRA and program data with file names A1.EXE, A2.DAT, A3.SYS, . . . are stored in file memory areas having a sector number "8,000" as a leading address.

Furthermore, a subdirectory DIRB and program data with file names B1.DAT, B2.DAT, . . . are stored in file memory areas having a sector number "56,000" as a leading address.

The initial program loader (IPL) is program data for starting up a processing operation based on program data from the basic program storage section 71B.

In addition, the main file allocation table (main FAT) and the subfile allocation table (subFAT) are data for managing a series of logical sector numbers on the hard disc in the basic program storage section 71B.

Furthermore, as shown in FIG. 44, the route directory has sequentially described therein the "file names" A.DAT, B.DAT, C.DAT, . . . stored in the data storage area having the sector number "416" as a leading address, addresses (that is, "FAT entries") of the subdirectory DIRA, that is, "2," "4," "6," . . ., "file sizes" 18,000," "24,000," "16,000," . . ., and "other information." Thus, the file names A.DAT, B.DAT, C.DAT, . . . and the program data names for the files in the subdirectory DIRA can be accessed as addresses based on a cluster address classification. The access date is written to an "access date" column.

As shown in FIG. 45, the subdirectory DIRA has described therein the "file names" A1.EXE, B2.DAT, and A3.SYS stored in the memory areas having the sector number "8,000" as a leading address, "FAT entries" comprising cluster addresses at which the files in the subdirectory DIRB are present, "file sizes," and "other information," thereby enabling accesses to the program data stored in these memory areas. The access date is written to the "access date" column.

Furthermore, as shown in FIG. 46, the subdirectory DITB has described therein the "file names" B1.DAT and B2.DAT stored in the memory areas having the sector number "56,000" as a leading address, "FAT entries" comprising cluster addresses at which the corresponding files are present, "file sizes," and "other information," thereby enabling accesses to the program data stored in these memory areas. The access date is written to the "access date" column.

When a plurality of operation input processing sections 73 (73A, 73B, 73C, . . . ) are distributively disposed, the file data extraction process routine RT34 (FIG. 42) effectively connects connection ports 72X of plural process program distribution memory sections 72 (72A, 72B, 72C, . . . ) to the connection port 74 of the simulation device section 71 in a fashion corresponding to the plurality of operation input processing sections 73 (73A, 73B, 73C, . . . ), to repeat the process of writing program data.

This enables the simulation device section 71 to create the plurality of process program distribution memory sections 72 (72A, 72B, 72C, . . . ) that store an operating system (OS) program and application program for allowing the operation input execution section 83 in each of the plural operation input processing sections 73 (73A, 73B, 73C, . . . ) to automatically perform an issuance operation.

(3) Operation Input Processing Section

When the connection port 72X of each process program distribution memory section 72 (72A, 72B, 72C, . . . ) is connected to a connection port 81 of the corresponding operation input processing section 73 (73A, 73B, 73C, . . . ), the process program distribution memory section 72 (72A, 72B, 72C, . . . ) is connected to the operation input control section 82 comprising a personal computer. When the user performs an input operation on the operation input control section 82, the operation input control section 82 uses the program data stored in the process program distribution memory section 72 (72A, 72B, 72C, . . . ) to drive and control the operation input execution section 83 to act as an automatic issuance machine.

Figure 47:
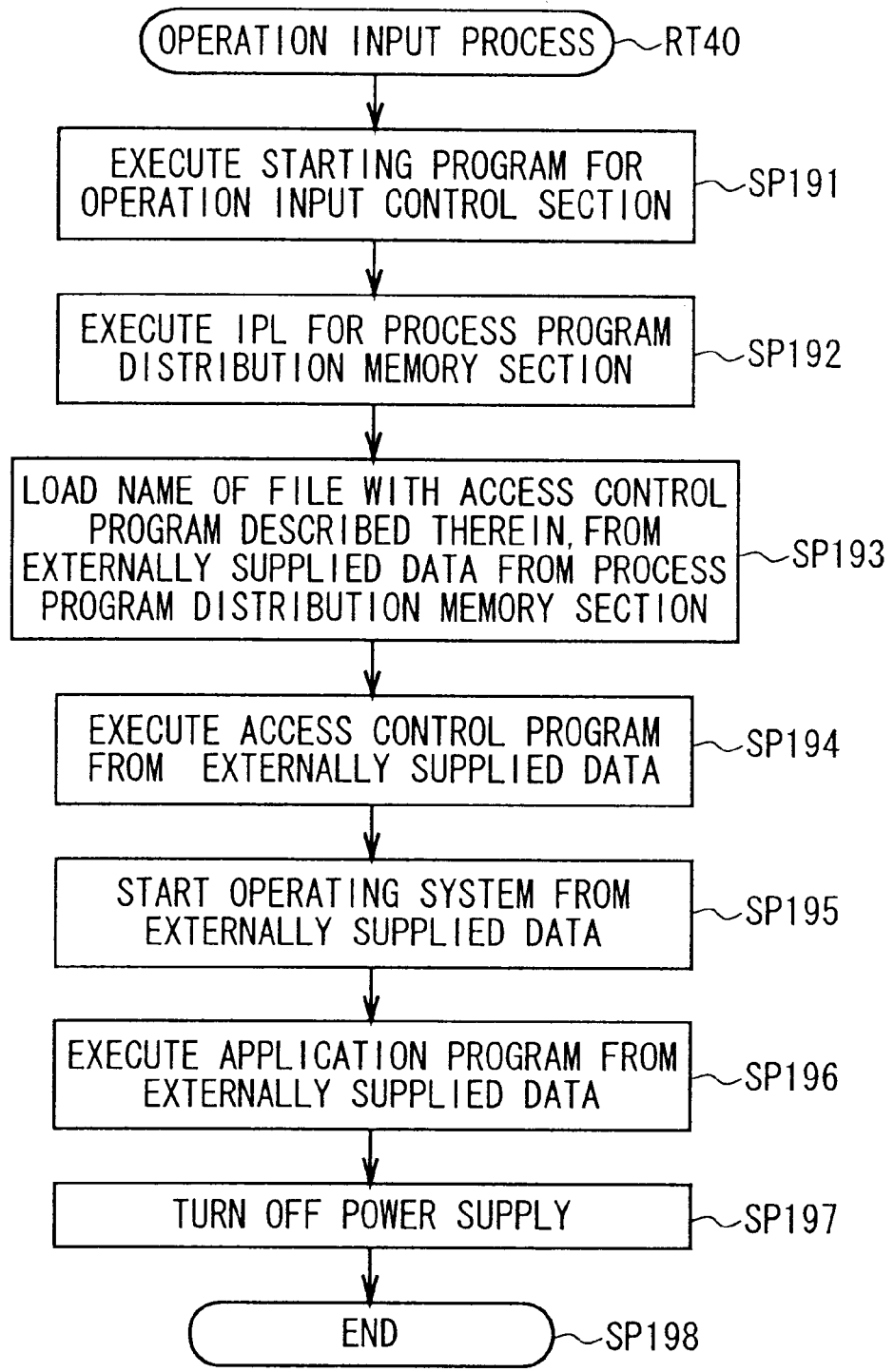
FIG. 47 is a flowchart showing a starting process procedure executed by an operation input control section 82 in FIG. 38.

When the user turns on the power supply while the process program distribution memory section 72 (72A, 72B, 72C, . . . ) is connected to the connection port 81 of the operation input processing section 73 (73A, 73B, 73C , . . . ), an operation input control section 82 executes an operation input process routine RT40, shown in FIG. 47.

Then, the CPU of the operation input control section 82 executes a starting program stored in the ROM thereof at a step SP191, and then executes the initial program loader (IPL) for the process program distribution memory section 72 at a step SP192, thereby allowing the program data stored in the process program distribution memory section 72 to be loaded in the operation input control section 82 as externally supplied data.

Subsequently, at a step SP193, the operation input control section 82 reads the name of a file describing an access control program from the externally supplied data supplied by the process program distribution memory section 72, and at a step SP194, executes the access control program from the externally supplied data while allowing this access control program to reside in the working memory opened in the RAM thereof.

Subsequently, at a step SP195, the operation input control section 82 starts the operating system (OS) program from the externally supplied data, and at a step SP196, executes the application program from the externally supplied data.

Thus, the operation input control section 82 executes this application program to drive and control the operation input execution section 83 to act as an automatic issuance machine.

This drive and control process for the operation input execution section 83 at the steps SP195 and SP196 is executed until the operation input control section 82 confirms at a step SP197 that the operation has been completed. When the user then turns off the power supply at the step SP197, the operation input control section 82 completes the operation input process routine at a step SP198 (at this point, the access control program data is deleted).

In this manner, the operation input control section 82 executes the access control program, which has been populated therein at the step SP194, thereby ensuring that the operation input execution section 83 constituting an automatic issuance machine performs an issuance operation based on part of the program data in the basic program storage section 71B which has been extracted by the user as required and then stored in the process program distribution memory section 72.

(4) Effects of Operation Input Processing Apparatus

The simulation device section 71 starts a simulation operation when the user turns on the power supply to the test execution processing section 71A while the basic program storage section 71B is connected to the test execution processing section 71A.

First, by executing the preprocess routine RT30 in FIG. 39, the test execution processing section 71A writes, as a preprocess, an access control program to the basic program storage section 71B comprising a hard disc drive, the access control program accessing the program data in the compact flash memory constituting the process program distribution memory section 72.

The test execution processing section 71A subsequently shifts to a file extraction process procedure RT31 in FIG. 40 and executes a process procedure RT32 to set the access dates for all the files in the basic program storage section 71B to the "yesterday's date" for initialization.

In the subsequent process procedure RT33, the test execution processing section 71A provides a read command S11 for the basic program storage section 71B in response to the user's instruction input to read from the basic program storage section 71B program data S12 required to allow the testing operation input execution section 71C to automatically perform an issuance operation. The test execution processing section 71A then executes the read program data to allow the testing operation input execution section 71C to automatically perform an issuance operation.

In this case, the "today's date" is written as an access date for the program in the basic program storage section 71B which has been accessed by the read command S11. As a result, only the file with the program data used for the issuance operation performed by the testing operation input execution section 71C has its access date changed from the "yesterday's date" provided upon the initialization to the "today's date."

In this state, in a process procedure routine RT34, the test execution processing section 71A reads from the basic program storage section 71B only the file having its access date changed to the "today's date" and then copies it to the process program distribution memory section 72.

As a result, the program data required to allow the testing operation input execution section 71C and thus the operation input execution section 83 to perform an issuance operation are extracted and stored in the process program distribution memory section 72.

Thus, the simulation device section 71 creates the plurality of process program distribution memory sections 72 (72A, 72B, 72C, . . . ) in a fashion corresponding to the plurality of operation input processing sections 73 (73A, 73B, 73C, . . . )

The user connects the plurality of process program distribution memory sections 72 (72A, 72B, 72C, . . . ) to the connection ports 81 of the corresponding operation input processing sections 73 (73A, 73B, 73C, . . . ). Consequently, a small capacity of program data in the basic program storage section 71B which is required to drive and control the operation input execution section 83 that automatically performs an issuance operation can be distributed to the corresponding operation input sections 73 (73A, 73B, 73C, . . . ) via the process program distribution memory sections 72 (72A, 72B, 72C, . . . ).

The operation input processing sections 73 each execute the operation input processing routine RT40 in FIG. 47 to in turn execute the access control program loaded in the process program distribution memory section 72 during the preprocess so that the program data stored in the process program distribution memory sections 72 are consistent with the functions of the personal computer constituting the operation input control section 82, thereby loading program data from the process program distribution memory section 72 into the operation input control section 82. The operation input processing section 73 executes the application program from the externally supplied data (a step SP196) to drive and control the operation input execution section 83 to automatically perform an issuance operation.

(5) Other Embodiments

In the above described embodiments, the "yesterday's date" is set for initialization during the date initialization process procedure RT32 of the file extraction process procedure RT31 (FIG. 40), but the set date is not limited to the "yesterday's date" but may be "any date other than the today's."

In addition, in the above described embodiments, the present invention is applied to an automatic issuance machine as the operation input execution section 83 the operation of which is to be controlled, but the control target is not limited to this and the present invention is widely applicable to various operation input apparatuses that can use part of the standard program data included in the basic program storage section 71B to perform processing operations depending on the user's input operations.

Figure 48:
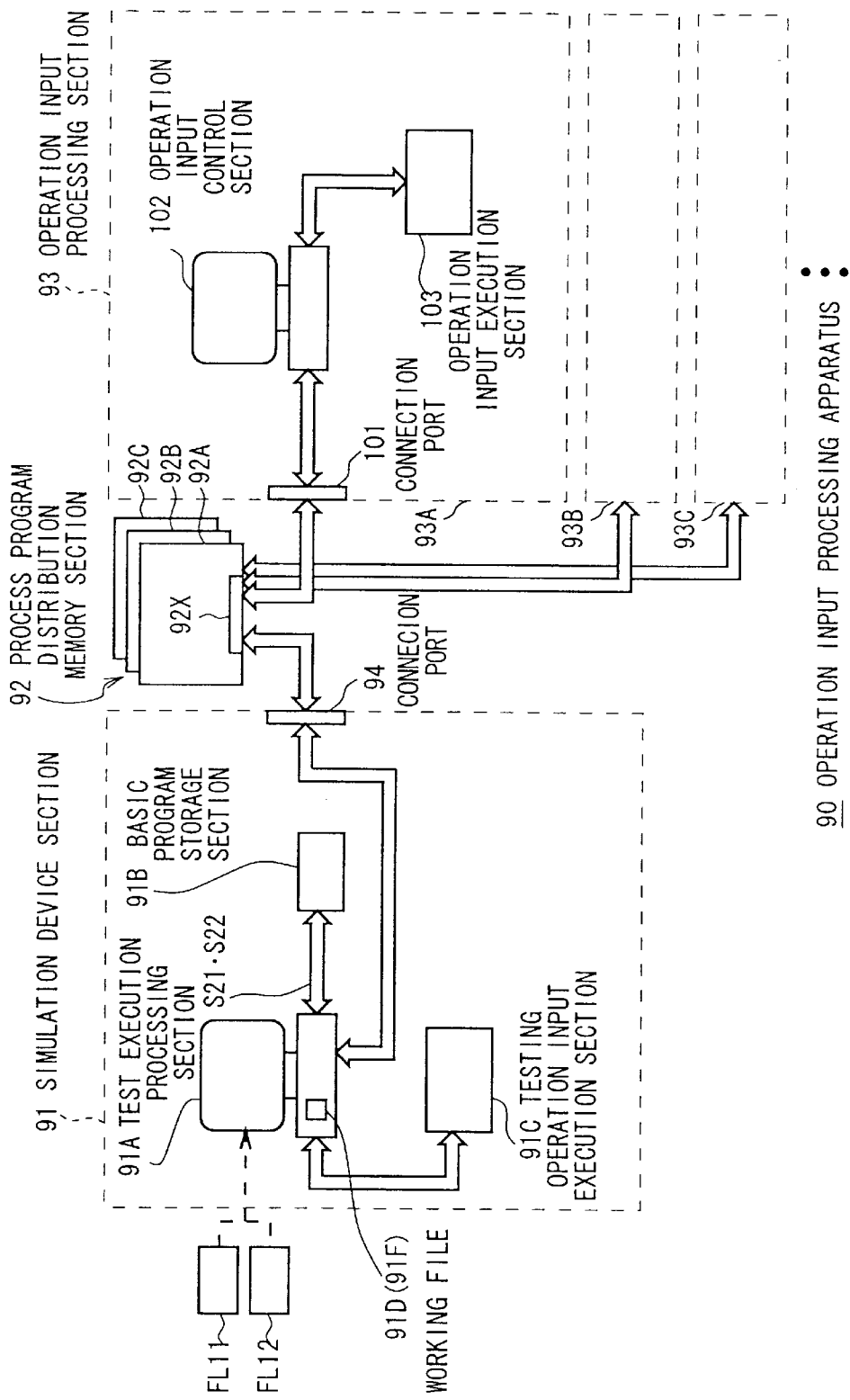
FIG. 48 is a block diagram showing an operation input processing apparatus 90 according to the fourth embodiment.

[4] Fourth Embodiment (1) Entire Configuration of Operation Input Processing Apparatus In FIG. 48, reference numeral 90 generally denotes an operation input processing apparatus comprising an automatic issuance machine for issuing, for example, tickets for concerts in response to users' input operations, and has a simulation device section 91, a process program distribution memory section 92, and an operation input processing section 93.

The simulation device section 91 extracts from software resources having a standard operating system program (OS) and application programs, operating system program (OS) data and application program data that are required to drive and control the automatic issuance machine, which is a hardware, and then writes those extracted data to a plurality of process program distribution memory section 92.

The process program distribution memory section 92 comprising, for example, compact flash memories supplies the operating system program (OS) data and application program data required to drive and control the automatic issuance machine, to a plurality of automatic issuance machines installed at retail shops or the like that are regionally distributed as externally supplied data, respectively.

Based on the operating system program (OS) data and application program data supplied by the process program distribution memory section 92, the operation input processing section 93 executes such processing that a specified ticket is issued, in response to an operation input signal input by a user.

(2) Simulation Device Section

The simulation device section 91 has a test execution processing section 91A comprising a personal computer to provide a program data read instruction to the basic program storage section 91B when the user operates the test execution processing section 91A for input.

The basic program storage section 91B comprises a hard disc drive device to store in part thereof the operation system program and application program required to allow the operation input processing section 93 to perform the issuance operation. When provided with a read command (also referred to as an IDE command) S1 by the test execution processing section 91A, the basic program storage section 91B supplies the corresponding program data S21 to the test execution processing section 91A. Thus, in the operation input processing section 93, a test execution processing section 91A obtains from the basic program storage section 91B the operating system (OS) program and application program required for a test operation performed by a testing operation input execution section 91C having the same configuration as an operation input processing section 103 comprising an automatic issuance machine and driven and controlled by an operation input control section 93 comprising a personal computer, and the test execution processing section 91A then allows the testing operation input processing section 91C to perform a test control operation.

The basic program storage section 91B comes standard with a large number of application programs for performing various data processing operations, as well as the operating system (OS) program. These application programs are stored in a recording medium comprising, for example, a hard disc, and part (program data stored in a file specified by the read command) of the stored operating system (OS) program and application programs is supplied to the test execution processing section 91A for a processing operation.

Figure 49:
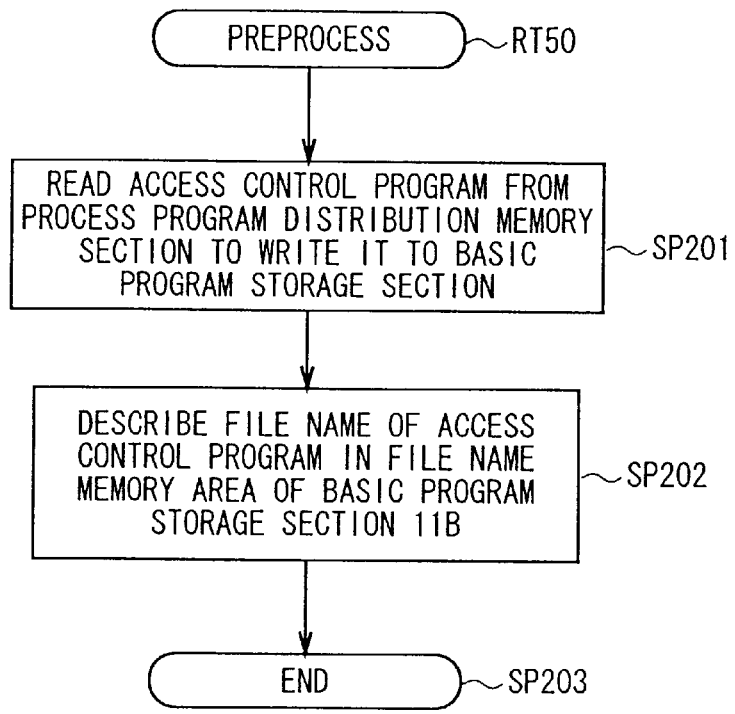
FIG. 49 is a flowchart showing a preprocess routine RT50 for a basic program storage section 91B in FIG. 48.

In addition, before performing a test operation on the testing operation input execution section 91C, the test execution processing section 91A executes a preprocess routine RT50, shown in FIG. 49, in response to a user's input operation.

In the preprocess routine RT50, a central processing unit (CPU) of the test execution processing section 91A enters a step SP201 to execute a process of writing an access control program to a file data memory area of the basic program storage section 91B in order to write to the operation input processing section 93 data stored in the process program distribution memory section 92. At the next step 202, this central processing unit describes the file name of the access control program in a file name memory area of the basic program storage section 91B. Thus, the test execution processing section 91A completes this preprocess at a step SP203.

In fact, such a preprocess is executed by installing in the test execution processing section 91A a floppy disc FL11 having a preprocess program written thereto.

Figure 50:
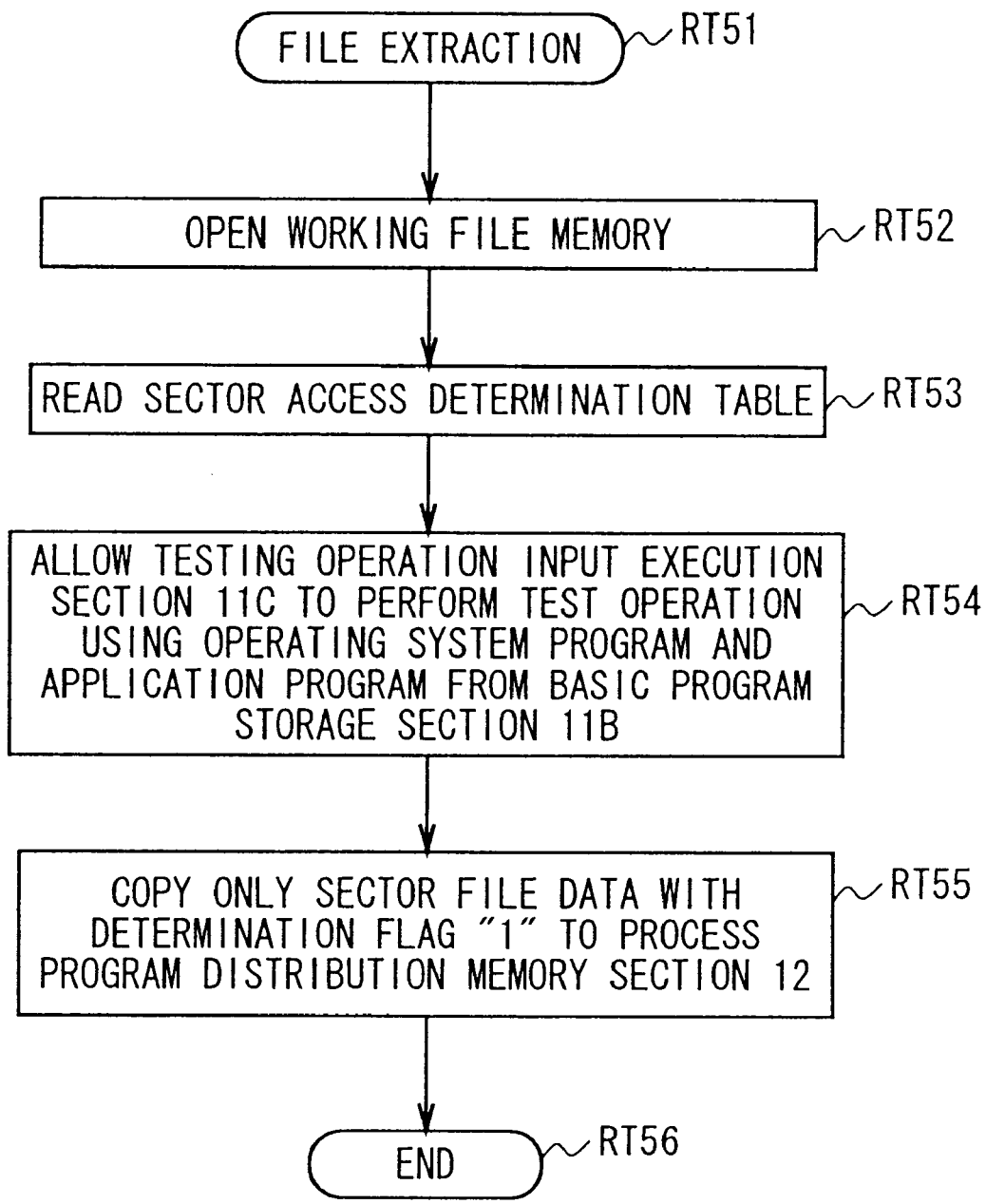
FIG. 50 is a flowchart showing a file extraction process procedure RT51 executed by a test execution processing section 91A in FIG. 48.

The program data supplied by the basic program storage section 91B when the test execution processing section 91A allows the testing operation input execution section 91C to perform a test operation are extracted from the basic program storage section 91B and stored in the process program distribution memory section 92 when the test execution processing section 11A executes a file extraction process procedure RT51, shown in FIG. 50.

In a file extraction process procedure RT51, the test execution processing section 91A first opens a working file 91D inside its own personal computer in a process routine RT52, and then loads a sector access determination table 91F from a floppy disc FL12 at the subsequent process step RT53.

When the test execution processing section 91A allows the testing operation execution section 91C to operate, a logical "1" is written to sectors in the sector access determination table 91F for program data S22 read out from the basic program storage section 91B, as a determination flag indicating that the data has been read out (a logical "0" is written to sectors for program data that have not been read out). In this embodiment, the sector access determination table 91F, which has previously been saved to the floppy disc FL12, is loaded in the test execution processing section 91A.

Subsequently, at a process step RT54, the test execution processing section 91A allows the testing operation input execution section 91C to perform a test operation using an operation system program and an application program from the basic program storage section 91B, and at the subsequent process step SP55, copies file data to the process program distribution memory section 92 from those sectors in the sector access determination table 91F which have the logical "1" determination flag. Thus, the test execution processing section 91A completes the file extraction process procedure at a process step RT56.

Figure 51:
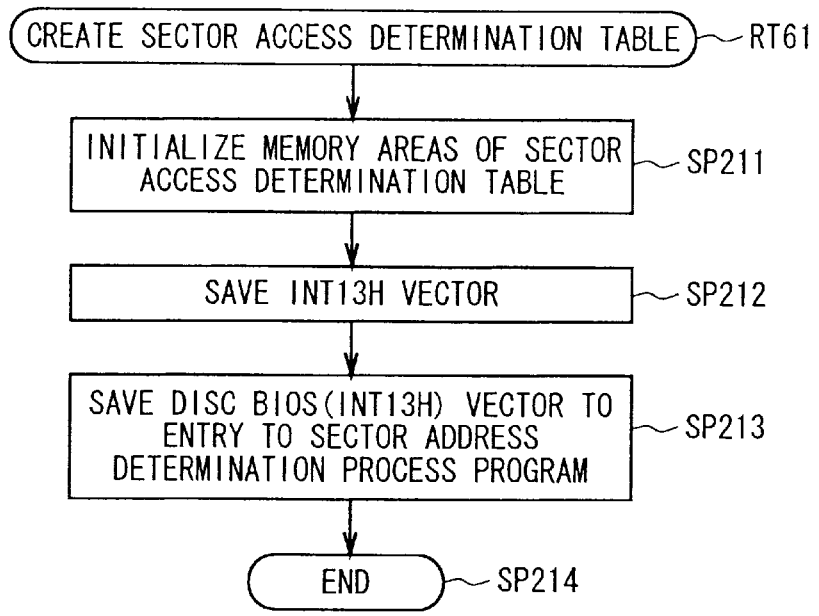
FIG. 51 is a flowchart showing a sector access determination table creation process procedure RT61.
Figure 52:
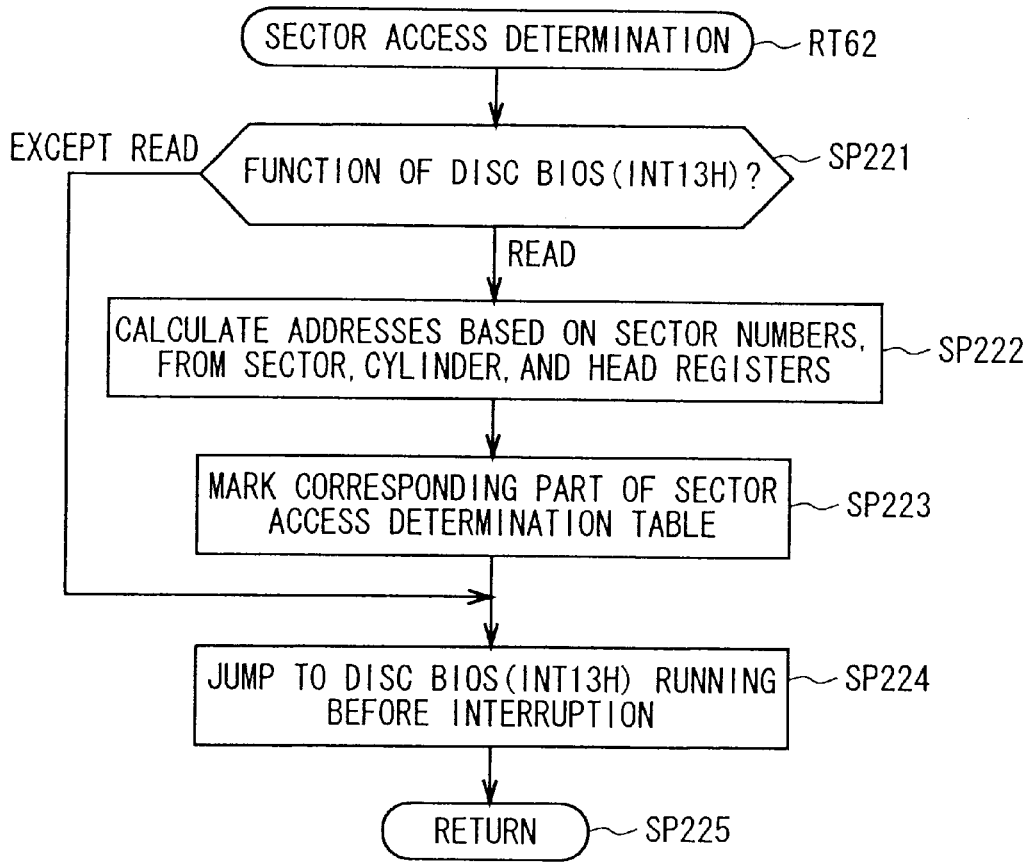
FIG. 52 is a flowchart showing a sector access determination process procedure RT12.
Figure 53:
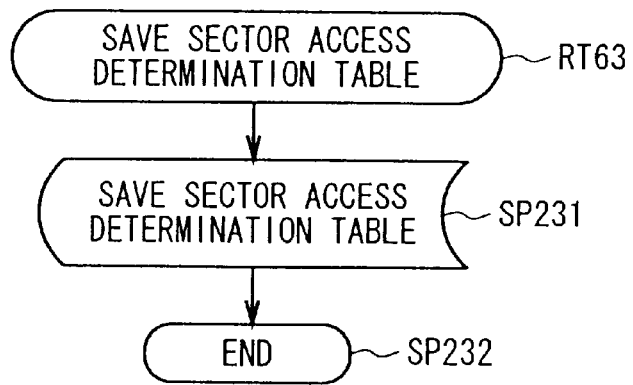
FIG. 53 is a flowchart showing a sector access determination table save process procedure RT62.

The sector access determination table 91F, which is loaded at the process step RT53, is saved to the floppy disc FL12 beforehand using the process procedure shown in FIGS. 51 to 53.

Upon entering a sector access determination table creation process procedure RT61 (FIG. 51), the test execution processing section 91A initializes at a step SP211 a memory area of the sector access determination table 91F, which is provided within the working file 91D, and then saves a vector for an interrupt destination address describing vector command int13H for the personal computer constituting the test execution processing section 91A. At the subsequent step SP213, the test execution processing section 91A changes an interrupt destination address describing vector "disc BIOS (INT13H)" representing an interrupt destination address to be specified when the interrupt destination address describing vector command int13H is issued, to an entry to a sector access determination process program RT62 (FIG. 52).

Thus, the test execution processing means 91A completes the sector access determination table creation process procedure RT61 at a step SP214.

As shown in FIG. 52, the sector access determination process program RT62 determines whether an IDE command specified in the interrupt destination address describing vector "disc BIOS (INT13H)" at the step SP221 functions as a read command READ or a command other than the read command READ. When the IDE command is the read command READ, the sector access determination process program RT62 calculates addresses representing a series of sector numbers in the basic program storage section 91B (these addresses will be hereafter referred to as logical sector addresses) from sector registers, cylinder registers, and head registers specifying sectors, cylinders, and heads specified by the IDE command, at a step SP222.

At the next step SP223, the test execution processing section 91A marks logical sector address positions in the sector access determination table 91F corresponding to a calculation result (that is, writes the determination flag "1" to these positions).

Thus, the test execution processing section 91A writes the logical "1" to the logical sector address positions specified by the read command (the IDE command) S21 provided for the basic program storage section 91B. Then, at a step SP224, the test execution processing section 91A jumps to the initial interrupt destination address describing vector "disc BIOS (INT13H)" specifying the interrupt process, and then at a step SP225, completes the sector access determination process.

On the contrary, when the read command (the IDE command) is determined to have a function other than that of the read command READ at the step SP221, the test execution processing section 91A shifts to a step SP224 without executing the processing at the steps SP222 and SP223.

Thus, by returning to a program running before the start of the interrupt process at the step SP224, the test execution processing section 91A subsequently processes the read command (the IDE command) upon generation thereof to allow a series of control operations to be performed for the testing operation input executing section 91C using program data read out from the basic program storage section 91B. Accordingly, the sector access determination table 91F is formed to store the logical "1" at the locations corresponding to the logical sector addresses at which the program data corresponding to the read command (the IDE command) provided for the basic program storage section 91B are stored.

Once the testing operation input execution section 91C has completed a test operation, the test execution processing section 91A enters a sector access determination table save process routine RT63, shown in FIG. 53. At a step SP231, the test execution processing section 91A saves to the floppy disc FL12 the sector access determination table 91F formed in the working file 91D, and at a step SP332, completes the sector access determination table save process routine.

As a result, the test execution processing section 91A saves the program data used to allow the testing operation input execution section 91C to perform the test operation, to the sector access determination table 91F in the floppy disc FL12 representing the logical sector addresses of the basic program storage section 91B, and enables file data for the process program distribution memory section 92 to be extracted from the basic program storage section 91B using the sector access determination table 91F.

Figure 54:
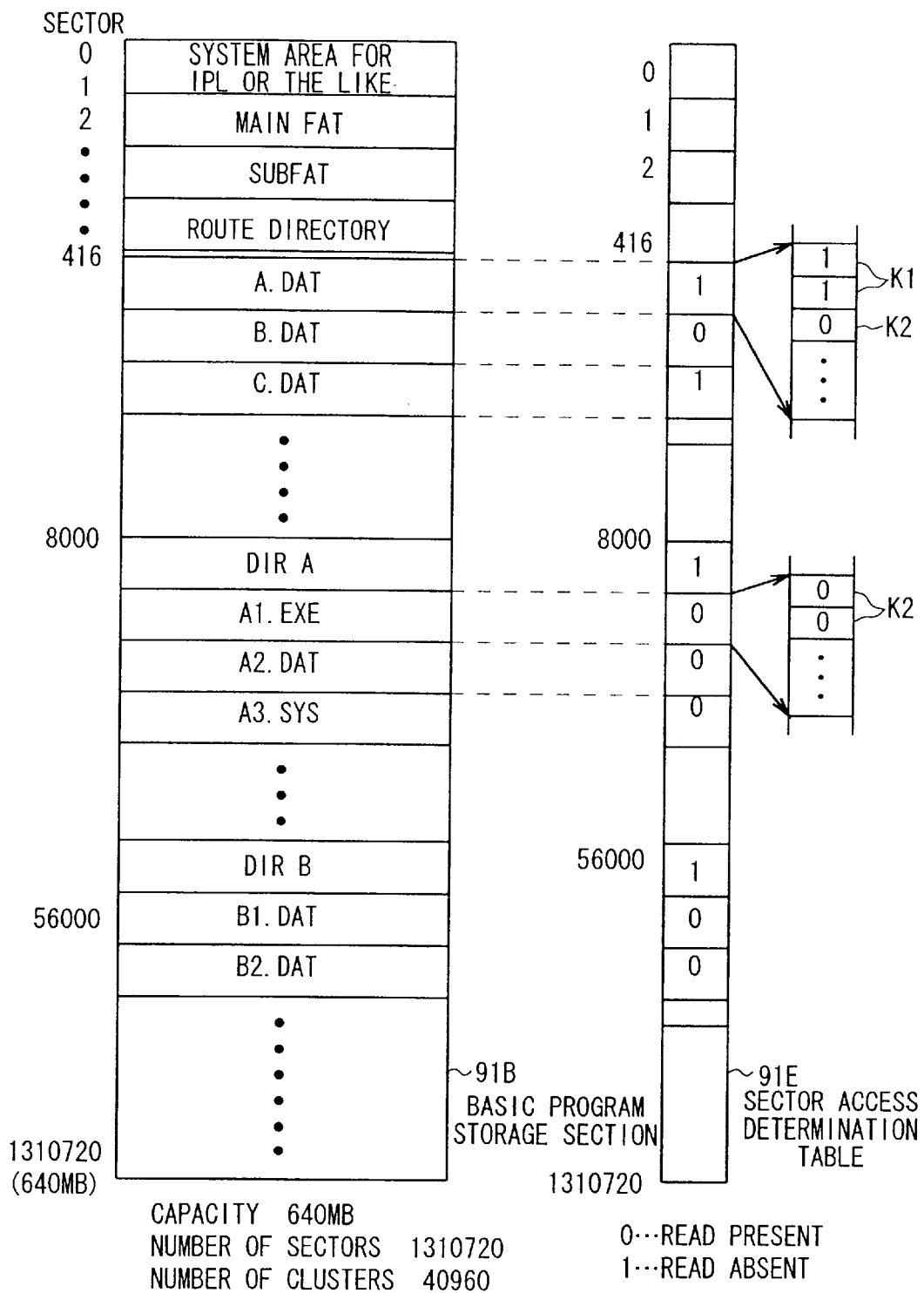
FIG. 54 is a schematic diagram showing a configuration of a sector access determination table 91F in FIG. 48.

The sector access determination table 91F has a large number of memory areas each comprising one bit and corresponding to all unit memory area addresses (in this embodiment, these addresses are represented by a series of sector numbers, that is, logical sector numbers) of the basic program storage section 91B as shown in FIG. 54. When file data (typically stored in a plurality of sectors) are read from a predetermined unit memory area of the basic program storage section 91B, corresponding sector numbers are specified by the read command (the IDE command), so that flag data comprising logical "1" ("read present" information) is stored in the specified memory area. Otherwise, flag data representing logical "0" ("read absent" information) is stored therein when not read.

According to this embodiment, the basic program storage section 91B has a system area for an initial program loader (IPL), a main file allocation table (FAT), a subfile allocation table (subFAT), and a root directory all stored in memory areas with sector numbers "0" to "415," as shown in FIG. 54.

In addition, program data with file names A.DAT, B.DAT, C.DAT, are stored in file memory areas with sector numbers "416" to "7,999."

Further, a subdirectory DIRA and program data with file names A1.EXE, A2.DAT, A3.SYS, . . . are stored in file memory areas having a sector number "8,000" as a leading address.

Furthermore, a subdirectory DIRB and program data with file names B1.DAT, B2.DAT, . . . are stored in file memory areas having a sector number "56,000" as a leading address.

The initial program loader (IPL) is program data for starting up a processing operation based on program data from the basic program storage section 91B.

In addition, the main file allocation table (main FAT) and the subfile allocation table (subFAT) are data for managing a series of logical sector numbers on the hard disc in the basic program storage section 11B.

Furthermore, as shown in FIG. 55, the route directory has sequentially described therein the "file names" A.DAT, B.DAT, C.DAT, . . . stored in the data storage area having the sector number "416" as a leading address, addresses (that is, "FAT entries") of the subdirectory DIRA, that is, "2," "4," "6," . . . , "file sizes" "18,000," "24,000," "16,000," . . . , and "other information." Thus, the file names A.DAT, B.DAT, C.DAT, . . . and the program data names for the files in the subdirectory DIRA can be accessed as addresses based on a cluster address classification. The access date is written to an "access date" column.

As shown in FIG. 56, the subdirectory DIRA has described therein the "file names" A1.EXE, A2.DAT, and A3.SYS stored in the memory areas having the sector number "8,000" as a leading address, "FAT entries" comprising cluster addresses at which the files in the subdirectory DIRB are present, "file sizes," and "other information," thereby enabling accesses to the program data stored in these memory areas. The access date is written to the "access date" column.

Furthermore, as shown in FIG. 57, the subdirectory DITB describes therein the "file names" B1.DAT and B2.DAT stored in the memory areas having the sector number "56,000" as a leading address, "FAT entries" comprising cluster addresses at which the corresponding files are present, "file sizes," and "other information," thereby enabling accesses to the program data stored in these memory areas. The access date is written to the "access date" column.

When a plurality of operation input processing sections 93 (93A, 93B, 93C, . . . ) are distributively disposed, the file data extraction process routine RT51 (FIG. 50) effectively connects connection ports 92X of plural process program distribution memory sections 92 (92A, 92B, 92C, . . . ) to the connection port 94 of the simulation device section 91 in a fashion corresponding to the plurality of operation input processing sections 93 (93A, 93B, 93C, . . . ), to repeat the process of writing program data.

This enables the simulation device section 91 to create the plurality of process program distribution memory sections 92 (92A, 92B, 92C, . . . ) that store an operating system (OS) program and application programs for allowing the operation input execution section 103 in each of the plural operation input processing sections 93 (93A, 93B, 93C, . . . ) to automatically perform an issuance operation.

(3) Operation Input Processing Section

When the connection port 92X of each process program distribution memory section 92 (92A, 92B, 92C, . . . ) is connected to a connection port 101 of the corresponding operation input processing section 93 (93A, 93B, 93C, . . . ), the process program distribution memory section 92 (92A, 92B, 92C, . . . ) is connected to the operation input control section 102 comprising a personal computer. When the user performs an input operation on the operation input control section 102, the operation input control section 102 uses the program data stored in the process program distribution memory section 92 (92A, 92B, 92C, . . . ) to drive and control the operation input execution section 93 to act as an automatic issuance machine.

Figure 58:
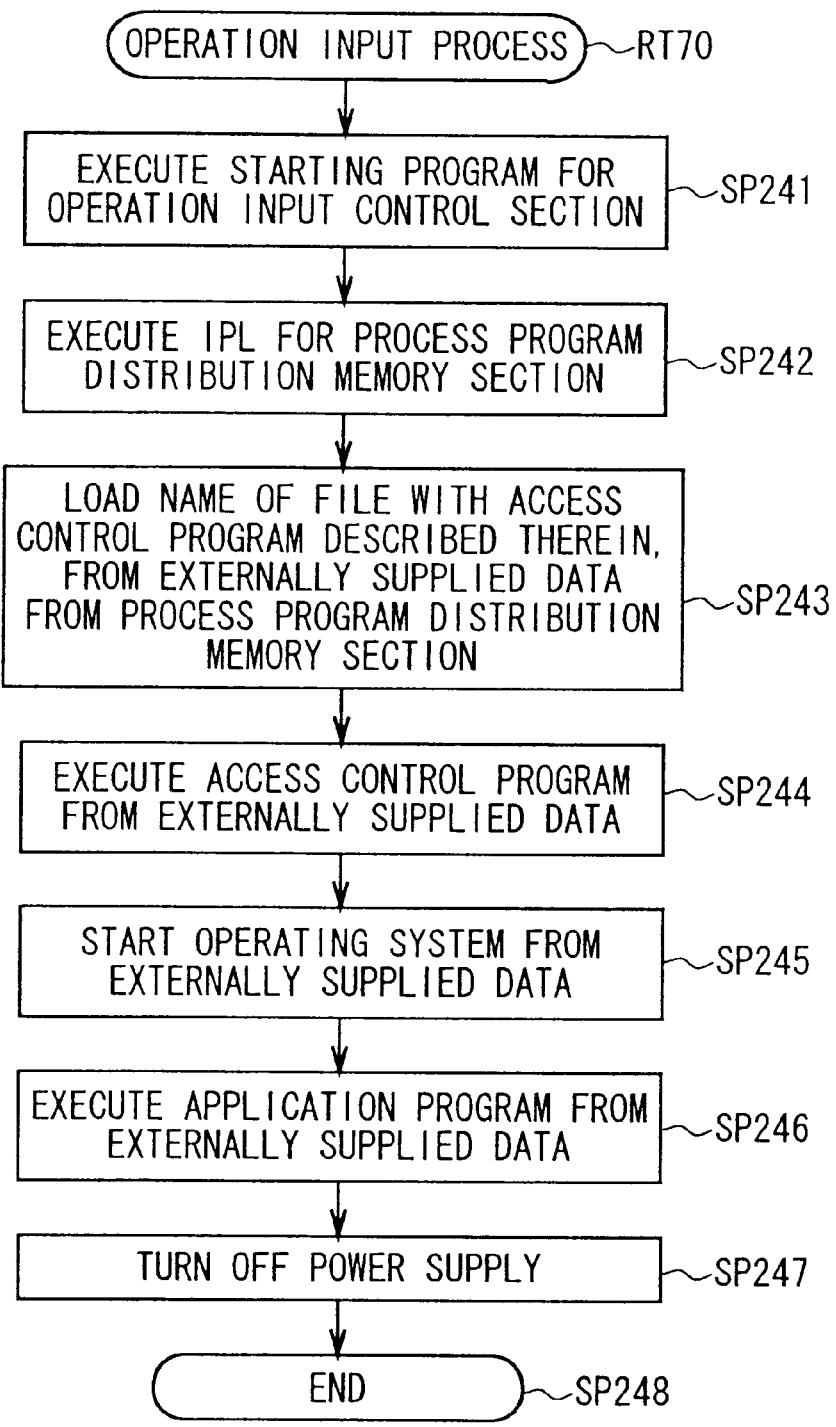
FIG. 58 is a flowchart showing a starting process procedure executed by an operation input control section 102 in FIG. 48.

When the user turns on the power supply while the process program distribution memory section 92 (92A, 92B, 92C, . . . ) is connected to the connection port 101 of the operation input processing section 93 (93A, 93B, 93C, . . . ), an operation input control section 102 executes an operation input process routine RT70, shown in FIG. 58.

Then, the CPU of the operation input control section 102 executes a starting program stored in the ROM thereof at a step SP241, and then executes the initial program loader (IPL) for the process program distribution memory section 92 at a step SP242, thereby allowing the program data stored in the process program distribution memory section 92 to be loaded in the operation input control section 92 as externally supplied data.

Subsequently, at a step SP243, the operation input control section 102 reads the program data of the name of a file describing an access control program from the externally supplied data supplied by the process program distribution memory section 92, and at a step SP244, executes the access control program from the externally supplied data while allowing this program to reside in the working memory opened in the RAM thereof.

Subsequently, at a step SP245, the operation input control section 102 starts the operating system (OS) program with the externally supplied data, and at a step SP246, executes the application program with the externally supplied data read from the process program distribution memory section 92.

Thus, the operation input control section 102 executes this application program to drive and control the operation input execution section 103 to act as an automatic issuance machine.

This drive and control process for the operation input execution section 103 at the steps SP245 and SP246 is executed until the operation input control section 102 confirms at a step SP247 that the operation has been completed. When the user then turns off the power supply at the step SP247, the operation input control section 102 completes the operation input process routine at a step SP248 (at this point, the access control program data is deleted).

In this manner, the operation input control section 102 executes the access control program, which has been populated therein at the step SP244, thereby ensuring that the operation input execution section 103 constituting an automatic issuance machine performs an issuance operation based on part of the program data in the basic program storage section 91B which has been extracted by the user as required and then stored in the process program distribution memory section 92.

(4) Effects of Operation Input Processing Apparatus

The simulation device section 91 starts a simulation operation when the user turns on the power supply to the test execution processing section 91A while the basic program storage section 91B is connected to the test execution processing section 91A.

First, by executing the preprocess routine RT50 in FIG. 49, the test execution processing section 91A writes, as a preprocess, an access control program to the basic program storage section 91B comprising a hard disc drive, the access control program accessing the program data in the compact flash memory constituting the process program distribution memory section 92.

The test execution processing section 91A follows a sector access determination table creation process procedure RT61 to RT63 in FIGS. 51 to 53 to provide the read command S21 for the basic program storage section 91B in response to the user's instruction input in order to read out from the basic program storage section 91B the program data S22 required to allow the testing operation input execution section 91C to automatically perform an issuance operation. The test execution processing section 91A thereby creates the sector access determination table representing the stored positions of the program data used to allow the testing operation input execution section 91C to automatically perform the issuance operation, and saves this table to the floppy disc FL12.

Then, in the file extraction process routine RT51 (FIG. 50), the test execution processing section 91A reads out from the basic program storage section 91B only files having the logical "1" determination flag in the sector access determination table 91F, and copies the files to process program distribution memory section 92.

As a result, the program data required to allow the testing operation input execution section 91C and thus the operation input execution section 103 to perform an issuance operation are extracted and stored in the process program distribution memory section 92.

Thus, the simulation device section 91 creates the plurality of process program distribution memory sections 92 (92A, 92B, 92C, . . . ) in a fashion corresponding to the plurality of operation input processing sections 93 (93A, 93B, 93C, . . . ).

The user connects the plurality of process program distribution memory sections 92 (92A, 92B, 92C, . . . ) to the connection ports 101 of the corresponding operation input processing sections 93 (93A, 93B, 93C, . . . ). Consequently, a small capacity of program data in the basic program storage section 91B which is required to drive and control the operation input execution section 103 that automatically performs an issuance operation can be distributed to the corresponding operation input processing sections 93 (93A, 93B, 93C, . . . ) via the process program distribution memory sections 92 (92A, 92B, 92C, . . . )

The operation input processing sections 93 each execute the operation input processing routine RT70 in FIG. 58 to in turn execute the access control program loaded in the process program distribution memory section 92 during the preprocess so that the program data stored in the process program distribution memory sections 92 are consistent with the functions of the personal computer constituting the operation input control section 102, thereby loading program data from the process program distribution memory section 92 into the operation input control section 102. The operation input processing section 93 executes the application program from the externally supplied data (a step SP246) to drive and control the operation input execution section 103 to automatically perform an issuance operation.

Accordingly, only the simple configuration using the one personal computer constituting the test execution processing section 91A needs to be used as means for extracting the required program data from the basic program storage section 91B to load the data in the process program distribution memory section 92.

(5) Other Embodiments

In the above embodiments, the sector access determination table 91F formed in the working file 91D is saved to the floppy disc FL22 and the file data extraction routine (FIG. 50) is executed to load the saved sector access determination table 91F in the working file 91D, thereby extracting the program data from the basic program storage section 91B to load the data in the process program distribution memory section 92. Effects similar to those described above, however, can be obtained by extracting the file data with the sector access determination table 91F stored in the working file 91D rather than being saved to the floppy disc FL22.

In addition, in the above described embodiments, the present invention is applied to an automatic issuance machine as the operation input execution section 103 the operation of which is to be controlled, but the control target is not limited to this and the present invention is widely applicable to various operation input apparatuses that can use part of the standard program data included in the basic program storage section 91B to perform processing operations depending on the user's input operations.

Additionally, in the above described embodiments, the process program distribution memory section 92 comprises a compact flash memory, but the process program distribution memory section 92 is not limited to this and a memory comprising a writable storage medium such as a flash ROM memory is applicable.

Industrial Applicability

The present invention can be applied to an operation input processing apparatus which operates an operation input executing section such as an issuance machine by program data in response to users' input operations, for example, as in the case of an automatic issuance machine which automatically issues tickets in response to users' input operations.

What is claimed is:

1. An operation input processing apparatus for executing processing depending on a user's operation input using a portion of plural first program data stored in a basic program storage section, characterized by comprising:

a simulation device section for extracting said portion of the program data from said basic program storage section to create new second program data;

a process program distribution memory section removably connected to said simulation device section to store said second program data created by said simulation device section as the third program data; and an operation input processing section having connected thereto said process program distribution memory section removed from said simulation device section to store in first memory means said third program data stored in said process program distribution memory section in order to execute the processing depending on said user's operation input using said third program data in said first memory means.

2. The operation input processing apparatus according to claim 1, characterized in that said simulation device section comprises:

simulation execution means for reading said portion of the program data from said basic program storage section for execution;

determination table means for determining and storing addresses of the program data read by said simulation execution means out of the program data in said basic program storage section; and program data creation means for reading program data from those of all addresses of said basic program storage section which are stored in said determination table means to create said second program data.

3. The operation input processing apparatus according to claim 1, characterized in that said operation input processing section comprises: second memory means for fixedly storing fourth program data used to store said third program data in said first memory means form said process program distribution memory section; and copy means for using said fourth program data to copy said third program data from said process program distribution memory section to said first memory means.

4. A simulation apparatus characterized in that second program data is written as third program data to one or more process program distribution memory sections connected to an operation input processing section for extracting a portion of plural first program data from a basic program storage section to create new second program data and using said second program data to execute processing depending on a user's operation input.

5. An operation input executing apparatus characterized in that second program data created by a simulation device through extraction from a plurality of first program data in a basic program storage section are read from a process program distribution memory section as third program data and stored in first memory means, and said third program data in said first memory means are used to execute processing depending on a user's operation input.

6. An operation input processing method for executing processing depending on a user's operation input using a portion of plural first program data stored in a basic program storage section, characterized by comprising the steps of:

reading a portion of said first program data from said basic program storage section in response to the user's instruction input and performing a simulation operation of testing operation input execution section and creating new second program data with said portion of said program data used at the time of simulation operation in a simulation device section;

storing said second program data created in said simulation device section as third program data in a process program distribution memory section removably connected to said simulation device;

connecting said process program distribution memory section removed from said simulation device section to an operation input processing section, reading out in said operation input processing section said third program data stored in said process program distribution memory section, and executing processing depending on the operation input by said user using said third program data.

7. A simulation method characterized in that a portion of program data is extracted from a plurality of first program data in a basic program storage section to create new second program data, and said second program data is written as third program data into one or more process program distribution memory sections connected to an operation input processing section for executing processing depending on the user's operation input using said third program data.

8. An operation input executing method, characterized by comprising the step of:
reading, from a process program distribution memory section storing second program data created by extracting from a plurality of first program data in a basic program memory section by simulation operation and storing said third program data in first memory means, and then executing processing depending on the user's operation input using said third program data in said first memory means.

9. An operation input processing apparatus, comprising:
simulation device means for operating when using first program data stored in a basic program storage section to allow a testing operation input execution section to perform a simulation operation, to extract from said first program data second program data used for said simulation operation;
process program distribution memory means for storing as third program data said second program data extracted by said simulation device means; and
operation input processing means for receiving said third program data from said process program distribution memory means as externally supplied data to drive and control the operation input execution section,
characterized in that, when a user inputs an operation to said operation input processing means, said third program data in said basic program storage section is used to drive and control said operation input execution section;
said simulation device means, comprising
a test execution processing section for allowing said testing operation input execution section to perform a simulation operation by providing a read command to said basic program storage section in response to a user's instruction input to partly read said first program data from said basic program storage section for execution; and
a process program creation section for storing said read command for said basic program storage section and extracting, from said first program data in said basic program storage section, said second program data which corresponds to said stored read command to store said second program data in said process program distribution memory section as said third program data.

10. The operation input processing apparatus according to claim 9, characterized in that said process program creation section extracts file data corresponding to said stored read command as second program data from said first program data in said basic program storage section, and stores said second program data as third program data so as to eliminate free spaces between file data in said process program distribution memory section.

11. The operation input processing apparatus according to claim 9, characterized in that said process program creation section extracts file data corresponding to said stored read command as second program data from said first program data in said basic program storage section, and extracts only sector data used when performing said simulation operation from said extracted file data, and then stores said sector data as third program data so as to eliminate free spaces between file data in said process program distribution memory section.

12. The operation input processing apparatus according to claim 9, characterized in that said process program creation section extracts file data corresponding to said stored read command as second program data from said first program data in said basic program storage section, and extracts only sector data used when performing said simulation operation from said extracted file data, compresses said extracted sector data by a desired compression method, and then stores said sector data as third program data so as to eliminate free spaces between file data in said process program distribution memory section.

13. The operation input processing apparatus according to claim 9, characterized in that said operation input processing section operates in a first drive and control mode for loading said third program data stored in said process program distribution memory section and in response to a user's instruction input, driving and controlling said operation input execution section using at least said third program data and in a second drive and control mode for modifying said third program data to obtain fourth program data and driving and controlling said operation input execution section using the fourth program data.

14. A simulation apparatus, characterized by comprising:
a test execution processing section for allowing a testing operation input execution section to perform a simulation operation by providing a read command to a basic program storage section in response to a user's instruction input to partly read first program data from said basic program storage section for execution; and
a process program creation section for storing said read command for said basic program storage section and extracting from said first program data in said basic program storage section, that part of second program data which corresponds to said stored read command to store said part of said second program data in a process program distribution memory section as third program data.

15. An operation input processing method, comprising:
a simulation step of operating when using first program data stored in a basic program storage section to allow a testing operation input execution section to perform a simulation operation, to extract by simulation device means from said first program data second program data used for said simulation operation;
a data storage step of storing as third program data said second program data extracted by said simulation device means in process program distribution memory means; and
a driving step of receiving said third program data from said process program distribution memory means as externally supplied data in operation input processing means to drive and control the operation input execution section,
characterized in that, when a user inputs an operation to said operation input processing means, said third program data in said basic program storage section is used to drive and control said operation input execution section;
said simulation device step, comprising the steps of:
allowing said testing operation input execution section to perform a simulation operation by providing a read command to said basic program storage section in response to a user's instruction input to partly read said first program data from said basic program storage section for execution during a test execution process; and storing said read command for said basic program storage section and extracting, from said first program data in said basic program storage section, said second program data which corresponds to said stored read command to store said second program data in said process program distribution memory section as said third program data, in a process program creation section.

16. An operation input processing apparatus, characterized by comprising:

means for initializing an access date for first program data stored in basic program storage means, to one different from a test execution date;

means for rewriting an access date for second program data of said first program data in said basic program storage means which second program data has been used for a test operation, to said test execution date at the time of operating so that said first program data is partly used to operate test execution means;

means for copying said second program data of said first program data in said basic program storage means for which said second program data said access date is the same as said test execution date, to a process program distribution memory means as third program data; and operation input processing means for receiving said third program data from said process program distribution memory means as externally supplied program data, wherein said operation input processing means executes said externally supplied program data to drive and control an operation input execution section when a user operates said operation input processing means for input.

17. A simulation apparatus, characterized by comprising: means for initializing an access date for first program data stored in basic program storage means, to one different from a test execution date; means for rewriting an access date for second program data of said first program data in said basic program storage means which second program data has been used for a test operation, to said test execution date at the time of operating so that said first program data is partly used to operate a test execution means; and means for copying said second program data of said first program data in said basic program storage means for which said second program data said access date is the same as said test execution date, to a process program distribution memory means as third program data.

18. An operation input processing method, characterized by comprising the steps of: initializing an access date for first program data stored in basic program storage means, to one different from a test execution date; operating to rewrite an access date for second program data of said first program data in said basic program storage means which second program data has been used for a test operation, to said test execution date when said first program data is partly used to operate a test execution means; copying said second program data of said first program data in said basic program storage means for which said second program data said access date is the same as said test execution date, to a process program distribution memory means as third program data; and allowing operation input processing means to receive said third program data from said process program distribution memory means as externally supplied program data, and when a user operates said operation input processing means for input, allowing said operation input processing means to execute said externally supplied program data to drive and control an operation input execution section.

19. An operation input processing apparatus, characterized by comprising:

test execution processing means including a test execution processing section comprising a personal computer for allowing test execution means to operate by using second program data comprising part of first program data stored in basic program storage means;

access determination table creation means for using said test execution processing section to create inside said personal computer an access determination table representing a first address of that memory area of said basic program storage section in which said second program date is stored in a manner such that the first address is differentiated from other second addresses;

data copy means for copying second program date with said first address from said basic program storage means to process program distribution memory means as third program data, based on contents of said access determination table; and operation input processing means for receiving said third program data from said process program distribution memory means as externally supplied program data, wherein said operation input process means executes said externally supplied program data to drive and control an operation input execution section when a user operates said operation input processing means for input.

20. A simulation apparatus, characterized by comprising: test execution processing means including a test execution processing section comprising a personal computer for allowing test execution means to operate by using second program data comprising part of first program data stored in basic program storage means;

access determination table creation means for using said test execution processing section to create inside said personal computer an access determination table representing a first address of that memory area of said basic program storage section in which said second program date is stored in a manner such that the first address is differentiated from other second addresses; and data copy means for copying second program date with said first address from said basic program storage means to process program distribution memory means as third program data, based on contents of said access determination table.

21. The simulation apparatus according to claim 20, characterized by comprising:

external storage means for, when an access determination table created by said access determination table creation means is sent from said personal computer, storing said access determination table.

22. An operation input processing method, characterized by comprising the steps of:

allowing, in a test execution processing section comprising a personal computer, test execution means to operate using second program data comprising part of first program data stored in basic program storage means;

using said test execution processing section to create inside said personal computer an access determination table representing a first address of that memory area of said basic program storage section in which said second program date are stored in a manner such that the first address is differentiated from other second addresses;

copying second program date with said first address from said basic program storage means to process program distribution memory means as third program data, based on contents of said access determination table; and inputting said third program data from said process program distribution memory means to operation input processing means as externally supplied program data, in which, said operation input process means executes said externally supplied program data to drive and control an operation input execution means when a user operates said operation input processing means for input.

* * * * *